Figure 2:
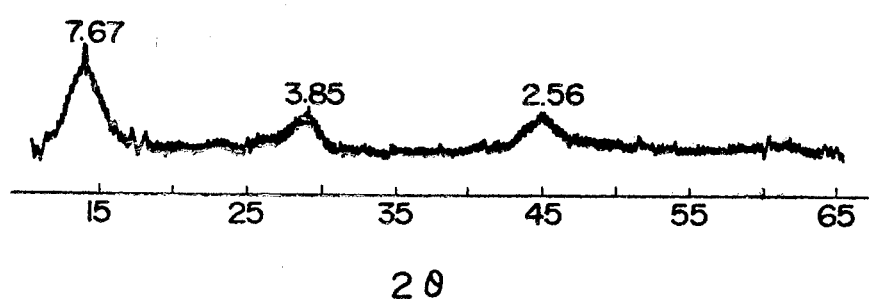

United States Patent [19]
Miyata et al.

[11] 3,879,523
[45] Apr. 22, 1975

[54] COMPOSITE METAL HYDROXIDES

[75] Inventors: Shigeo Miyata; Teruhiko Kumura; Minoru Shimada, all of Takamatsu, Japan

[73] Assignee: Kyowa Chemical Industry Co., Ltd., Tokyo, Japan

[22] Filed: Dec. 8, 1970

[21] Appl. No.: 96,214

[30] Foreign Application Priority Data
Dec. 12, 1969 Japan.................................. 44-99358

[52] U.S. Cl........ 423/250; 252/62.64; 252/301.1 R; 423/253; 423/277; 423/308; 423/331; 423/365; 423/430; 423/464; 423/508; 423/518; 423/593; 423/595; 423/603
[51] Int. Cl.. C01g 56/00; C01b 35/00; C01g 49/00
[58] Field of Search........ 23/50, 315, 316, 343–346; 252/301.1; 423/250, 277, 331, 430, 518, 593

[56] References Cited
UNITED STATES PATENTS

| | | | |
|---|---|---|---|
| 2,797,978 | 7/1957 | Beckman | 23/50 |
| 2,958,626 | 11/1960 | Schenck et al. | 23/315 X |
| 3,099,524 | 7/1963 | Grossmith | 23/315 |
| 3,347,640 | 10/1967 | Higuchi et al. | 23/315 |
| 3,347,641 | 10/1967 | Higuchi et al. | 23/315 |
| 3,539,306 | 11/1970 | Kumura et al. | 23/315 |
| 3,573,006 | 3/1971 | Shih et al. | 23/315 |

FOREIGN PATENTS OR APPLICATIONS
1,086,779  10/1967  United Kingdom

OTHER PUBLICATIONS

Hey; An Index of Mineral Species and Varieties, 2nd Ed., 1955, pp. 79, 81, 84, 275, 280.
Laitinen; Chemical Analysis, McGraw–Hill Book Co. Inc., 1960, pp. 160–161.
Mahin; Quantitative Analysis, 3rd Ed., McGraw–Hill Book Co. Inc., 1924, pp. 19–20.
Gilman; A Dictionary of Chemical Equations, Eclectic Pub., 1958, pp. 198–201 & 276–281.

*Primary Examiner*—Carl D. Quarforth
*Assistant Examiner*—R. L. Tate
*Attorney, Agent, or Firm*—Sherman & Shalloway

[57] ABSTRACT

A composite metal hydroxide expressed by the following composition formula:

$$M_x^{2+} M_y^{3+} (OH)_{2x+3y-2z} (A^{2-})_z \cdot aH_2O,$$

such composite metal hydroxide having a layer crystal structure and exhibiting an endothermal peak owing to isolation of crystal water at a temperature exceeding 200°C. in the differential thermal analysis.

17 Claims, 5 Drawing Figures

Fig. I-A
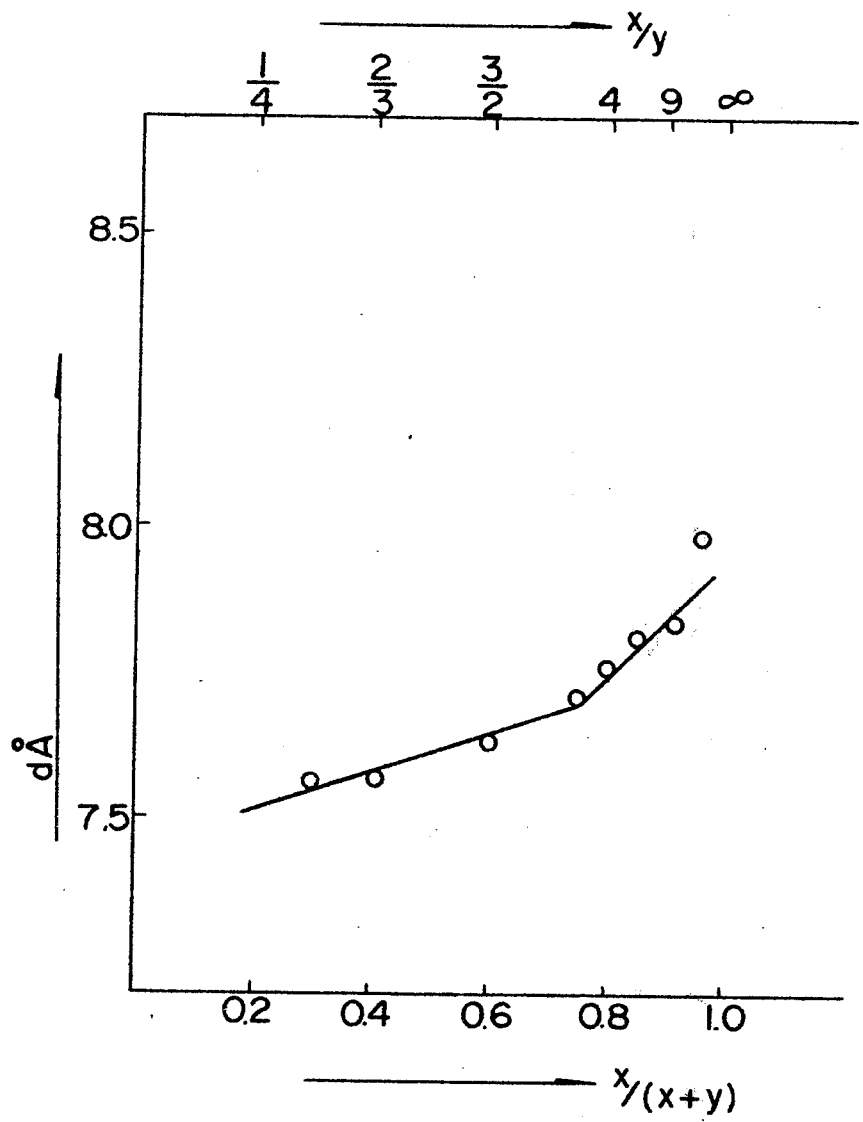
$Ni_xFe_y(OH)_{2x+3y-2z}(CO_3)_z \cdot aH_2O$

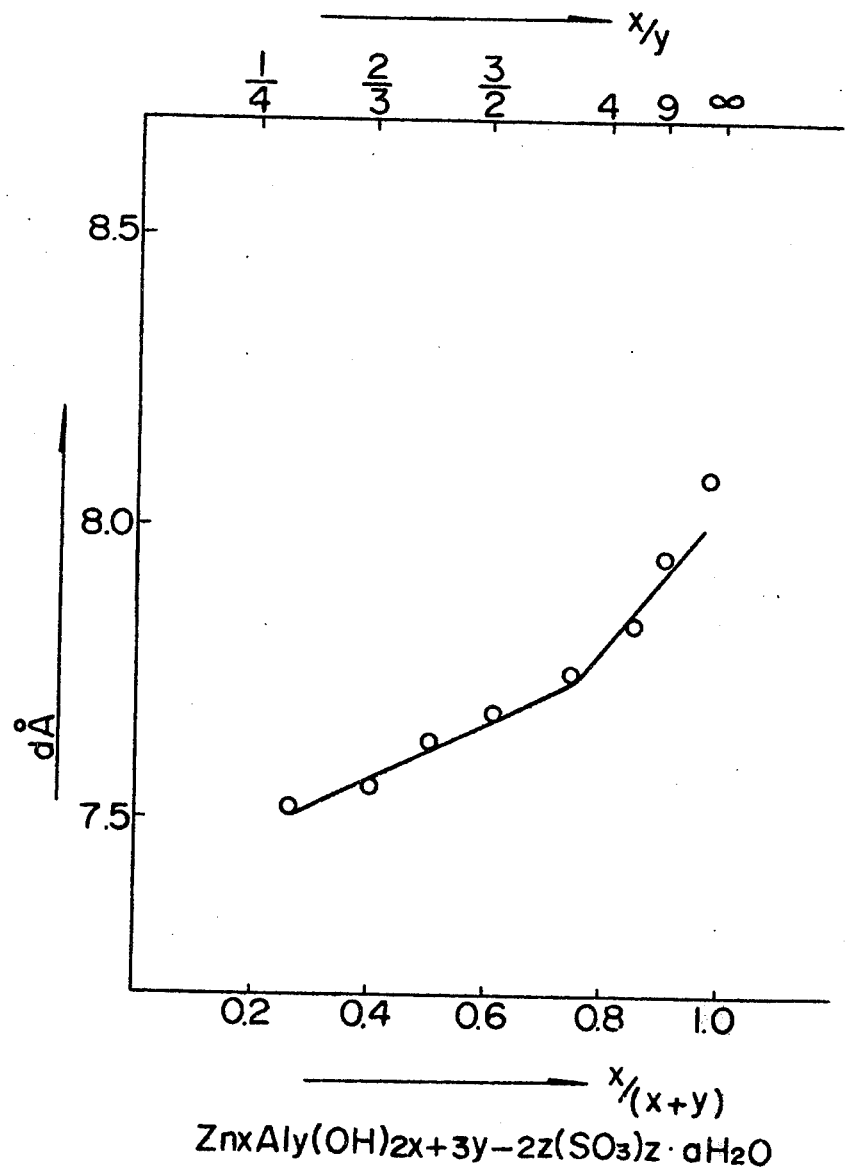
Fig.1-B
$Zn_xAl_y(OH)_{2x+3y-2z}(SO_3)_z \cdot aH_2O$

COMPOSITE METAL HYDROXIDES

This invention relates to novel composite metal hydroxides having a layer crystal structure and to a process for the preparation of the same.

More detailedly, this invention relates to novel composite metal hydroxides having a layer crystal structure and being expressed by the following composition formula:

$$M_x^{2+}M_y^{3+}(OH)_{2x+3y-2z}(A^{2-})_z \cdot aH_2O \quad (I)$$

wherein $M^{2+}$ is a divalent metal selected from the group consisting of copper, beryllium, calcium, strontium, barium, zinc, cadmium, tin, lead, manganese and metals of group VIII of the Periodic Table; $M^{3+}$ is a trivalent metal selected from the group consisting of metals of group III of the Periodic Table, titanium, metals of group V of the Periodic Table, chromium, manganese, metals of group VIII of the Periodic Table, rare earth metals and actinide metals; $A^{2-}$ stands for a divalent inorganic ion; and $x$, $y$, $z$ and $a$ are positive numbers satisfying the requirements expressed by the following formulas:

$$1/4 \leq x/y \leq 8,$$
$$1/6 > \frac{z}{x+y} > 1/20$$
and
$$0.25 \leq \frac{a}{x+y} \leq 1.0$$

Compounds of the above-mentioned group of this invention have in common, a layer crystal structure expressed substantially by the following X-ray diffraction pattern:

| $d(\text{Å})$ | Relative Intensity ($I/I_o$) |
|---|---|
| 7.8 ± 3.2 | 100 |
| 3.9 ± 1.6 | 5 – 80 |
| 2.6 ± 1.2 | 5 – 60 |
| 1.54 ± 0.05 | 2 – 10 |
| 1.51 ± 0.05 | 2 – 10 |

The value of the relative intensity ($I/I_o$) varies depending on treatment conditions during manufacturing, particularly conditions of the hydrothermal treatment and pressurizing treatment.

A group of composite metal hydroxides having the above layer crystal structure has been named "Andromedite" (which will often be adreviated as AM hereinbelow).

As the composite metal hydroxide having the above-layer crystal structure, hydrotalcite (composition formula = $Mg_6Al_2(OH)_{16}CO_3 \cdot 4H_2O$), pyroaurite (composition formula = $Mg_6Fe_2(OH)_{16}CO_3 \cdot 4H_2O$) and stichtite (composition formula = $Mg_6Cr_2(OH)_{16}CO_3 \cdot 4H_2O$), each of which is of natural source have been known. It seems somewhat strange that in each of the known composite metal hydroxides of the Andromedite type the divalent metal is magnesium. This is deemed to be due to the specific property of magnesium that is is likely to form a layer crystal structure together with a trivalent metal such as aluminum, iron and chromium, and hydroxyl groups and carbonic ions.

It has now been found that even when a divalent metal other than magnesium is used, a group of novel composite metal hydroxides of the Andromedite type can be synthesized, as detailed hereinbelow, by selecting specific conditions.

The primary object of this invention is to provide a group of novel composite metal hydroxides having a composition different from those of the above-mentioned natural minerals and having a stable layer crystal structure, and a process for the synthesis of these novel composite metal hydroxides.

Another object of this invention is to provide novel composite metal hydroxides having a great utility in a broad application range as an intermediate of a magnetic body, an adsorbent, a dehydrating agent, a catalyst, an intermediate of a catalyst, a pigment, etc.

This invention will be detailed hereinbelow.

CHEMICAL COMPOSITION OF COMPOSITE METAL HYDROXIDE

In the composite metal hydroxide of above formula (I), as the divalent metal $M^{2+}$ copper, beryllium, calcium, strontium, barium, zinc, cadmium, tin, lead, manganese and metals of group VIII of the Periodic Table may be named. As the metal of group VIII of the Periodic Table iron, cobalt, nickel, ruthenium, rhodium, palladium, osmium, iridium or platinum. Preferable divalent metals are copper, calcium, strontium, barium, zinc, cadmium, manganese, iron, cobalt and nickel.

As the trivalent metal $M^{3+}$ metals of group III of the Periodic Table such as aluminum, scandium, gallium, yttrium, indium, lanthanum (La) and thallium; titanium; metals of group V of the Periodic Table such as vanadium, antimony, and bismuth; chromium; manganese; metals of group VIII of the Periodic Table such as iron, cobalt, nickel, ruthanium, rhodium, osmium and iridium; rare earth metals such as cerium, neodymium (Nd), promethium (Pm), samarium (Sm), europium (Eu), gadolinium (Gd), terbium (Tb), dysprosium (Dy), holmium (Ho), erbium (Er), Thullium (Tm), ytterbium (Yb), lutetium (Lu) and didymium which is a mixture of various rare earth metals; and actinide metals such as actium (Ac), thorium (Th), protoactinium (Pa), neptunium (Np), plutonium (Pu), americium (Am), curium (Cm), berkelium (Bk), californium (Cf), einsteinium (E), fermium (Fm), mendelevium (Md), nobelium (No) and a mixture of two or more of these actinide metals may be used. Particularly preferable trivalent metals are aluminum, titanium, vanadium, chromium, manganese, iron, cobalt and nickel.

Any divalent inorganic ion may be used as $A^{2-}$. As such inorganic ions oxyacid radicals of sulfur, selenium, tellurium (Te), phosphrus, silicon, germanium, tin, boron, indium, yttrium, gallium (Ga), scandium (Sc) chromium, molybdenum, tungsten, manganese, ruthenium (Ru), rhodium, osmium and uranium may be named. Specific examples of such oxyacid radicals are $S_2O_3^=$, $SO_3^=$, $S_2O_6^=$, $SO_4^=$, $SeO_3^=$, $SeO_4^=$, $TeO_4^=$, $TeO_3^=$, $HPO_4^=$, $NH_4PO_4^=$, $SiO_3^=$, $B_4O_7^=$, $CrO_4^=$, $Cr_2O_7^=$, $MoO_4^=$, $Mo_2O_7^=$, $SnO_3^=$, $MnO_4^=$, $UO_4^=$, and $UO_6^=$. Also halogenic acid radicals of the above-mentioned metals such as $GeF_6^=$, $ZrF_6^=$, $SiF_6^=$, $SnF_6^=$, $TiF_6^=$, $PtBr_6^=$, and $SbF_5^=$; and $S^=$, $CO_3^=$, $CS_3^=$ and $Pt(CN)_4^=$ can be exemplified. Particularly preferable divalent inorganic ions are $CO_3^=$, $CrO_4^=$, $Cr_2O_7^=$, $B_4O_7^=$, $MoO_4^=$, $SeO_3^=$, $SeO_4^=$, $SiO_3^=$, $SO_3^=$ and $SO_4^=$.

Composite metal hydroxides of above formula (1) can possess a layer crystal structure when $x$, $y$, $z$ and $a$ satisfy the requirements defined by the above-mentioned unequations. In composite metal hydroxides of this invention, $x$, $y$, $z$ and $a$ stand most preferably for the following numbers:

$x = 4 - 8$, $y = 2$, $z = 0.7 - 1.4$ and $a = 3 - 5$

In this case the composite metal hydroxides are expressed by the following composition formula:

$M_{4-8}^{2+} M_2^{3+} (OH)_{12-20}(A^{2-})_{0.7-1.4} \cdot 3-5H_2O$.

It has been found, however, that composite metal hydroxides can have a definite layer crystal structure if $x$, $y$, $z$ and $a$ are not such positive numbers but they are numbers with certain ranges. Values of $x$ and $y$ may be varied broadly within the range satisfying the requirement of $1/4 \leq x/y \leq 8$, but in general a good crystal structure is attained within the range of $1.0 \leq x/y \leq 8$. It is particularly preferable that the values of $x$ and $y$ are within the range satisfying $1.2 \leq x/y \leq 3.2$.

References are made to accompanying drawings for a better illustration of this invention.

FIGS. 1-A and 1-B set forth diagrams of $Ni_xFe_y(OH)_{2x+3y-2z}(CO_3)_z \cdot aH_2O$ and $Zn_xAl_y(OH)_{2x+3y-2z}(CO_3)_z \cdot aH_2O$ drawn based on Vegard's rule.

FIG. 2 is a X-ray diffraction diagram of $Ni_6Al_2(OH)_{16}(CO_3) \cdot 4H_2O$.

Figure 3:
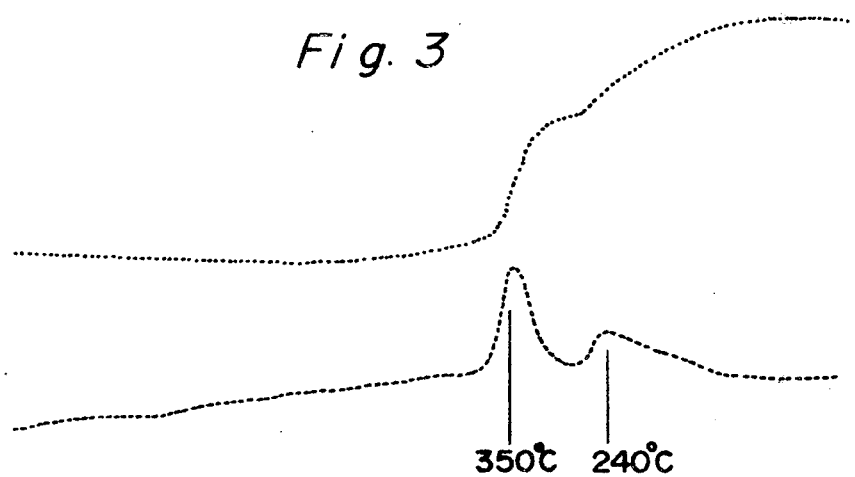

FIG. 3 sets forth differential thermal analysis and thermogravimetric analysis diagrams of $Ni_6Al_2(OH)_{16}(CO_3) \cdot 4H_2O$.

Figure 4:
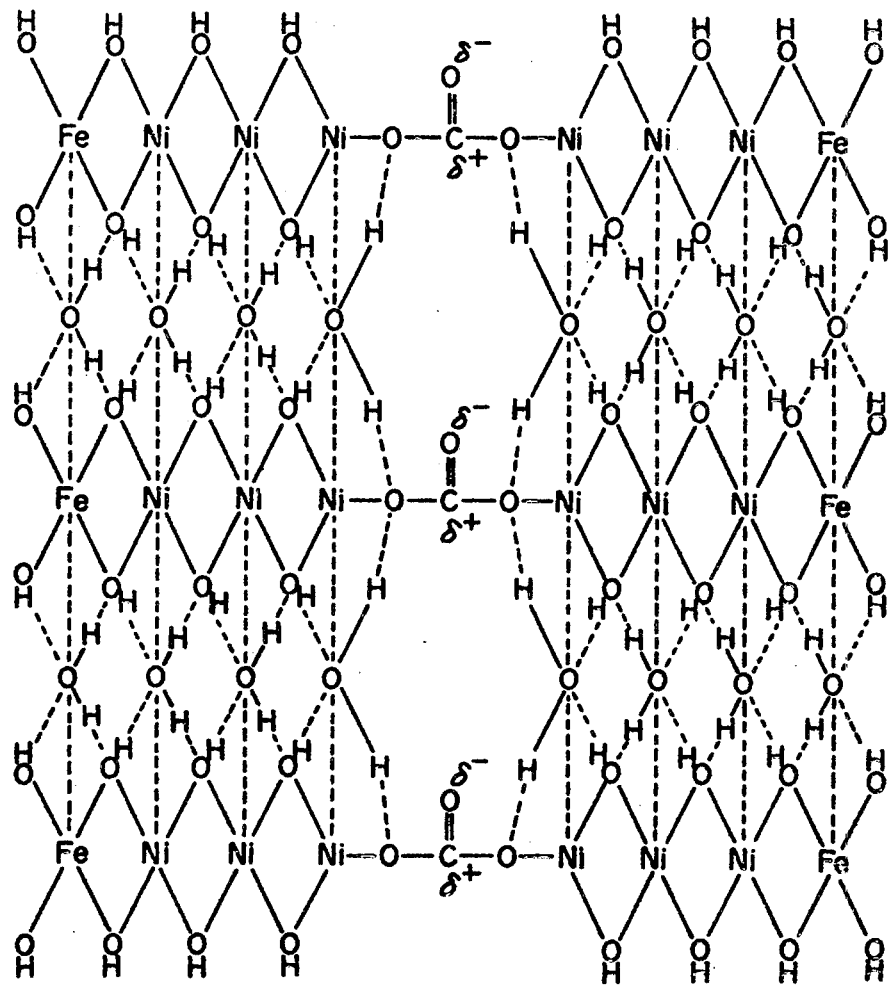

FIG. 4 is a diagram illustrating a presumed structure of $Ni_6Fe_2(OH)_{16}(CO_3) \cdot 4H_2O$ according to this invention.

With reference to, for instance, $Ni_xFe_y(OH)_{2x+3y-2z}(CO_3)_z \cdot aH_2O$ and $Zn_xAl_y(OH)_{2x+3y-2z}(CO_3)_z \cdot aH_2O$, the relation between the space distance $d(A)$ and the value of $x/y$ is shown by curves A and B in FIG. 1. From these curves it is seen that the critical point of the composition resides at the point of $M^{2+}/(M^{3+}+M^{2+}) = x/(x+y) = 2/3-4/5$, i.e., $M^{2+}/M^{3+} = x/y = 2-4$, and that when the value of $M^{2+}$, i.e., $x$ becomes great beyond this point, the space distance becomes relatively large and when $M^{3+}$, i.e., $y$ becomes great beyond this point, the space distance $d$ becomes small. This tendency is one the general properties of natural minerals forming a mixed crystal. Thus it is apparent that in the case of $x/y = 3$, composite metal hydroxides of this invention form a crystal and in other cases they may form a mixed crystal. The determination of the space density $d$ was effected by X-ray diffraction on samples prepared by dropping $M^{2+}$, $M^{3+}$ and $A^{2-}$ each in an aqueous medium, and NaOH aqueous solution from different burettes while controlling the pH to 9 – 12, filtering the reaction product suspension, and washing and drying the resulting precipitate.

From the above-mentioned facts it is concluded that crystal lattice points of $M^{2+}$ and $M^{3+}$ may be replaced by $M^{3+}$ and $M^{2+}$, respectively and that with respect to each of $M^{2+}$, $M^{3+}$ and $A^{2-}$, two or more ions may be introduced into one crystal lattice point. In general, formation of a mixed crystal is possible within a range of $1/4 \leq x/y \leq 8$.

As is seen from the date shown in Table 1, it is generally necessary that the requirement of $A^{2-}/(M^{2+}+M^{3+}) = z/(x+y) \geq 1/20$ be satisfied. Considering the crystallinity of products, it is allowable that the quantitative relation among $x$, $y$ and $z$ is within the range of $z/(x+y) \geq 1/200$ but it is particularly preferred that the requirement of $z/(x+y) \geq 1/20$ is satisfied. By X-ray diffraction it was confirmed that each of the sample shown in Table 1 was a composite metal hydroxide falling within the scope of this invention.

Table 1

| Sample No. | Chemical Analysis Values (molar ratio) | | | $A^{2-}/(M^{2+}+M^{3+})$ $=z/(x+y)$ | Crystallinity (relative value of peak height at (006) face) |
|---|---|---|---|---|---|
| | Zn | Al | $SO_3$ | | |
| 1 | 6.0 | 2 | 1 | 1/8 | 38.7 |
| 2 | 6.2 | 2 | 0.82 | 1/10 | 28.1 |
| 3 | 6.0 | 2 | 0.40 | 1/20 | 25.9 |
| 4 | 6.0 | 2 | 0.004 | 1/200 | 11.4 |
| 5 | 4.0 | 2 | 0.3 | 1/20 | 25.3 |
| 6 | 8.0 | 2 | 0.5 | 1/20 | 24.1 |

It is generally difficult to increase the value of $z/(x+y)$ over one-sixth. In the composite metal hydroxides of this invention it is particularly preferred that the inequality of $1/8 \geq z/(x+y) \geq 1/10$ be satisfied.

As is seen from the data shown in Table 2, within a range forming a mixed crystal, the value of the $a/(x+y)$ is about one-half in most of products. Even in products having a lower crystallinity the value is not smaller than 0.25 and in products having an anion of a larger radius within the range forming a mixed crystal the value is close to 1. Accordingly, it is essential that the condition of $0.25 \leq a/(x+y) \leq 1.0$ be satisfied. The amount of crystal water was determined by the thermogravimetric analysis, when the data of Table 2 were obtained.

Table 2

| Sample No. | $M^{2+}$ $x$ | $M^{3+}$ $y$ | $A^{2-}$ | Crystal water ($a$) | $a/(x+y)$ | $x/y$ |
|---|---|---|---|---|---|---|
| 1 | 8Cu | 2Al | $CO_3$ | 3.0 | 0.30 | 4 |
| 2 | 10Zn | 2Al | $SO_3$ | 4.2 | 0.35 | 5 |
| 3 | Ni | 4Al | $CO_3$ | 2.3 | 0.46 | ½ |
| 4 | 2Ni | 2Al | $CO_3$ | 1.9 | 0.47 | 1 |
| 5 | 4Ni | 2Al | $CO_3$ | 3.0 | 0.50 | 2 |
| 6 | 6Ni | 2Al | $CO_3$ | 4.0 | 0.50 | 3 |
| 7 | 8Ni | 2Al | $CO_3$ | 5.0 | 0.50 | 4 |
| 8 | 10Ni | 2Al | $CO_3$ | 5.5 | 0.46 | 5 |
| 9 | 16Ni | 2Al | $CO_3$ | 7.7 | 0.43 | 8 |
| 10 | 6Ni | 2Al | $WO_3$ | 5.6 | 0.70 | 3 |
| 11 | 6Ni | 2Al | $B_4O_7$ | 7.7 | 0.96 | 3 |

With reference to the values of $x$, $y$, $z$ and $a$ of formula (1), individual values of $x$, $z$ and $a$ can be determined from the above-mentioned inequality formulas by giving a value of 2 to $y$ for convenience's sake.

In suitable composite metal hydroxides of this invention, when the divalent metal $M^{2+}$ is zinc, cadmium, beryllium, calcium or barium, values of $x$, $y$, $z$ and $a$ are as follows;

$y = 2, x = 2 - 16, z = 0.5 - 2.5, 2x + 3y - 2z = 7.5 - 34$, and $a = 1.5 - 6$, and when $M^{2+}$ is other than zinc, cadmium, beryllium, calcium and barium, values of $x$, $y$, $z$ and $a$ are as follows;

$y = 2, x = 2 - 8, z = 0.5 - 1.4, 2x + 3y - 2z = 7.5 - 20$, and $a = 1.5 - 5$.

Typical examples of such preferable composite metal hydroxides are shown below:

a. Composite metal hydroxides having a composition expressed by the formula
$$M_{2-8}^{2+}Al_2(OH)_{7.5-20}A_{0.5-1.4}^{2-} \cdot 1.5-5H_2O$$
wherein $M^{2+}$ is selected from iron, cobalt and nickel, and $A^{2-}$ is selected from $CO_3^=$, $CrO_4^=$, $Cr_2O_7^=$, $MoO_4^=$, $SeO_4^=$, $SO_3^=$, $SO_4^=$, $SiO_3^=$ and $B_4O_7^=$.

b. Composite metal hydroxides having a composition expressed by the formula
$$M_{2-16}^{2+}Al_2(OH)_{7.5-34}A_{0.5-2.5} \cdot 1.5-6H_2O$$
wherein $M^{2+}$ is selected from zinc and cadmium, and $A^{2-}$ is selected from $CO_3$, $CrO_4^=$, $Cr_2O_7^=$, $MoO_4^=$, $SeO_4^=$, $SO_3^=$, $SO_4^=$, $SiO_3^=$ and $B_4O_7^=$.

c. Composite metal hydroxides having a composition expressed by the formula
$$Cu_{2-8}Al_2(OH)_{7.5-20}A_{0.5-1.4}^2 \cdot 0 \cdot 1.5-5H_2O$$
wherein $A^{2-}$ is selected from $CO_3^=$, $CrO_4^=$, $Cr_2O_7^=$, $MoO_4^=$, $SeO_4^=$, $SO_3^=$, $SO_4^=$, $SiO_3^=$ and $B_4O_7^=$.

d. Composite metal hydroxides having a composition expressed by the formula
$$Be_{2-16}Al_2(OH)_{7.5-34}A_{0.5-2.5}^{2-} \cdot 1.5-6H_2O$$
wherein $A^{2-}$ is selected from $CO_3^=$, $CrO_4^=$, $Cr_2O_7^=$, $MoO_4^=$, $SeO_4^=$, $SO_3^=$, $SO_4^=$, $SiO_3^=$ and $B_4O_7^=$.

e. Composite metal hydroxides having a composition expressed by the formula
$$M_{2-16}^{2+}Al_2(OH)_{7.5-34}A_{0.5-2.5}^{2-} \cdot 1.5-6H_2O$$
wherein $M^{2+}$ is selected from calcium, strontium and barium, and $A^{2-}$ is selected from $CO_3^=$, $CrO_4^=$, $Cr_2O_7^=$, $MoO_4^=$, $SeO_4^=$, $SO_3^=$, $SO_4^=$, $SiO_3^=$ and $B_4O_7^=$.

f. Composite metal hydroxides having a composition expressed by the formula
$$M_{2-16}^{2+}M_2^{3+}(OH)_{7.5-20}A_{0.5-1.4}^{2-} \cdot 1.5-5H_2O$$
wherein $M^{2+}$ is selected from iron, cobalt, and nickel, $M^{3+}$ is selected from iron, cobalt and nickel, and $A^{2-}$ is selected from $CO_3^=$, $CrO_4^=$, $Cr_2O_7^=$, $MoO_4^=$, $SeO_4^=$, $SO_3^=$, $SO_4^=$, $SiO_3^=$ and $B_4O_7^=$.

g. Composite metal hydroxides having a composition expressed by the formula
$$M_{2-16}^{2-}M_2^{3+}(OH)_{7.5-34}A_{0.5-2.5}^{2+} \cdot 1.5-6H_2O$$
wherein $M^{2+}$ is selected from zinc and cadmium, $M^{3+}$ is selected from iron, cobalt and nickel, and $A^{2-}$ is selected from $CO_3^=$, $CrO_4^=$, $Cr_2O_7^=$, $MoO_4^=$, $SeO_4^=$, $SO_3^=$, $SO_4^=$, $SiO_3^=$ and $B_4O_7^=$.

h. Composite metal hydroxides having a composition expressed by the formula
$$Cu_{2-8}M_2^{3+}(OH)_{7.5-20}A_{0.5-1.4}^{2-} \cdot 1.5-5H_2O$$
wherein $M^{3+}$ is selected from iron, cobalt and nickel, and
$A^{2-}$ is selected from $CO_3^=$, $CrO_4^=$, $Cr_2O_7^=$, $MoO_4^=$, $SeO_4^=$, $SO_3^=$, $SO_4^=$, $SiO_3^=$ and $B_4O_7^=$.

i. Composite metal hydroxides having a composition expressed by the formula
$$Be_{2-16}M_2^{3+}(OH)_{7.5-34}A_{0.5-2.5}^{2-} \cdot 1.5-6H_2O$$
wherein $M^{3+}$ is selected from iron, cobalt and nickel, and
$A^{2-}$ is selected from $CO_3^=$, $CrO_4^=$, $Cr_2O_7^=$, $MoO_4^=$, $SeO_4^=$, $SO_3^=$, $SO_4^=$, $SiO_3^=$ and $B_4O_7^=$.

j. Composite metal hydroxides having a composition expressed by the formula
$$M_{2-16}^{2+}M_2^{3+}(OH)_{7.5-34}A_{0.5-2.5}^{2-} \cdot 1.5-6H_2O$$
wherein $M^{2+}$ is selected from calcium, strontium and barium, $M^{3+}$ is selected from iron, cobalt and nickel, and $A^{2+}$ is selected from $CO_3^=$, $CrO_4^=$, $Cr_2O_7^=$, $MoO_4^=$, $SeO_4^=$, $SO_3^=$, $SO_4^=$, $SiO_3^=$ and $B_4O_7^=$.

k. Composite metal hydroxides having a composition expressed by the formula
$$M_{2-8}^{2+}Cr_2(OH)_{7.5-20}A_{0.5-1.4}^{2-} \cdot 1.5-5H_2O$$
wherein $M^{2+}$ is selected from iron, cobalt, nickel and copper, and $A^{2-}$ is selected from $CO_3^=$, $CrO_4^=$, $Cr_2O_7^=$, $MoO_4^=$, $SeO_4^=$, $SO_3^=$, $SO_4^=$, $SiO_3^=$ and $B_4O_7^=$.

l. Composite metal hydroxides having a composition expressed by the formula
$$M_{2-16}^{2+}Cr_2(OH)_{7.5-34}A_{0.5-2.5}^{2-} \cdot 1.5-6H_2O$$
wherein $M^{2+}$ is selected from zinc, cadmium, beryllium, calcium, strontium and barium, and $A^{2-}$ is selected from $CO_3^=$, $CrO_4^=$, $Cr_2O_7^=$, $MoO_4^=$, $SeO_4^=$, $SO_3^=$, $SO_4^=$, $SiO_3^=$ and $B_4O_7^=$.

m. Composite metal hydroxides having a composition expressed by the formula
$$M_{2-8}^{2+}M_2^{3+}(OH)_{7.5-20}A_{0.5-1.4}^{2-} \cdot 1.5-5H_2O$$
wherein $M^{2+}$ is selected from iron, cobalt, nickel and copper, $M^{3+}$ is selected from gallium, soandum, idium and yttrium, and $A^{2-}$ is selected from $CO_3^=$, $CrO_4^=$, $Cr_2O_7^=$, $MoO_4^=$, $SeO_4^=$, $SO_3^=$, $SO_4^=$, $SiO_3^=$ and $B_4O_7^=$.

n. Composite metal hydroxides having a composition expressed by the formula
$$M_{2-16}^{2+}M_2^{3+}(OH)_{7.5-34}A_{0.5-2.5}^{2-} \cdot 1.5-6H_2O$$
wherein $M^{2+}$ is selected from zinc, cadmium, beryllium, strontium, barium and calcium, $M^{3+}$ is selected from gallium, scandium indium and yttrium, and $A^{2-}$ is selected from $CO_3^=$, $CrO_4^=$, $Cr_2O_7^=$, $MoO_4^=$, $SeO_4^=$, $SO_3^=$, $SO_4^=$, $SiO_3^=$ and $B_4O_7^=$.

o. Composite metal hydroxides having a composition expressed by the formula
$$M_{2-8}^{2+}Mn_2(OH)_{7.5-20}A_{0.5-1.4}^{2-} \cdot 1.5-5H_2O$$
wherein $M^{2+}$ is selected from iron, cobalt, nickel and copper, and $A^{2-}$ is selected from $CO_3^=$, $CrO_4^=$, $Cr_2O_7^=$, $MoO_4^=$, $SeO_4^=$, $SO_3^=$, $SO_4^=$, $SiO_3^=$, and $B_4O_7^=$.

p. Composite metal hydroxides having a composition expressed by the formula
$$M_{2-16}^{2+}Mn_2(OH)_{7.5-34}A_{0.5-2.5}^{2-} \cdot 1.5-6H_2O$$
wherein $M^{2+}$ is selected from zinc, cadmium, beryllium, calcium, strontium and barium, and $A^{2-}$ is selected from $CO_3^=$, $CrO_4^=$, $Cr_2O_7^=$, $MoO_4^=$, $SeO_4^=$, $SO_3^=$, $SO_4^=$, $SiO_3^=$ and $B_4O_7^=$.

PHYSICAL AND CHEMICAL PROPERTIES OF COMPOSITE METAL HYDROXIDE

From the results of X-ray diffraction analysis, differential thermal analysis, thermogravimetric analysis and infrared absorption spectrum analysis it is construed that the novel composite metal hydroxides of this invention have a layer crystal structure in which crystal water is sandwiched in between layers and which is characterized by the lattice constant of $a_o = 3.1$ A and $C_o = 40 - 70$ A (varying depending on the kinds of metals and divalent anion). Data of X-ray diffraction (Cu $- K\alpha$) of $Zn_6Al_2(OH)_{16}SO_3 \cdot 4H_2O$, which is a typical example of the composite metal hydroxide of this invention, are shown in Table 3.

Table 3

| $d(A)$ | $2\theta$ | $I/I_o$ | hkl |
|---|---|---|---|
| 7.75 | 11.4 | 100 | 006 |
| 3.83 | 23.2 | 28 | 0012 |
| 2.60 | 34.4 | 10 | 024; 0.018 |
| 2.31 | 39.0 | 9 | |
| 1.95 | 46.5 | 9 | |
| 1.74 | 52.7 | 4 | |
| 1.64 | 56.1 | 4 | |
| 1.54 | 60.0 | 4 | 220 |
| 1.51 | 61.4 | 4 | 226 |

As described above, the values of the space distance $d$ and relative intensity $I/I_o$ vary depending on the kinds of $M^{2+}$, $M^{3+}$ and $A^{2-}$ and vary corresponding to the crystallinity. Although the distance at (006) face varies within a range of 3 - 4 A, it is possible to easily determine by the above-mentioned X-ray diffraction pattern whether a product falls within the scope of this invention or not. More specifically, the distance at each face of (006), (0012) and (0018) in Table 3 varies within the above-mentioned range particularly depending on the kind of divalent anion, but changes of other space distances are very small. Accordingly, the determination can be easily made by comparing the pattern of the part where $d$ is not greater than 2.31 A and confirming the integral-multiplication change of $d$ corresponding to (006), (0012) and (0018) faces. For reference, the X-ray diffraction pattern of $Ni_6Al_2(OH)_{16}CO_3 \cdot 4H_2O$ is shown in FIG. 2. Further, the determination can be performed based on the data of infra-red absorption spectrum analysis (those of $Ni_6Al_2(OH)_{16}CO_3 \cdot 4H_2O$ are shown in Table 4) and data of differential thermal analysis (D. T. A.) and thermogravimetric analysis (T. G. A.) (those of $Ni_6Al_2(OH)_{16}CO_3 \cdot 4H_2O$ are shown in Table 5). Results of differential thermal analysis and thermogravimetric analysis of $Ni_6Al_2(OH)_{16}CO_3 \cdot 4H_2O$ are shown in FIG. 3. The measurement was conducted at a temperature elevating rate of 5°C/min in the air by using $\alpha\text{-}Al_2O_3$ as a standard substance.

Table 4

| Wavelength (cm$^{-1}$) | Absorbed Functional Group |
|---|---|
| 2500 - 3800 | OH.H$_2$O (indicating hydrogen bond) |
| 1630 | OH.H$_2$O |
| 1370 | CO$_3$ of NiCO$_3$ |
| 740 | CO$_3$ of NiCO$_3$ |
| 600 | CO$_3$ of NiCO$_3$ |

Table 5

| | Peak Temp. (°C) | Escaping Substance | Weight Decrease (%) | |
|---|---|---|---|---|
| | | | found | calculated |
| First endothermic peak | 230 | 4H$_2$O | 8.7 | 8.9 |
| Secondary endothermic peak | 370 | 8H$_2$O + CO$_2$ | 23.0 | 23.2 |
| Total amount decrease by heat treatment | | | 31.9 | 32.1 |

The composition of the composite metal hydroxide can be confirmed by the ageement of the found value of the weight decrease with the calculated value in Table 5. Of course, these data vary depending on the kinds of $M^{2+}$, $M^{3+}$ and $A^{2-}$, the crystallinity and the ratio of $x/y$.

As is seen from Table 5, the composite metal hydroxides of this invention exhibit an endothermic peak owing to isolation of crystal water at a temperature higher than 170°C., generally in the range of 200° to 350°C., in the differential thermal analysis. In other words, one of characteristics of the novel composite metal hydroxides of this invention is that the isolation of crystal water occurs at such high temperatures, e.g., exceeding 200°C.

If an explanation is made by referring to $Ni_6Fe_2(OH)_{16}CO_3 \cdot 4H_2O$ as an example, the composite metal hydronide of this invention are construed to have a structure shown in FIG. 4, though this invention is not limited to that structure alone. More specifically, in the novel composite metal hydroxides of this invention, it is presumed that $M^{2+}(OH)_2$ is polymerized by the Ol linkage to form an oligomer such as trimer, $M^{3+}(OH)_3$ is polymerized as comonomer with the oligomer, and the divalent anion $A^{2-}$ is linked with the oligomer of $M^{2+}(OH)_2$, whereby the skeleton of the layer structure is formed. Further, water is interposed between the so formed layers and layers are bonded to each other by the hydrogen bond and coordination bond.

It is allowable that a part of the divalent metal $M^{2+}$ is substituted by the trivalent metal $M^{3+}$, and it is naturally considered that the amount of crystal water sandwiched in between layers may be varied depending on the ion radius of the divalent anion $A^{2-}$.

The stabe crystal structure of the novel substance of this invention will be apparent from the above rationation.

Synthesis of Composite Metal Hydroxide

In accordance with this invention, a process is provided for the preparation of composite metal hydroxides having a layer crystal structure and being expressed by the following composition formula:

$$M_x^{2+}M_y^{3+}(OH)_{2x+3y-2z}(A^{2-})_z \cdot aH_2O$$

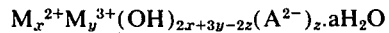

wherein $M^{2+}$ is a divalent metal selected from the group cnsisting of copper, beryllium, calcium, strontium, barium, zinc, cadmium, tin, lead, manganese and metals of group VIII of the Periodic Table: $M^{3+}$ is a trivalent metal selected from the group consisting of metals of group III of the Periodic Table, titanium, metals of group V of the Periodic Table, chromium, manganese, metals of group VIII of the Periodic Table, rare earth metals and actinide metals; $A^{2-}$ stands for a divalent inorganic ion; and $x, y, z$ and $a$ are positive numbers satisfying the requirements expressed by the following formulas:

$$1/4 \leq x/y \leq 8,$$
$$1/6 > \frac{z}{x+y} > 1/20$$

and $$0.25 \leq \frac{a}{x+y} \leq 1.0$$

such process comprising reacting (1) $x$ moles of a hydroxide of the divalent metal $M^{2+}$ or a compound capable of forming the hydroxide under reaction conditions and (2) $y$ moles of a hydroxide of the trivalent metal $M^{3+}$ or a cmpound capable of forming the hydroxide under reaction conditions in the presence of at least $z$ moles of the divalent ion $A^{2-}$ and water at a pH exceeding 7 and a temperature ranging from $\theta$ to 350°C. under such conditions that the requirement expressed by the formula:

$$pS_1 - pS_2 > -6$$

wherein $pS_1$ stands for the stability constant of $M^{2+}(OH)_2$ and $pS_2$ stands for the stability constant of $M^{2+}A^{2-}$, is satisfied.

In the aqueous or water-containing organic solvent medium containing $M^{2+}$, $M^{3+}$, $A^{2-}$ and $OH^-$, the following two reactions must be considered:

$$M^{2+} + 2OH^- \rightarrow M^{2+}(OH)_2 \quad (I)$$

$$M^{2+} + A^{2-} \rightarrow M^{2+}A^{2+} \quad (II)$$

When the reaction of formula (II) occurs predominantly over the reaction of formula (I), the first condition for arriving at the structure of the product of this invention is not satisfied. Accordingly, it is necessary that the reaction conditions must be maintained such that the reaction of formula (I) occurs preferentially. These reaction condititons are determined by the difference in the stability constant between the hydroxide $M^{2+}(OH)_2$ and the metal salt $M^{2+}A^{2-}$. The stability constant is defined as follows:

Stability products (S) of $M^{2+}(OH)_2$ and $M^{2+}A^{2-}$ are expressed as follows:

$$[M^{2+}][OH^-] = S_1$$
$$[M^{2+}][A^{2-}] = S_2$$

The stability is expressed in terms of the reciprocal of the solubility product, i.e., the dissociation constant. Thus the solubility constant (K) is shown as follows:

$$K_1 = \frac{[M^{2+}(OH^-)_2]}{[M^{2+}][OH^-]^2} = \frac{1}{S_1}, \quad K_2 = \frac{[M^{2+}A^{2-}]}{[M^{2+}][A^{2-}]} = \frac{1}{S_2}$$

when the above solubility constants are expressed logarithmically, the following formulas are derived:

$$\log K_1 = -\log S_1 = pS_1$$
$$\log K_2 = -\log S_2 = pS_2$$

The reaction conditions can be determined based on these solubility constants $pS_1$ and $pS_2$.

In order to cause preferential occurrence of formation of $M^{2+}(OH)_2$, it is necessary to conduct the reaction at a pH precipitating a desired amount of the hydroxide. Values of such pH can be calculated based on the teachings of various references.

As described above, the reaction conditions are determined based on the difference of the stability constant between $M^{2+}(OH)_2$ and $M^{2+}A^{2-}$. For instance, when the amount of $OH^-$ fed is almost equivalent to $M^{2+}$ and $M^{3+}$, the following three cases result:

1. $pS_1 - pS_2 \geq 1$;
   In this case, the reaction of formula (1) advances preferentially, and all the reaction product is the intended product and no by-product is formed.
2. $1 > pS_1 - pS_2 > -6$
   In this case, the reaction product is a mixture of the intended product and $M^{2+}A^{2-}$.
3. $pS_1 - pS_2 \leq -6$
   In this case, only $M^{2+}A^{2-}$ is formed and the intended hydroxide is not formed.

In order to prevent the formation of $M^{2+}A^{2+}$ in the case of (2), it is advantageous to conduct the reaction in the presence of $OH^-$ in an amount from about 2 to about 80 times as large as the amount required for precipitating $M^{2+}$ as the hydroxide under the condition of $z/(x + y) \leq 1/8$. The competition degree of the reactions of formulas (I) and (II) can be contemplated from $pS_1 = pS_2 = K$. Accordingly, optimum conditions for forming and manufacturing the intended AM products can be determined. These conditions are shown in Table 6.

Table 6

| Value of K | $OH^-$ feed to $(M^{2+}+M^{3+})$ | $A^{2-}$ feed | Continuous Process | | |
| --- | --- | --- | --- | --- | --- |
| | | | Desired temperature (°C) | $OH^-$ feed to $(M^{2+} + M^{3+})$ optimum for attaining high crystallinity | Yield of AM product (%) |
| $K \geq 1$ | almost equivalent | $z(x+y)$ 1/20 | below about 100 | almost equivalent | 100 |
| $1 > K \geq -1$ | almost equivalent | 1/20 $z/(x+y)$ 1/8 | below about 60 | 5 – 10 equivalents | about 100 |
| $-> K \quad -6$ | more than equivalent | 1/20 $z/(x+y)$ 1/8 | below about 30 | 10 – 40 equivalents | more than 80 |
| $-6 > K$ | more than equivalent | 1/20 $z/(x+y)$ 1/8 | as low as possible | as much as possible | less than 50 |

Note: Under the condition of $-6 > K$ formation of the AM product is apparently observed, but in view of the yield and from the economical view point, it is preferred that the reaction is conducted under the condition of $K \geq -6$.

The results of reactions which were conducted under such conditions by employing equivalent amounts of the metal salt and alkali are shown in Table 7.

Table 7

| Reaction system | $pS_1$ | $pS_2$ | $pS_1-pS_2$ | Final reaction product (typical form) |
|---|---|---|---|---|
| $Ni^{2+}, CO_3^{2-}, Al^{3+}$ | 14.3 | 8.2 | 6.1 | $Ni_6Al_2(OH)_{16}CO_3\cdot 4H_2O$ |
| $Zn^{2+}, CO_3^{2-}, Al^{3+}$ | 15.3 | 10.0 | 5.3 | $Zn_6Al_2(OH)_{16}CO_3\cdot 4H_2O$ |
| $Cd^{2+}, CO_3^{2-}, Al^{3+}$ | 13.6 | 13.6 | 0 | $Cd_6Al_2(OH)_{16}CO_3\cdot 4H_2O +$ $CdCO_3$ (trace) |
| $Ca^{2+}, CO_3^{2-}, Al^{3+}$ | 5.3 | 7.6 | −2.3 | $Ca_6Al_2(OH)_{16}CO_3\cdot 4H_2O +$ $CaCO_3$ (by-product) |
| $Ba^{2+}, CO_3^{2-}, Al^{3+}$ | 1.1 | 8.3 | −7.2 | $BaCO_3$ |

As the starting compound of the divalent metal $M^{2+}$ used in the process of this invention, hydroxides of the divalent metal $M^{2+}$ and compounds capable of forming such hydroxides under the reaction conditions can be used. Typical examples of such compounds are water-soluble inorganic salts of the divalent metal $M^{2+}$ such as mineral acid salts, e.g., nitrates, halides and sulfates; carbonates and basic carbonates of the divalent metal $M^{2+}$; carboxylates of the divalent metal $M^{2+}$ such as acetates; and alkoxides of the divalent metal $M^{2+}$. As the starting compound of the trivalent metal $M^{3+}$, hydroxides of the trivalent metal $M^{3+}$ and compounds capable of forming such hydroxides under the reaction conditions may be used. As in the case of the divalent metal $M^{2+}$, such compounds may be exemplified as mineral acid salts of the trivalent metal $M^{3+}$ such as nitrates, halides and sulfates; carbonates and basic carbonates of the trivalent metal $M^{3+}$; carboxylates of the trivalent metal $M^{3+}$ such as acetates; and alkoxides of the trivalent metal $M^{3+}$. It is also possible to use double salts of hydroxides of trivalent metal $M^{3+}$ and alkali carbonates.

In accordance with the process of this invention, the above-mentioned starting compounds of the divalent metal and the above-mentioned starting compounds of the trivalent metal are reacted in the presence of water and of at least z moles of the divalent ion $A^{2-}$ at a pH exceeding 7.

When starting compounds of the divalent metal $M^{2+}$ and/or the trivalent metal $M^{3+}$ are salts of the divalent ion $A^{2-}$, it is possible to omit addition of the divalent inorganic ion $A^{2-}$. Further, it is possible to add the divalent inorganic ion $A^{2-}$ in the form of an acid or salt, particularly an alkali metal salt, to the reaction system.

The adjustment of the pH may be performed by adding to the reaction system caustic alkali, alkali carbonate, ammonium hydroxide, ammonium carbonate and the like. In this invention, it is generally preferred that the pH is adjusted within the range of from 9 to 12, though the preferable range of the pH varies to some extent depending on the kind of trivalent metal $M^{3+}$.

In general, the reaction is conducted in water, but it is possible to conduct the reaction by using as the reaction medium a mixture of water and an organic solvent, for instance, a water-miscible organic solvent such as lower alcohols. The reaction is carried out at temperatures ranging from 0° to 350°C., preferably from 0° to 100°C.

Typical reactions indicated in Tables 6 and 7 are described below:

Reaction 1

The reaction is conducted in an aqueous medium containing 0.6 mole per liter of $Ni^{2+}$, 0.2 mole per liter of $Al^{3+}$, 0.1 mole per liter of $Na_2CO_3$ and 1.6 moles per liter of $OH^-$. The quantitative relation among the starting materials is as follows:

$CO_3^{2-}(z)/(x+y) = 1/7$ (molar ratio)

$OH^-$ is equivalent to $(M^{2+} + M^{3+})$.

$K(pS_1 - pS_2) = 6.1$

Reaction 2

The reaction is conducted in an aqueous medium containing 0.6 mole per liter of $Cd^{+2}$, 0.2 mole per liter of $Al^{+3}$, 0.1 mole per liter of $Na_2CO_3$ and 8.0 mole per liter of $OH^-$. The quantitative relation among the starting materials is as follows:

$CO_3^{2-}(z)/(x+y) = 1/8$ (molar ratio)

$OH^- = 5$ equivalents to $(M^{2+} + M^{3+})$; about 6 equivalent to $M^{2+}$ (calculated as being equivalent to $M^{3+}$)

$K(pS_1 - pS_2) = 0$

Reaction 3

The reaction is conducted in an aqueous medium containing 0.6 mole per liter of $Ca^{+2}$, 0.2 mole per liter of $Al^{3+}$, 0.05 mole per liter of $Na_2CO_3$ and 16 moles per liter $OH^-$. The quantitative relation among the starting compounds is as follows:

$CO_3^{2-}(z)/(x+y) = 1/16$ (molar ratio)

$OH^- = 10$ equivalents to $(M^{2+} + M^{3+})$; about 13 equivalents to $M^{2+}$ (calculated as being equivalent to $M^{3+}$)

The reaction temperature is 20°C. and incorporation of $CO_3^{2-}$ from a source other than the starting material is avoided. The value of K is −2.3.

Reaction 4

The reaction is conducted in an aqueous medium containing 0.6 mole per liter of $Ba^{2+}$, 0.2 mole per liter of aluminum, 0.04 mole per liter of $Na_2CO_3$ and 17 mole per liter of $OH^-$. The quantitative relation among the starting compounds is as follows:

$CO_3^{2-}(z)/(x+y) = 1/20$ (molar ratio)

$OH^- = 10.6$ equivalents to $(M^{2+} + M^{3+})$; about 14 equivalents to $M^{2+}$ (calculated as being equivalent to $M^{3+}$)

The reaction temperature is 5°C. and incorporation of $CO_3^{-2}$ from a source other than the starting compound is avoided. The value of K is −7.2.

In conducting the process of this invention, if divalent metals which are easily oxidized, such as $Fe^{2+}$, $Sn^{2+}$, $Co^{2+}$ and $Mn^{2+}$, are used, in order to shut off oxygen from the reaction system, it is necessary to conduct the reaction in an inert gas such as nitrogen gas or a reducing atmosphere. It is desired that similar care is taken during filtering, washing and drying steps after the reaction so as to prevent the oxidation completely. It is particularly preferable to incorporate $A^{2-}$ and $OH^-$ slightly excessively into the reaction system while preventing incorporation of $CO_3^{2-}$ from the air.

When $M^{2+}(OH)_2$ is partially dehydrated to form $M^{2+}O$ as in the case of $Zn(OH)_2$, $Cu(OH)_2$ or the like, it is preferred to conduct the reaction at a pH below 12.5 at a temperature not exceeding 60°C. When $M^{2+}(OH)_2$ are amphoteric hydroxides, such as $Pb(OH)_2$, $Zn(OH)_2$ and $Cu(OH)_2$, since they are dissolved at highpH, it is high pH, to conduct the reaction at a relatively low pH.

In AM products of this invention, $M^{3+}(OH)_3$ is interlocked in the crystal structure in the form of the monomer or oligomer. It is construed that the polymer end of $[M^{2+}(OH)_2]_n$ is structually stable due to such monomer or oligomer and that two of the $M^{3+}(OH)_3$ groups in neighbouring layers may form a hydrogen bond via crystal water, whereby the layer structure is fixed very tightly and stably. The following cases must be considered:

a. Since hydroxides of such trivalent metals as Fe and Cr are easily highly polymerized and the resulting high polymers are stable, these metal hydroxides are hardly present in the form of a monomer or oligomer, or they are not dissociated.

b. A trivalent metal does not form a hydroxide but a hydroxide halide [$M^{3+}(OH)_2Hal$] or an oxyhalide ($M^{3+}OHal$), or the hydroxide of the trivalent metal is acidic.

c. A hydroxide of the trivalent metal absorbs oxygen in the air to form a polyvalent hydroxide, as is shown below:

$Ti^{3+} \rightarrow Ti^{4+} + e$

In order to solve the problem of case (a), solutions of $M^{2+}$, $M^{3+}$ and $A^{2-}$ are contacted with one another continuously while maintaining a highly alkaline condition such as pH exceeding 13, or it is possible to conduct the reaction at a pH of 7 - 9. By such procedures, the high polymerization of $M^{3+}(OH)_3$ can be prevented. The above problem can be also solved by adding to the reaction system a polyhydric alcohol such as glycerine, mannitol and sorbitol, or conducting the reaction while blowing $CO_2$ into the reaction system.

When the reaction is carried out while increasing the pH by adding $OH^-$ and $A^{2-}$ dropurse to an aqueous solution of $M^{2+}$ and $M^{3+}$, the precipitation occurs at a pH of about 1.5 in the case of $Cr(OH)_3$, and the polymerization advances most highly at a pH ranging from 10 to 11. Accordingly, in such case, it is disadvantageous to use, in combination, a divalent metal hydroxide which requires completion of the reaction at a pH ranging from 10 to 11.

In order to solve the problem of case (b), it is preferred to add a complex-forming substance such as the above-mentioned polyhydric alcohols to thereby prevent formation of by-products. In the case of, for example, $Bi^{3+}$, BiOCl is formed as a stable by-product.

In order to solve the problems of case (c), it is preferred to conduct the reaction in the above-mentioned non-oxidizing atmosphere.

It is particularly advantageous to conduct the process of this invention by the continuous operation procedures. In this case, aqueous or water-containing alcoholic solutions each of $M^{2+}$, $M^{3+}$, $A^{2-}$ and $OH^-$ are separately prepared and used. It is also possible to use a combination of a mixed solution of $M^{2+}$ and $M^{3+}$ with a solution of $A^{2-}$ and a solution of $OH^-$ or with a mixed solution of $A^{2-}$ and $OH^-$.

In the case of a solution of an easily hydrolyzable metal component such as $Fe^{3+}$, $Cr^{3+}$ and $Sn^{2+}$, it is preferred to adjust the pH of the solution to less than 1 by addition of HCl, $HNO_3$ or $H_2SO_4$. In the case of a metal component easily precipitating as a carbonate or sulfate, such as $Pb^{2+}$, $Ca^{2+}$, $Sr^{2+}$ and $Ba^{2+}$, since the precipitate is easily formed by the change of the concentration in the solution and there is a danger of formation of such precipitate in a transmission tube to the reaction vessel, it is necessary to use decarbonated or desulfated water. In the case of a metal component forming a difficulty soluble salt with $Cl^-$, such as $Pb^{2+}$, it is necessary to reduce the $Cl^-$ concentration in water to such an extent that $PbCl_2$ will not be precipitated.

In supplying these solutions continuously to the reaction vessel, the solutions are introduced to the reaction vessel provided with a stirrer and a temperature controlling device of high accuracy at such feed rates that the above-mentioned conditions concerning x and y will be satisfied. As the pH of the reaction liquor greatly influences the quality of the product, it is preferred to control the pH change within a range of ±0.5, particularly ± 0.1. Each solution may be supplied through a conduit or sprayed from the top of the reaction vessel. The reaction is terminated when the amount of reaction mixture arrives at a certain level, and the reaction mixture is withdrawn from the reaction vessel. If desired, the agitation is conducted at a desired temperature for a certain period of time before the withdrawal of the reaction mixture. The recovered reaction mixture is subjected to solid-liquid separation. The solid is washed with waer and is dried at a temperature not causing isolation of crystal water, preferably under reduced pressure. It is particularly advantageous to keep the amount of reaction mixture constant by means of an overflow device mounted on the reaction vessel. In order to keep a homogeneous state in the reaction vessel, it is advantageous to mount pH meters on the upper and lower portions of the reaction vessel and select the reaction conditions so that both pH meters indicate the same value.

As the reaction apparatus, a tube recycle system connected with a centrifugal pump may be used. In this case, each solution is fed quantitatively to the suction side of the pump and the pH value is measured just after the extrusion side of the pump to adjust it to a desired value. The amount of reaction liquor circulated, the reaction temperature, the concentrations of starting compounds and the like are suitably arranged, and the reaction mixture in an amount corresponding to the amount of starting solutions fed is overflows. The above process is advantageous in that the space of the reaction apparatus is made smaller and the reaction liquor can be agitated vigorously in a small capacity. It is possible to use, instead of a centrifugal pump, an agitator used mainly for the pipe system or other liquid transmitting device. It is preferred that the starting solutions are fed in such amounts that the conditions of $x/y = 1 - 8$, especially $2 - 4$, and $z/(x + y) = 1 - 1/8$ will be satisfied.

With reference to the crystallinity of the product, it is preferable to use $A^{2-}$ in an amount slightly in excess of the amount required for the formation of the product. Accordingly, it is not absolutely necessary to make the ratio of feed materials strictly in accord with the composition in the product.

The process of this invention may also be conducted batchwise. In this case, various operation procedures such as described below may be adopted.

1. In the same manner as in the continuous process, a mixed solution of $M^{2+}$ and $M^{3+}$ in the form of water-soluble metal salts or organic compounds soluble in organic solvents is charged in a reaction vessel, and a solution of $A^{2-}$, and $OH^-$ in an amount almost equivalent to the sum of $M^{2+}$ and $M^{3+}$ is added while stirring. The resulting suspension is post-treated in the same manner as in the continuous process.
2. A solution of $OH^-$ is added to a solution of $M^{2+}$ to convert $M^{2+}$ almost completely to $M^{2+}(OH)_2$, or both solutions are added to the reaction vessel while maintaining the pH above the level converting $M^{2+}$ almost completely to $M^{2+}(OH)_2$. The resulting suspension of the divalent metal hydroxide is blended with solutions of $M^{3+}$, $A^{2-}$ and $OH^-$ under agitation.
3. A solution of $OH^-$ is added to an inorganic acid-acidified solution of compounds of $M^{2+}$, $M^{3+}$ and $A^{2-}$ under stirring.
4. A solution of $OH^-$ is added to a solution of $M^{2+}$ and $A^{2-}$, or both solutions are continuously blended while maintaining the pH at a prescribed level. To the resulting mixed liquor a solution of $M^{3+}$ and a solution of $OH^-$ are added.
5. $M^{2+}(OH)_2$, $M^{3+}(OH)_3$ and $A^{2-}$ are dissolved in an aqueous medium at elevated temperatures, and a solution of $OH^-$ is added to the resulting solution and the reaction is conducted preferably for 0.5 – 10 hours.
6. When starting compounds other than water-soluble metal salts and metal hydroxides are used, the pH and temperature are so selected that these starting compounds may be converted to hydroxides in an aqueous or organic solvent medium, and then the reaction is carried out in the same manner as in (5) above.

In these operations it is possible to add $M^{2+}$ and $M^{3+}$ to a solution of $OH^-$ and $A^{2-}$.

The continuous process will now be compared with the batchwise process by referring to sample procedures.

The pH is elevated from about 1 to values indicated in Table 8, while adding gradually a solution of $CO_3^{2-}$ and $OH^-$ dropwise to an aqueous solution of $Zn^{2+}$ and $Fe^{3+}$ in the batchwise procedure. The results are shown in Table 8 where results of the continuous procedure are also shown. In this case, the resulting product is $Zn_6Fe_2(OH)_{12}CO_3\cdot 3H_2O$.

Table 8

| pH of reation system | Crystallinity of product | |
|---|---|---|
| | Batchwise reaction | Continuous reaction |
| 8.5 | 1.0 | 1.8 |
| 9 | 1.7 | 6.3 |
| 10 | 4.8 | 14.6 |
| 11 | 5.0 | 14.8 |
| 12 | 1.7 | 11.7 |
| 13 | 3.4 | 10.7 |

The interrelation among reaction conditions in the continuous reaction, and the crystallinity and bulk density of the product are shown in Table 9. The product in this instance in $Ni_6Al_2(OH)_{16}CO_3\cdot 4H_2O$.

Table 9

| pH | Temp. (°C.) | Crystallinity | Bulk density (ml/g) |
|---|---|---|---|
| 7.5 | 25 | 5.9 | 3.0 |
| 8.5 | 25 | 9.2 | 2.7 |
| 10 | 25 | 12.0 | 3.5 |
| 11 | 25 | 9.2 | 1.7 |
| 13 | 25 | 6.0 | 1.2 |
| 10 | 58 | 9.8 | 3.6 |

As is seen from the above results, the crystallinity varies depending on the reaction type and reaction conditions, and at the same pH the continuous process gives better crystallinity than the batchwise process. In the continuous process, the crystallinity and properties of the product vary depending on the pH, and it is observed that difference in the color tone or the activity against acid is brought about by the change of the pH. By way of example, the relation between the crystallinity and the acid value after the adsorption treatment observed when $Zn_6Al_2(OH)_{16}\cdot 4H_2O$ prepared while varying the pH is used as an adsorbent, is shown in Table 10. The acid value after the adsorption treatment is determined in the following manner:

0.5 g of the product is added to 100 ml of dipropylene glycol ether (acid value = 0.5) containing dissolved therein acetic acid in an amount corresponding to 500 mg/liter of KOH, and the mixture is allowed to stand at 50°C. for 3 hours. The filtrate is titrated with alcoholic KOH by using phenol phthalene as an indicator to determine the remaining amount of acetic acid. The acid value is expressed in terms of milligrams of KOH required for neutralizing 1 ml of the filtrate.

Table 10

| pH | | Crystallinity | Acid value after adsorption treatment |
|---|---|---|---|
| 8.5 | | 8 | 0.4 |
| 9.5 | | 32 | 0.17 |
| 10 | | 37 | 0.08 |
| 11 | | 37 | 0.08 |
| 13 | | 32 | 0.16 |
| 10 | (batchwise) (process) | 13 | 0.3 |

Synthesis of Composite Metal Hydroxide by Ion Exchange

In accordance with this invention, a process is provided for the preparation of composite metal hydroxides having a layer crystal structure and being expressed by the following composition formula:

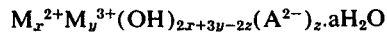

wherein $M^{2+}$ is a divalent metal selected from the group consisting of copper, beryllium, calcium, strontium, barium, zinc, cadmium, tin, lead, manganese and metals of group VIII of the Periodic Table; $M^{3+}$ is a trivalent metal selected from the group consisting of metals of group III of the Periodic Table, titanium, metals of group V of the Periodic Table, chromium, manganese, metals of group VIII of the Periodic Table, rare earth metals and actinide metals; $A^{2-}$ stands for a divalent inorganic ion; and $x$, $y$, $z$ and $a$ are positive numbers satisfying the requirements by the following formulas:

$$1/4 \leq x/y \leq 8,$$
$$1/6 > \frac{z}{x+y} > 1/20$$
and
$$0.25 \leq \frac{a}{x+y} \leq 1.0,$$

such process comprising contacting a composite metal hydroxide expressed by the composition formula:

$$M_x{}^{2+}M_y{}^{3+}(OH)_{2x+3y-2z}(E^{2-})_z \cdot aH_2O$$

wherein $M^{2+}$, $M^{3+}$, $x$, $y$, $z$ and $a$ are as defined above, and $E^{2-}$ stands for a divalent inorganic ion other than $A^{2-}$,
with an aqueous solution containing an excess of a salt expressed by the formula $$Q^1Q^2A^{2-}$$

wherein $A^{2-}$ is as defined above, $Q^1$ is selected from alkali metals and ammonium group, and $Q^2$ is selected from hydrogen atom, alkali metals and ammonium group.

In the above embodiment, a divalent inorganic ion ($E^{2-}$) other than $A^{2-}$, which satisfies the condition of $K = pS_1 - pS_2 \geq O$, is used, and the formation of a metal salt of $A^{2-}$ as a by-product can be efficiently prevented. In general, it is preferred that the anion exchange is conducted by a column method, but a solution method may be adopted. The anion exchange can be easily performed by contacting an aqueous solution containing the divalent inorganic anion to be introduced, in the form of, for instance, a sodium, potassium or ammonium salt, with the starting composite metal hydroxide containing a divalent inorganic anion different from the divalent inorganic anion to be introduced. When the solution of the divalent inorganic anion to be introduced is too acidic, there is a tendency that the starting composite metal hydroxide is dissolved therein. Accordingly, it is preferred that the contact is conducted under an alkaline condition, especially at a pH exceeding 8. In view of the treatment time, it is preferred that the concentration of the divalent inorganic ion in the solution to be used is at least 0.01 mole per liter. The contact may be effected at room temperature sufficiently, but when the contact is conducted at an elevated temperature ranging from 40° to 90°C., the time required for the contact can be generally shortened. By way of example, results of the ion exchange of $Ni_6Al_2(OH)_{16}CO_3 \cdot 4H_2O$ with various anions are shown in Table 11.

Table 11

| Anion added | $CO_2$ content (%) | X-ray intensity peak height on (006) face (relative value) |
|---|---|---|
| — | 7.3 | 16.2 |
| $CrO_4{}^{2-}$ | 0.09 | 13.0 |
| $SO_4{}^{2-}$ | 2.10 | 10.0 |
| $SO_3{}^{2-}$ | 0.04 | 15.7 |

Table 11-Continued

| Anion added | $CO_2$ content (%) | X-ray intensity peak height on (006) face (relative value) |
|---|---|---|
| $SeO_4{}^{2-}$ | 0.24 | 12.8 |
| $S_4O_7{}^{2-}$ | 3.0 | 12.0 |
| $TeO_3{}^{2-}$ | 0.92 | 11.5 |

For instance, the preparation of $Ca_6Al_2(OH)_{16}CO_3 \cdot 4H_2O$ is conducted in the following manner:

In the aqueous medium containing $Ca^{2+}$, $Al^{3+}$, $CrO_4{}^{2-}$ and $OH^-$, the blending is conducted while maintaining the pH of the reaction system at 13.5. As a result, $Ca_6Al_2(OH)_{16}CrO_4 \cdot 4H_2O$ is formed. When the above reaction is performed at a pH approximating 13.5, the condition of $K \geq O$ is satisfied without formation of $CaCrO_4$. Then the above metal hydroxide is packed in a column, and the ion exchange is effected with use of an aqueous solution containing 0.5 mole per liter of $Na_2CO_3$. As a result, the intended product can be obtained in a yield of 95% or more.

Post-treatments

The product obtained in accordance with the process of this invention is then subjected to hydrothermal treatment and heat aging treatment. The formation of crystals or growth of crystals is promoted, for instance, by treating an aqueous suspension of the product of this invention or a reaction suspension containing the product of this invention in an autoclave maintained at 100° – 350°C. under an elevated pressure below 300 atmospheres for 0.5 hour — several days, generally 20 – 50 hours. The heat aging treatment is performed by conducting the heating in a similar manner under atmospheric pressure. Although the heat aging treatment cannot increase the crystallinity so well as the hydrothermal treatment, this can be carried out simply without using any specific treatment device.

After such treatments, the product-containing suspension is cooled and filtered. The recovered product is washed and dried according to need. The post-treatments as well as the reaction may be conducted in an inert gas atmosphere so as to prevent oxidation. Additives such as polymerization inhibitors may be used during post-treatments.

By way of example, the change of the crystallinity by the post-treatment of the reaction suspension obtained in the preparation of $Ca_{10}Al_2(OH)_{23}3/2SO_4 \cdot 6H_2O$ and having the intended product concentration of 150 grams per liter, is shown in Table 12. The crystallinity is expressed in terms of a relative value of the reciprocal number of the half width at (006) face.

Table 12

| Temperature (°C.) | Pressure (atmosphere) | Time (hours) | Crystallinity (relative value) |
|---|---|---|---|
| 100 | 1 | 1 | 13.0 |
| 100 | 1 | 3 | 13.3 |
| 100 | 1 | 5 | 14.3 |
| 100 | 1 | 10 | 16.7 |
| 100 | 1 | 15 | 17.3 |
| 150 (hydrothermal treatment) | 5 | 15 | 20.0 |

Use

In composite metal hydroxides of this invention 2 or more elements are optionally combined in the crystal structure. Accordingly, this invention can provide products meeting various demands. For instance, the composite metal hydroxides of this invention are useful as intermediates of magnetic substances, adsorbents, dehydrating agents, divalent anion exchangers, catalysts, intermediates of catalysts, medicines such as antacids and astringents, excipients and pigmentary cosmetics. The utility of the products of this invention will now be described.

As a method of preparing ferrite, a low temperature homogeneous calcining method utilizing the coprecipitation technique is excellent, but this method involves problems concerning filtration and impurities and has various defects such as non-uniform growth of crystals. On the other hand, since the product of this invention is obtained by the solution reaction conducted at room temperature under atmospheric pressure, it has a structure that can be suitably converted to a highly magnetic spinel structure, $M^{2+}M_2^{3+}O_4$. Accordingly, the product of this invention is an excellent precursor leading to a highly magnetic substance of a spinel structure. Generally, the product of this invention is converted in a manner shown below by heating at relatively low temperatures:

$$M_x^{2+}M_y^{3+}(OH)_{2x+3y-2z}(CO_3)_z \cdot aH_2O$$
$$\rightarrow MO + M^{2+}M_2^{3+}O_4 + H_2O + CO_2$$

(wherein MO stands for an oxide of $M^{2+}$ or $M^{3+}$)

Main properties of magnetic substances are determined during the reaction stage. Accordingly, in this point the product of this invention is very advantageous, because the reaction controls can be easily conducted in this invention. Further, the product of this invention is excellent in filterability when compared with conventional hydroxides and is also excellent in that impurities, particularly alkali metals, are not appreciably incorporated in the product of this invention. Examples of the temperatures forming the spinel structure in the product of this invention are shown in Table 13 (according to X-ray diffraction conducted while elevating the temperature).

Table 13

| Product | Temperature (°C.) | Resulting magnetic substance |
|---|---|---|
| $Zn_6Al_2(OH)_{16}CO_3 \cdot 4H_2O$ | 430 | $ZnAl_2O_4 + ZnO$ |
| $Ni_2Fe_2(OH)_{10-2z}(CO_3)_z \cdot 9H_2O$ | 650 | $NiFe_2O_4$ |
| $CoFe_2(OH)_{8-2z}(CO_3)_z \cdot aH_2O$ | 520 | $CoFe_2O_4$ |
| $MnFe_2(OH)_{8-2z}(CO_3)_z \cdot aH_2O$ | 520 | $MnFe_2O_4$ |
| $Co_{0.5}Ni_{0.5}Fe_2(OH)_{8-2z}(CO)_z \cdot aH_2O$ | 550 | $CoNiFe_4O_8$ |

As the product of this invention is a solid which is either basic or acidic, it can be utilized for adsorption of both acidic and basic substances. In the product of this invention, the elution of metals is much lower and the adsorption efficiency is much higher than in conventional adsorbents. Further, the adsorption efficiency and selectivity can be optionally changed by changing the kinds and composition ratios of metals.

For instance, the Sr-Al composite hydroxide has a dual property as solid acid and solid base, and when the ratio of Sr and Al is changed, the property of either acid or base is increased. When an amphoteric metal such as zinc is used, the resulting composite metal hydroxide exhibits such amphoteric characteristics that it is acidic under an alkaline condition and is basic under an acidic condition. Further, the adsorbent property may be changed by varying the kind of anion. Even if crystal water once interposed between layers has been isolated in the product of this invention, when water is added thereto, crystal water is formed again in the original position of the crystal structure. In other words, the product of this invention has a substantially complete adsorbent capacity and possesses characteristics of a solid acid, solid base and dehydrating agent coincidentally in one crystal structure. Accordingly, the product of this invention is an adsorbent of great utility which can adsorb an acid, an alkali and water at the same time.

In order to confirm the reversibility of crystal water, T. G. A. measurement was conducted on sample (A) obtained by drying $Sr_6Al_2(OH)_{16}CrO_4 \cdot 4H_2O$, at 105°C. for 3 hours, sample (B) obtained by calcining sample (A) at 350°C. for 1 hour and sample (C) obtained by suspending sample (B) in water and drying the same. The results are as follows:

| | Crystal water content (calculated value = 6.9%) |
|---|---|
| Sample (A) | 6.8% |
| Sample (B) | 0.0% |
| Sample (C) | 6.9% |

The results of X-ray diffraction measurement are as follows:

| | X-ray diffraction intensity (diffraction peak heigh at (006) face) |
|---|---|
| Sample (A) | 28.3 |
| Sample (B) | 6.2 |
| Sample (C) | 28.1 |

As shown above, the product of this invention has a reversibility in absorption and isolation of crystal water, and it is therefore utilized as a dehydrating agent. Accordingly, the product of this invention can separate water from an azeotropic mixture of water and an alcohol, the separation of which is impossible by distillation. The product of this invention can absorb hydrogen as well, but it hardly absorbs alcohols such as ethanol, methanol and ethylene glycol, and acetone.

In the product of this invention, the anion can be easily replaced by other divalent anions. Accordingly, the product of this invention can be used as an ion exchanger.

In view of the composition of the product of this invention, its use as a catalyst is expected. Further, it is sometimes useful as an intermediate leading to a catalyst. In the case of catalysts prepared by the coprecipitation method, it is considered that each atom is easily coagulated and the atom arrangement is of poor regularity. Accordingly, the distribution of catalytic points is irregular and the catalytic activity is not uniform. Further, as coagulation of atoms is present in such catalysts, there is a fear that they are easily deactivated. On the other hand, as the precipitate of the product of this invention has a crystal structure, coagulation of atoms is difficultly caused to occur and all the atoms are arranged regularly with little disorder. When measured according to X-ray diffraction analysis or from a microscopic photograph, the layer of the crystal structure of the product of this invention is usually found to have a thickness of less than 100 A. Accordingly, it is construed that in the product of this invention crystal layers grow very thinly. Therefore, when the product of this invention is calcined at temperatures within a certain range, its takes a particulate form in which each atom is in the amorphous state. Thus, the activity is uniform and selective and a catalyst can be medicine. For instance, Fe-Al and Fe-Fe type composite hydroxides are promising as iron-suppliers. Further, the composite metal hydroxides of this invention are characterized in that incorporation of a monovalent cation such as $Na^+$ or $K^+$ is extremely small.

In the product of this invention, thin layer crystals are agglomerated in the petal-like or plane plate-like form. Accordingly, when pressure is imposed on the product of this invention, particles are easily combined with one another by bonding ability between layers. Because of this property, the product of this invention is useful as an excipient excellent in tablet-forming property. The hardness of the Zn-Al-$SO_4$ type product at various compression pressures is measured by a strong cobb hardness meter and is compared with those of conventional excipients. Results are shown in Table 15.

Table 15

| Compression pressure ($kg/cm^2$) | Product of this invention | Alumina gel hydroxide | Crystallized lactose | Crystallized cellulose |
|---|---|---|---|---|
| 318 | 13.2 | 2.4 | 0 | 12.3 |
| 636 | >25 | 6.0 | 0 | 19.8 |
| 955 | " | 11.2 | 0.9 | >25 |
| 1274 | " | 16.8 | 1.8 | " |
| 1911 | " | >25 | 2.8 | " |
| 2548 | " | >25 | 5.8 | " | obtained which is not appreciably degraded by catalyst poison. Further, activities as solid base and solid acid and specific oxidation and reduction activities can be obtained by suitably selecting a combination of metals and an anion. For instance, a product obtained by calcining $Ca_4Al_2(OH)_{12.5}(CO_3)_{0.75} \cdot 3H_2O$ at about 550° to about 700°C. is a catalyst useful for polymerization of ethylene and alkylation of aromatic rings. Further, catalysts prepared from products obtained by substituting $Ca^{2+}$ of the above compound by $Ba^{2+}$ or $Sr^{2+}$ are useful for similar reactions. With reference to composite metal hydroxides containing iron, chromium, cobalt or nickel as the trivalent metal $M^{3+}$ and $CrO_4^=$, $Cr_2O_7^=$, $MoO_4^=$ as the divalent inorganic ion $A^{2-}$, use as catalysts for oxidation of olefins, ammoxidation of olefins, cracking of petroleum hydrocarbons and the like is expected. It is another interesting feature of the composite metal hydroxides of this invention that their stability against heat may be varied within a range of about 100°C. by changing the kind of anion. Accordingly, it is possible to optionally change the maximum activity temperature. Decomposition temperatures of some examples of the product of this invention are shown in Table 14.

Table 14

| Kind of product | Decomposition temperature (°C) (according to D.T.A. analysis) |
|---|---|
| $Zn_4Al_2(OH)_{12}SO_3 \cdot 3H_2O$ | 260 |
| $Zn_4Al_2(OH)_{12}Cr_2O_7 \cdot 3H_2O$ | 320 |
| $Zn_4Al_2(OH)_{12}CrO_4 \cdot 3H_2O$ | 290 |
| $Zn_4Al_2(OH)_{12}S_2O_3 \cdot 3.5H_2O$ | 300 |
| $Zn_4Al_2(OH)_{12}S_2O_7 \cdot 5H_2O$ | 290 |
| $Zn_4Al_2(OH)_{12}SiO_3 \cdot 4H_2O$ | 245 |
| $Zn_4Al_2(OH)_{12}B_4O_7 \cdot 6H_2O$ | 300 |

As the product of this invention can contain metals such as aluminum, bismuth and iron, it is useful as a The product of this invention can also be used as a pigment. Further, when Co, Ni, $CrO_4$, Fe or the like is combined in the crystal structure, these components exhibit a certain refractive index (about 1.5) and form fine particles. Accordingly, such product can be used as a transparent or semi-transparent pigment by adding it to resins or other materials to be colored. Still further, the product of this invention has a smooth touch and a good luster, and it is useful as a luster-imparting agent and a sizing agent for paper-manufacturing. As the product of this invention has a layer crystal structure, it exhibits a lustrous oily feeling and is uniform in the particle size. Still in addition, the product of this invention is extremely excellent in wetherability, and particularly at room temperature or temperatures below 100°C. it is highly resistant against water and has a suitable moisture-absorbing property. Still further, it exhibits a good affinity or compatibility with organic substances. Accordingly, it is useful as a substrate of a paste-like or powdery cosmetic.

EXAMPLE 1

A 500-ml capacity beaker equipped with a pH electrode was charged with water of an amount sufficient to immerse the pH electrode therein, and an acidic liquor of 15 g of $Al(NO_3)_3 \cdot 9H_2O$ and 35.6 g of $Zn(NO_3)_2 \cdot 6H_2O$ dissolved in 200 ml of water and an alkaline liquor of 2.1 g of $Na_2CO_3$ and 12.8 g of NaOH dissolved in 200 ml of water were added dropwise to the beaker at room temperature and atmospheric pressure under agitation by a mini-stirrer while the amounts of both liquors fed were so adjusted that the pH of the system would be maintained at 10.0 – 11.0. After completion of the reaction, water was removed from the resulting precipitates by means of a dehydrating device equipped with a vacuum pump. The precipitates were washed with 200 ml of water and dried in air at 80°C. for 10 hours. X-ray diffraction analysis results, chemical analysis values and the composition formula derived therefrom of the product are as follows:

Composition formula
$Zn_6Al_2(OH)_{16}CO_3 \cdot 4H_2O$ $K = 5.3$
$x/y = 3$
$z/(x+y) = 1/8$ X-ray diffraction

| d(A) | 7.76 | 3.83 | 2.61 | 2.31 | 1.96 | 1.74 | 1.64 | 1.54 | 1.51 |
|---|---|---|---|---|---|---|---|---|---|
| $I/I_o$ | 100 | 27 | 10 | 8 | 8 | 4 | 4 | 2 | 2 |

Chemical analysis

| ZnO | 57.5% (6.0) |
|---|---|
| $Al_2O_3$ | 12.0% (1.0) |
| $CO_2$ | 5.2% (1.0) |
| $H_2O$ | 25.4% (12.0) |

Notes
1. Analysis values were measured according to fluorescent X-ray analysis method, chelate titrating method and ordinary chemical analysis method.
2. Parenthesized values in "Chemical Analysis" indicate molar ratios.
3. d(A) stands for the space distance determined by X-ray diffraction and
$I/I_o$ stands for the intensity ratio expressed in the relative value based on the peak heights measured by X-ray diffraction method.

The above will apply in a similar manner to subsequent examples.

EXAMPLE 2

An aqueous solution containing 0.1 mole/liter of $Al_2(SO_4)_3 \cdot 18H_2O$ and 0.6 mole/liter of $Ni(NO_3)_2 \cdot 6H_2O$, an aqueous solution containing 0.1 mole/liter of $Na_2CO_3$ and an aqueous solution containing 2.0 moles/liter of NaOH were fed continuously at rates of 20 ml/min, 20 ml/min and 17 ml/min, respectively, by means of controllable pumps, to a 1800-ml capacity reaction tank equipped with an overflow device and a stirrer. The temperature of the reaction tank was maintained at 30° ± 1°C., the pH was adjusted to 10.0 ± 0.2 and agitation was conducted. The reaction suspension which overflowed from the reaction tank was continuously introduced into a receiver. The suspension which overflowed 60 minutes after the initiation of the reaction was recovered and treated in the same manner as in Example 1. X-ray diffraction analysis results, chemical analysis values and chemical composition formula of the product are as follows:

Composition formula
$Ni_6Al_2(OH)_{16}CO_3 \cdot 4H_2O$ $K = 6.1$
$x/y = 3$
$z/(x+y) = 1/8$ X-ray diffraction

| d(A) | 7.89 | 3.88 | 2.59 | 2.32 | 1.53 | 1.50 |
|---|---|---|---|---|---|---|
| $I/I_o$ | 100 | 33 | 27 | 4 | 2 | 2 |

Chemical analysis

| NiO | 55.0% (5.96) |
|---|---|
| $Al_2O_3$ | 12.6% (1.0) |
| $CO_2$ | 5.4% (0.99) |
| $H_2O$ | 26.7% (12.0) |

Example 3

A liquor of 2.1 g of $Na_2CO_3$ and 12.8 g of NaOH dissolved in 200 ml of water was gradually added at room temperature under stirring to a liquor of 97 g of $AlCl_3 \cdot 6H_2O$ and 29 g of $Cu(NO_3)_2 \cdot 3H_2O$ dissolved in 200 ml of water.

After completion of the reaction, the resulting suspension was filtered and washed in the same manner as in Example 1, and the product was dried at a temperature not exceeding 80°C. X-ray diffraction analysis results, chemical analysis values and composition formula of the product are as follows:

Composition formula
$Cu_6Al_2(OH)_{16}CO_3 \cdot 4H_2O$ $K = 9.0$
$x/y = 3$
$z/(x+y) = 1/8$ X-ray diffraction

| d(A) | 7.76 | 3.81 | 2.54 | 2.25 | 1.91 | 2.74 | 2.06 | 1.73 |
|---|---|---|---|---|---|---|---|---|
| $I/I_o$ | 100 | 70 | 10 | 9 | 9 | 9 | 3 | 2 |

Chemical analysis

| CuO | 57.0% (6.07) |
|---|---|
| $Al_2O_3$ | 12.0% (1.0) |
| $CO_2$ | 5.9% (1.10) |
| $H_2O$ | 25.0% (11.9) |

EXAMPLE 4

A liquor of 26.7 g of $Al_2(SO_4)_3 \cdot 18H_2O$ and 37 g of $Cd(NO_3)_2 \cdot 4H_2O$ dissolved in 200 ml of water of a small $CO_3^=$ content, a liquor of 2.1 g of $Na_2CO_3$ dissolved in 100 ml of water and an aqueous solution containing 4 moles per liter of NaOH were added dropwise to a 500-ml capacity beaker. The addition of the aqueous solution of NaOH was controlled so that the pH was maintained above 12. When the pH was lower than 12, formation of a trace of $CdCO_3$ was observed. The resulting suspension was heated at 70°C. for 3 hours and allowed to cool. Then it was treated in the same manner as in Example 1. X-ray diffraction analysis results, chemical analysis values and composition formula of the product are as follows:

Composition formula
$Cd_6Al_2(OH)_{16}CO_3 \cdot 4H_2O$ $K = 0$
$x/y = 3$
$z/(x+y) = 1/8$ X-ray diffraction

| d(A) | 7.76 | 3.81 | 2.67 | 2.28 | 1.98 | 1.75 | 1.64 | 1.51 |
|---|---|---|---|---|---|---|---|---|
| $I/I_o$ | 100 | 32 | 19 | 13 | 5 | 4 | 2 | 2 |

Chemical analysis

| CdO | 68.2% (6.02) |
|---|---|
| $Al_2O_3$ | 9.0% (1.0) |
| $CO_2$ | 4.0% (1.03) |
| $H_2O$ | 18.5% (11.7) |

EXAMPLE 5

A 300-ml capacity beaker was charged with 21.5 g of $Fe(OH)_3$, 60 g of $Zn(OH)_2$ and 9 g of $NaHCO_3$ and 100 ml of water were added thereto. The mixture was heated on a water bath while the mixture was agitated at intervals. The mixture was kept almost in the boiling state, and the suspended state was maintained by adding water at times. Thus the reaction was continued for about 60 minutes. The resulting reaction mixture was treated in the same manner as in Example 1. X-ray diffraction analysis results, chemical analysis values and composition formula of the product are as follows:

Composition formula

| Zn$_6$Fe$_2$(OH)$_{16}$CO$_3$ . 4H$_2$O | $K = 5.3$ |
|---|---|
| | $x/y = 3$ |
| | $z/(x+y) = 1/8$ |

X-ray diffraction

| $d(\text{Å})$ | 7.82 | 3.90 | 2.59 | 1.52 |
|---|---|---|---|---|
| $I/I_o$ | 100 | 62 | 21 | 13 |

Chemical analysis

| ZnO | 53.8% (6.02) |
|---|---|
| Fe$_2$O$_3$ | 17.6% (1.0) |
| CO$_2$ | 4.9% (1.1) |
| H$_2$O | 23.9% (12.1) |

EXAMPLE 6

A liquor of 18.0 g of Al(NO$_3$)$_3$ . 9H$_2$O and 26.3 g of CaCl$_2$ . 3H$_2$O dissolved in 200 ml of well decarbonated water was added at room temperature under stirring dropwise to a liquor of 12.0 g of NaOH and 1.5 g of Na$_2$CO$_3$ dissolved in 200 ml of water. The reaction was conducted in a nitrogen current.

After completion of the reaction, the resulting suspension exhibited a pH value exceeding 13.5. This suspension was dehydrated under reduced pressure and the resulting precipitate was washed with 300 ml of decarbonated water. X-ray diffraction analysis results, chemical analysis values and composition formula derived therefrom of the product are as follows:

Composition formula

| Ca$_6$Al$_2$(OH)$_{16}$CO$_3$ . 4H$_2$O | $K = -3$ |
|---|---|
| | $x/y = 3$ |
| | $z/(x+y) = 1/8$ |

X-ray diffraction

| $d(\text{Å})$ | 8.04 | 3.88 | 2.64 | 2.34 | 1.96 | 1.53 | 1.51 | 3.06* | 2.51* |
|---|---|---|---|---|---|---|---|---|---|
| $I/I_o$ | 100 | 43 | 14 | 12 | 12 | 8 | 8 | 4 | 2 |

(*: CaCO$_3$)

Chemical analysis

| CaO | 47.3% (5.80) |
|---|---|
| Al$_2$O$_3$ | 14.9% (1.0) |
| CO$_2$ | 7.1% (1.10) |
| H$_2$O | 30.9% (11.80) |

In this example the presence of a trace of CaCO$_3$ was confirmed in the product.

EXAMPLE 7

A liquor of 15 g of Al(NO$_3$)$_3$. 9H$_2$O and 32 g of SrCl$_2$ . 6H$_2$O dissolved in 200 ml of decarbonated water, a liquor of 39 g of K$_2$CrO$_4$ dissolved in 100 ml of decarbonated water and an aqueous solution containing 2.0 moles per liter of NaOH and completely free of carbon dioxide gas were added dropwise in a nitrogen current under agitation to a four-neck flask. The feed rate of each liquid was so adjusted that the pH of the reaction mixture was maintained above 13.5. The resulting suspension was treated in the same manner as in Example 1. X-ray diffraction analysis results, chemical analysis values and composition formula are as follows:

Composition formula

| Sr$_6$Al$_2$(OH)$_{16}$CrO$_4$ . 4H$_2$O | $K = 0$ |
|---|---|
| | $x/y = 3$ |
| | $z/(x+y) = 1/8$ |

X-ray diffraction

| $d(\text{Å})$ | 8.04 | 4.04 | 2.64 | 2.35 | 1.96 | 1.54 | 1.48 |
|---|---|---|---|---|---|---|---|
| $I/I_o$ | 100 | 32 | 10 | 8 | 8 | 2 | 2 |

Chemical analysis

| SrO | 58.5% (6.02) |
|---|---|
| Al$_2$O$_3$ | 9.5% (1.0) |
| CrO$_3$ | 10.5% (1.1) |
| CO$_3$ | 0.12% (0.03) |
| H$_2$O | 19.8% (11.80) |

EXAMPLE 8

In 200 ml of decarbonated and desulfated water 29.4 g of BaCl$_2$ . 2H$_2$O were dissolved and 15 g of Al(NO$_3$)$_3$ . 9H$_2$O. Separately, a mixed aqueous solution containing 0.20 mole per liter of Na$_2$SO$_3$ and 10.0 moles per liter of NaOH in 200 ml of decarbonated water was prepared. The latter solution was charged into a 500-ml capacity flask to which a pH electrode was fixed in an air-tight manner. The former solution of barium chloride and aluminum nitrate was added dropwise to the flask under agitation by a constant rate stirrer while incorporation of carbon dioxide gas in the air was prevented by passing N$_2$ gas through the inside of the flask. The pH was always maintained above 13.5.

After completion of the reaction, the resulting suspension was rapidly filtered and the filtered solid was washed with decarbonated ionexchange water and dried at about 80°C. in N$_2$ gas current. Analysis results of the product are as follows:

Composition formula

| Ba$_6$Al$_2$(OH)$_{16}$S$_2$O$_3$ . 4H$_2$O | $K = -3.7$ |
|---|---|
| | $x/y = 3$ |
| | $z/(x+y) = 1/8$ |

X-ray diffraction

| $d(\text{Å})$ | 6.23 | 3.14 | 2.62 | 2.31 | 1.96 | 1.53 | 1.51 |
|---|---|---|---|---|---|---|---|
| $I/I_o$ | 100 | 20 | 10 | 9 | 9 | 4 | 4 |

Chemical analysis

| BaO | 68.0% (6.00) |
|---|---|
| Al$_2$O$_3$ | 7.5 % (1.0) |
| S$_2$O$_2$ | 7.3 % (1.0) |
| H$_2$O | 16.2 % (12.00) |

EXAMPLE 9

In 200 ml of dechlorinated, decarbonated ion-exchange water 15 g of Al(NO$_3$)$_3$ . 9H$_2$O and 40 g of Pb(NO$_3$)$_2$, were dissolved and the solution was charged in a 500-ml capacity flask. Then a liquor of 5 g of Na$_2$S$_2$O$_3$ . 5H$_2$O dissolved in 100 ml of dechlorinated and decarbonated ion-exchange water and an aqueous solution of 4 moles per liter of NaOH dissolved in dechlorinated and decarbonated water were added dropwise to the flask at room temperature under agitation. The pH of the reaction mixture was adjusted to 11.5 – 12.0. (Since Pb(OH)$_2$ is a dual substance, if the pH of the reaction mixture exceeds about 12.5, it is dissolved in the reaction liquor and the intended product cannot be obtained.) With a view to preventing the decomposition of Pb(OH)$_2$, the reaction temperature was maintained below about 80°C. After completion of the reaction, the resulting precipitate was recovered by filtration and washed with water. Then it was dried at 70 – 80°C. Results of the analysis of the product are as follows:

Composition formula

| Pb$_6$Al$_2$(OH)$_{16}$S$_2$O$_3$ . 4H$_2$O | $K = 9.5$ |
|---|---|
| | $x/y = 3$ |
| | $z/(x+y) = 1/8$ |

X-ray diffraction

| $d(\text{Å})$ | 8.50 | 4.44 | 2.71 | 2.37 | 1.56 | 1.53 |
|---|---|---|---|---|---|---|
| $I/I_o$ | 100 | 30 | 10 | 8 | 2 | 2 |

Chemical analysis

| PbO | 76.2 % (6.0) |
|---|---|
| Al$_2$O$_3$ | 5.8 % (1.0) |
| S$_2$O$_3$ | 4.8 % (1.04) |
| H$_2$O | 12.3 % (12.) |

EXAMPLE 10

CO₂ gas was blown into a carbon dioxide-substituted four-neck flask so as to completely remove oxygen in the air. Then a liquor of 1.0 g of $PtK_2Cl_4$ and 0.4 g of $Na_2CO_3$ dissolved in 200 ml of water, a liquor of 3 g of $Al_2(NO_3)_3 \cdot 9H_2O$ dissolved in 100 ml of water and an aqueous solution containing 2.0 moles per liter were added dropwise to the flask at room temperature under agitation. The feed rate of each liquor was so adjusted that the pH of the suspension was maintained at 9.0 – 10.0. After completion of the reaction, the resulting suspension was treated in the same manner as in Example 7. Results of the analysis of the product are as follows:

Composition formula
$Pt_6Al_2(OH)_{16}CO_3 \cdot 4H_2O$

K = 3.7
x/y = 3
z/(x + y) = ⅛

X-ray diffraction

| d(A) | 7.89 | 3.88 | 2.66 | 2.32 | 1.53 |
|---|---|---|---|---|---|
| I/I₀ | 100 | 27 | 9 | 9 | 2 |

Chemical analysis

| PtO | 78.2 % (6.0) |
|---|---|
| Al₂O₃ | 6.2 % (1.0) |
| CO₂ | 2.8 % (1.1) |
| H₂O | 13.2 % (11.9) |

EXAMPLE 11

A mixed aqueous solution containing 0.1 mole per liter of $Al_2(SO_4)_3 \cdot 18H_2O$ and 0.6 mole per liter of $MnCl_2 \cdot 4H_2O$ was prepared. Water used for the preparation of the above solution had been boiled, cooled and degasified in vacuo to completely remove oxygen dissolved therein. Separately, an aqueous solution containing 0.1 mole per liter of $Na_2CO_3$ and an aqueous solution containing 2.0 per liter of NaOH were prepared. In the preparation of these solutions water from which oxygen had been removed as completely as possible was used.

With a view to preventing oxidation of $Mn^{2+}(OH)_2$ by oxygen in the air, a 2000-ml capacity reaction tank which was so designed that during the reaction $N_2$ gas would be blown from the bottom of the reaction tank and another $N_2$ gas would be blown to the liquid face from the upper portion of the reaction tank to remove the air contacting the liquid surface was used. A pH electrode was inserted into the reaction tank in an airtight manner. To the reaction tank 500 ml of water from which oxygen had been removed in advance were fed, and the above-mentioned three liquids were fed under agitation by a constant rate stirrer at feed rates of 20 ml/min, 20 ml/min and 16 ml/min, respectively. $N_2$ gas was blown to the reaction suspension which overflowed from the reaction tank so that its contact with the air would be prevented as much as possible. Water was removed from the resulting suspension in a $N_2$ gas atmosphere, and the resulting solid was dried, washed with water, boiled and dried at a temperature not exceeding 80°C. in a $N_2$ gas current. Results of the analysis of the product are as follows:

Composition formula
$Mn_6Al_2(OH)_{16}CO_3 \cdot 4H_2O$

K = 20
x/y = 3
z/(x + y) = ⅛

X-ray diffraction

| d(A) | 7.69 | 3.81 | 2.66 | 2.31 |
|---|---|---|---|---|
| I/I₀ | 100 | 65 | 12 | 9 |

Chemical analysis

| MnO | 54.2 % (6.0) |
|---|---|
| Al₂O₃ | 13.0 % (1.0) |
| CO₂ | 5.5 % (0.98) |
| H₂O | 27.3 % (11.9) |

EXAMPLE 12

In 200 ml of water, from which oxygen had been removed, 15.0 g of $Al(NO_3)_3 \cdot 9H_2O$ and 33.4 g of $FeSO_4 \cdot 7H_2O$ were dissolved. Separately, 2.1 g of $Na_2CO_3$ and 12.8 g of NaOH were dissolved in 200 ml of water, from which oxygen had been removed. A 500-ml capacity beaker was charged with 200 ml of water from which oxygen had been removed, and the above solutions were added thereto in the same manner as in Example 11 and the reaction was conducted while the pH of the reaction suspension was maintained at 10.0 – 11.0. Results of the analysis of the product are as follows:

Composition formula
$Fe_6Al_2(OH)_{16}CO_3 \cdot 4H_2O$

K = 4.6
x/y = 3
z/(x + y) = ⅛

X-ray diffraction

| d(A) | 7.76 | 3.81 | 2.66 | 2.31 | 1.53 |
|---|---|---|---|---|---|
| I/I₀ | 100 | 32 | 11 | 9 | 4 |

Chemical analysis

| FeO | 54.1 % (6.16) |
|---|---|
| Al₂O₃ | 12.5 % (1.0) |
| CO₂ | 5.9 % (1.10) |
| H₂O | 27.3 % (12.5) |

EXAMPLE 13

The reaction was conducted in the same manner as in Example 12 by employing a liquor of 9.7 g of $AlCl_3 \cdot 6H_2O$ and 34.0 g of $CoSO_4 \cdot 7H_2O$ dissolved in 200 ml of water and a liquor of 2.1 g of $Na_2CO_3$ and 12.8 g of NaOH dissolved in 200 ml of water. Results of the analysis of the product are as follows:

Composition formula
$Co_6Al_2(OH)_{16}CO_3 \cdot 4H_2O$

K = 2.9
x/y = 3
z/(x + y) = ⅛

X-ray diffraction

| d(A) | 7.89 | 3.86 | 2.67 | 2.37 | 2.09 |
|---|---|---|---|---|---|
| I/I₀ | 100 | 25 | 25 | 15 | 10 |

Chemical analysis

| CoO | 55.6 % (6.15) |
|---|---|
| Al₂O₃ | 12.4 % (1.0) |
| CO₂ | 5.6 % (1.05) |
| H₂O | 26.5 % (12.10) |

EXAMPLE 14

The reaction was conducted in the same manner as in Example 12 by employing a liquor of 26.7 g of $Al_2(SO_4)_3 \cdot 18H_2O$ and 40.0 g of $Pb(NO_3)_2$ dissolved in 200 ml of water and a liquor of 23.8 g of $K_2MoO_4$ and 12.8 g of NaOH dissolved in 200 ml of water. Results of the analysis of the product are as follows:

Composition formula
$Pb_6Al_2(OH)_{16}MoO_4 \cdot 4H_2O$   K = 3.1
                                       x/y = 3
                                       z/(x + y) = ⅛

X-ray diffraction
| d(A) | 7.82 | 3.91 | 2.66 | 2.31 | 1.53 |
|---|---|---|---|---|---|
| $I/I_o$ | 100 | 31 | 12 | 9 | 5 |

Chemical analysis
| PbO | 74.0 % (5.97) |
|---|---|
| $Al_2O_3$ | 5.7 % (1.0) |
| $MoO_3$ | 3.8 % (1.10) |
| $H_2O$ | 12.0 % (12.0) |

EXAMPLE 15

An aqueous solution containing 0.288 mole per liter of $FeCl_3 \cdot 6H_2O$, the pH of which was maintained at 1 by addition of concentrated nitric acid so as to prevent hydrolysis, and an aqueous solution containing 0.864 mole per liter of $Ni(NO_3)_2 \cdot 6H_2O$ were sprayed uniformly on the surface of the reaction liquor from the upper portion of a reaction tank via 500 holes of 0.3 mm diameter of a sprayer composed of a synthetic resin. The feed rate of each solution was 11.3 ml/min. The reaction tank was a 2-liter capacity cylindrical reactor and the temperature inside the reactor was maintained at 30° ± 1°C. The reaction system was agitated at a constant rate by a propeller stirrer. The agitation direction of the stirrer was the upward direction. From the bottom of the reactor were an aqueous solution containing 0.144 mole per liter of $Na_2CO_3$ and another aqueous solution containing 3.56 moles per liter of were fed at feed rates of 22.6 ml/min and 14.6 ml/min, respectively, through a pipe so disposed that both aqueous solutions were fed from the central portion of the bottom of the reactor. The amount of NaOH fed was so adjusted that a pH electrode would always indicate a value between 10.0 and 10.2. When the pH value became stable and the concentration of the reaction liquor was constant, the reaction suspension which overflowed was collected. The residence time of the reaction liquor in the reactor was about 33 minutes. The resulting suspension was heated at 70°C. for 5 hours and cooled. Post-treatments were conducted in the same manner as in Example 1. Results of the analysis of the product are as follows:

Composition formula
$Ni_6Fe_2(OH)_{16}CO_3 \cdot 4H_2O$   K = 6.1
                                      x/y = 3
                                      z/(x + y) = ⅛

X-ray diffraction
| d(A) | 7.89 | 3.96 | 2.60 | 1.53 | 2.29 |
|---|---|---|---|---|---|
| $I/I_o$ | 100 | 33 | 28 | 8 | 11 |

Chemical analysis
| NiO | 51.5 % (6.10) |
|---|---|
| $Fe_2O_3$ | 18.1 % (1.0) |
| $CO_2$ | 5.4 % (1.10) |
| $H_2O$ | 24.7 % (12.10) |

EXAMPLE 16

In 200 ml of water 21.6 g of $FeCl_3 \cdot 6H_2O$ and 89.5 g of $Cd(NO_3)_2 \cdot 4H_2O$ were dissolved, and the pH of the solution was adjusted to 1 by addition of concentrated nitric acid so as to prevent the hydrolysis of ferric chloride. Separately, 13.0 g of $Na_2SO_4 \cdot 7H_2O$ were dissolved in 100 ml of water. Both liquors were added dropwise to a 500-ml capacity flask at room temperature under agitation together with an aqueous solution containing 2.0 moles per liter of NaOH while the pH of the mixture was maintained above 12.0. During the reaction air decarbonated with concentrated KOH aqueous solution was fed to the flask. In the decarbonated air the resulting suspension was filtered, and the precipitate was washed with water and dried at 80°C. for 10 hours in the same atmosphere. Results of the analysis of the product are as follows:

Composition formula
$Cd_6Fe_2(OH)_{16}SO_4 \cdot 4H_2O$   K = 14.7
                                      x/y = 3
                                      z/(x + y) = ⅛

X-ray diffraction
| d(A) | 8.04 | 3.93 | 2.64 | 2.31 |
|---|---|---|---|---|
| $I/I_o$ | 100 | 28 | 15 | 11 |

Chemical analysis
| CdO | 62.6 % (6.0) |
|---|---|
| $Fe_2O_3$ | 13.0 % (1.0) |
| $SO_4$ | 6.5 % (0.98) |
| $H_2O$ | 17.7 % (12.10) |

EXAMPLE 17

In 200 ml of water 8.8 g of $InCl_3$ and 16.4 g of $ZnCl_2$ were dissolved. Separately, 2.1 g of $Na_2CO_3$ were dissolved in 100 ml of water. The reaction was carried out in the same manner as in Example 16 by employing the above liquors together with an aqueous solution containing 3.0 moles per liter of NaOH. Results of the analysis of the product are as follows:

Composition formula
$Zn_6In_2(OH)_{16}CO_3 \cdot 4H_2O$   K = 5.3
                                      x/y = 3
                                      z/(x + y) = ⅛

X-ray diffraction
| d(A) | 8.18 | 4.07 | 2.63 | 1.98 | 1.52 |
|---|---|---|---|---|---|
| $I/I_o$ | 100 | 33 | 18 | 9 | 8 |

Chemical analysis
| ZnO | 47.7 % (6.20) |
|---|---|
| $In_2O_3$ | 27.1 % (1.0) |
| $CO_2$ | 4.3 % (0.99) |
| $H_2O$ | 21.2 % (12.10) |

EXAMPLE 18

In 200 ml of water 16.0 g of $Cr(NO_3)_3 \cdot 9H_2O$ and 35.0 g of $Ni(NO_3)_2 \cdot 6H_2O$ were dissolved, and the pH of the solution was adjusted to 1 by addition of concentrated nitric acid so as to prevent the hydrolysis of chromium nitrate. Separately, 2.1 g of $Na_2CO_3$ were dissolved in 100 ml of water. Both solutions, together with an aqueous solution containing 4 moles per liter of NaOH, were added to a 500-ml capacity beaker charged with 100 ml of water. The addition of the NaOH aqueous solution was adjusted so that the pH of the reaction suspension was maintained above 13.5. After completion of the reaction, the reaction suspension was transferred to an autoclave and subjected to hydrothermal treatment at 150°C. for 15 hours. Then it was allowed to cool to room temperature, and post-treatments were conducted in the same manner as in Example 1. Results of the analysis of the product are as follows:

Composition formula
$Ni_6Cr_2(OH)_{16}CO_3 \cdot 4H_2O$       $K = 6.1$
                                           $x/y = 3$
                                           $z/(x + y) = 1/8$ X-ray diffraction

| $d(A)$ | 7.68 | 3.81 | 2.56 | 2.31 |
|---|---|---|---|---|
| $I/I_o$ | 100 | 20 | 11 | 9 |

Chemical analysis

| NiO | 52.1 % (6.10) |
|---|---|
| $Cr_2O_3$ | 17.2 % (1.0) |
| $CO_2$ | 5.9 % (1.05) |
| $H_2O$ | 2.51 % (12.20) |

EXAMPLE 19

A 1-liter capacity beaker was charged with a liquor of 2.1 g of $Na_2CO_3$ and 150 g of NaOH dissolved in 300 ml of water, and then a liquor of 13.2 g of $YCl_3 \cdot 6H_2O$ and 35.8 g of $Ni(NO_3)_2 \cdot 6H_2O$ dissolved in 300 ml of water was added dropwise to the content of the beaker at room temperature under agitation. Since $Y^{3+}$ is not easily formed into $Y(OH)_3$ completely in the presence of an equivalent amount of $OH^-$, in this example it was necessary that the $OH^-$ ions should be present at high concentrations and in amounts of about 10 equivalents. After completion of the reaction, the resulting suspension was transferred to an autoclave and treated in the same manner as in Example 18. Results of the analysis of the product are as follows:

Composition formula
$Ni_6Y_2(OH)_{16} CO_3 \cdot 4H_2O$       $K = 6.1$
                                           $x/y = 3$
                                           $z/(x + y) = 1/8$ X-ray diffraction

| $d(A)$ | 7.89 | 3.94 | 2.60 | 2.32 | 1.52 |
|---|---|---|---|---|---|
| $I/I_o$ | 100 | 32 | 27 | 18 | 18 |

Chemical analysis

| NiO | 48.0 % (6.02) |
|---|---|
| $Y_2O_3$ | 24.4 % (1.0) |
| $CO_2$ | 4.7 % (1.03) |
| $H_2O$ | 23.2 % (12.10) |

EXAMPLE 20

An aqueous solution of 4.8 g of NaOH in 50 ml of water was added to a liquor of 11.3 of $CoSO_4 \cdot 7H_2O$ dissolved in 100 ml of water to form $Co(OH)_2$. Then the mixed liquor was agitated while passing the air thereinto, to thereby oxidize $Co(OH)_2$ to $Co(OH)_3$. The resulting suspension was charged into a 500-ml capacity beaker, and a liquor of 35.0 g of $Ni(NO_3)_2 \cdot 6H_2O$ dissolved in 200 ml of water and a liquor of 2.1 g of $Na_2CO_3$ and 9.6 g of NaOH dissolved in 100 ml of water were added dropwise thereto at room temperature under agitation. The resulting reaction suspension was transferred to an autoclave and treated in the same manner as in Example 18. Results of the analysis of the product are as follows:

Composition formula
$N_6Co_2(OH)_{16}CO_3 \cdot 4H_2O$        $K = 6.1$
                                           $x/y = 3$
                                           $z/(x + y) = 1/8$ X-ray diffraction

| $d(A)$ | 7.89 | 4.0 | 2.64 | 2.31 | 1.53 | 1.50 |
|---|---|---|---|---|---|---|
| $I/I_o$ | 100 | 41 | 13 | 11 | 6 | 6 |

Chemical analysis

| NiO | 51.7 % (5.96) |
|---|---|
| $Co_2O_3$ | 19.2 % (1.0) |
| $CO_2$ | 4.6 % (0.94) |
| $H_2O$ | 24.8 % (11.90) |

EXAMPLE 21

A liquor of 21.0 g of $Ti_2(SO_4)_3 \cdot 8H_2O$ and 29.5 g of $NiCl_2 \cdot 6H_2O$ dissolved in 200 ml of dilute hydrochloric acid and an aqueous solution containing 2.0 moles per liter of NaOH were added dropwise into a four-neck flask charged with an aqueous solution of 2.1 g of $Na_2CO_3$ in 100 ml of water. The reaction was conducted by passing $N_2$ gas through the reaction system so as to prevent in the flask the presence of oxygen in the air. The reaction mixture was agitated at room temperature and the pH thereof was maintained above 11.0 by adjusting the addition of the NaOH aqueous solution. After completion of the reaction, the resulting suspension was rapidly filtered under reduced pressure in a $N_2$ gas atmosphere, and the recovered solid was dried at about 60°C. for 8 hours in a $N_2$ gas current, washed under reduced pressure with water, and dried under the same conditions as above. Results of the analysis of the product are as follows:

Composition formula
$Ni_6Ti_2(OH)_{16}CO_3 \cdot 4H_2O$       $K = 6.1$
                                           $x/y = 3$
                                           $z/(x + y) = 1/8$ X-ray diffraction

| $d(A)$ | 8.19 | 4.08 | 2.65 | 2.12 | 1.53 |
|---|---|---|---|---|---|
| $I/I_o$ | 100 | 52 | 25 | 15 | 12 |

Chemical analysis

| NiO | 52.6 % (5.92) |
|---|---|
| $Ti_2O_3$ | 16.9 % (1.0) |
| $CO_2$ | 5.3 % (1.02) |
| $H_2O$ | 25.7 % (12.05) |

EXAMPLE 22

A liquor of 9.1 g of $SbCl_3$ and 29.5 g of $NiCl_2 \cdot 6H_2O$ dissolved in 200 ml of water and a liquor of 2.1 g of $Na_2CO_3$ and 12.8 g of NaOH dissolved in 200 ml of water were added dropwise to a 500-ml capacity beaker charged with 100 ml of water at room temperature under agitation. The feed rate of each liquor was adjusted so that the pH of the reaction suspension was maintained at 10.0 – 11.0. After completion of the reaction, the resulting suspension was post-treated in the same manner as in Example 1. Results of the analysis of the product are as follows:

Composition formula
$Ni_6Sb_2(OH)_{16}CO_3 \cdot 4H_2O$ $K = 6.1$
$x/y = 3$
$z/(x+y) = 1/8$ X-ray diffraction

| $d(Å)$ | 7.49 | 3.80 | 2.66 | 2.41 | 1.54 |
|---|---|---|---|---|---|
| $I/I_o$ | 100 | 41 | 25 | 12 | 12 |

Chemical analysis

| NiO | 44.8 % (6.07) |
|---|---|
| $Sb_2O_3$ | 29.0 % (1.0) |
| $CO_2$ | 4.5 % (1.02) |
| $H_2O$ | 21.8 % (12.0) |

EXAMPLE 23

A mixed liquor of 50 ml of a hydrochloric acid-acidified bismuth solution containing 0.4 mole per liter of $Bi_2O_3$, 50 ml of a zinc chloride solution containing 2.4 moles per liter of ZnO and 100 ml of a liquor of 3.6 g of mannitol dissolved in water, and another mixed liquor of 25.6 ml of a sodium carbonate solution containing 0.785 mole per liter of $Na_2CO_3$ and 200 ml of a caustic soda solution containing 2.0 moles per liter of NaOH were added under agitation at a temperature maintained at 5°C. into a 500-ml capacity beaker charged with 100 ml of water. The reaction was carried out while the pH of the reaction suspension was maintained at 11.0 – 12.0. The resulting precipitate was treated in the same manner as in Example 1. Results of the analysis of the product are as follows:

Composition formula
$Zn_6Bi_2(OH)_{16}CO_3 \cdot 4H_2O$ $K = 5.3$
$x/y = 3$
$z/(x+y) = 1/8$ X-ray diffraction

| $d(Å)$ | 7.43 | 3.69 | 2.57 | 2.35 | 1.52 |
|---|---|---|---|---|---|
| $I/I_o$ | 100 | 45 | 28 | 15 | 8 |

Chemical analysis

| ZnO | 40.2 % (6.04) |
|---|---|
| $Bi_2O_3$ | 38.4 % (1.0) |
| $CO_2$ | 3.6 % (1.02) |
| $H_2O$ | 18.0 % (12.3) |

EXAMPLE 24

A liquor of 15.0 g of $LaCl_3 \cdot 7H_2O$ and 35.0 g of $Ni(NO_3)_2 \cdot 6H_2O$ dissolved in 200 ml of water and a liquor of 2.1 g of $Na_2CO_3$ dissolved in 100 ml of water were added, together with an aqueous solution containing 2.0 moles per liter of NaOH, dropwise into a 500-ml capacity beaker charged with 100 ml of water. The addition of the NaOH aqueous solution was adjusted so that the pH of the reaction suspension was maintained at 7.0 – 8.0. After completion of the reaction, the resulting suspension was transferred to an autoclave and subjected to hydrothermal treatment at 150°C. for 12 hours. The the post-treatments were conducted in the same manner as in Example 1. Results of the analysis of the product are as follows:

Composition formula
$Ni_6La_2(OH)_{16}CO_3 \cdot 4H_2O$ $K = 6.1$
$x/y = 3$
$z/(x+y) = 1/8$ X-ray diffraction

| $d(Å)$ | 7.89 | 3.81 | 2.64 | 2.37 | 2.06 | 1.54 |
|---|---|---|---|---|---|---|
| $I/I_o$ | 100 | 56 | 21 | 12 | 9 | 5 |

Chemical analysis

| NiO | 44.0 % (6.01) |
|---|---|
| $La_2O_3$ | 32.0 % (1.0) |
| $CO_2$ | 4.3 % (1.02) |
| $H_2O$ | 21.2 % (12.10) |

EXAMPLE 25

A liquor of 17.5 g of $Nd(NO_3)_3 \cdot 6H_2O$ and 35.8 g of $Ni(NO_3)_2 \cdot 6H_2O$ dissolved in 200 ml of water and a liquor of 2.1 g of $Na_2CO_3$ and 12.8 g of NaOH dissolved in 200 ml of water were added dropwise to a 500-ml capacity beaker charged with 60 ml of water at room temperature under agitation. The addition was conducted so that the pH was maintained at 10.0 – 11.0, and the reaction was carried out in a $N_2$ gas atmosphere. After completion of the reaction, the resulting suspension was treated in the same manner as in Example 1. Results of the analysis of the product are as follows:

Composition formula
$Ni_6Nd_2(OH)_{16}CO_3 \cdot 4H_2O$ $K = 6.1$
$x/y = 3$
$z/(x+y) = 1/8$ X-ray diffraction

| $d(Å)$ | 7.89 | 3.91 | 2.69 | 2.35 | 1.51 |
|---|---|---|---|---|---|
| $I/I_o$ | 100 | 30 | 23 | 15 | 13 |

Chemical analysis

| NiO | 42.8 % (5.97) |
|---|---|
| $Nd_2O_3$ | 32.2 % (1.0) |
| $CO_2$ | 4.4 % (1.04) |
| $H_2O$ | 21.0 % (12.18) |

EXAMPLE 26

A liquor of 15.0 g of $CeCl_3 \cdot 7H_2O$, 3.0 g of $NH_4Cl$ and 16.4 g of ZnCl₂ dissolved in 200 ml of water and a liquor of 2.1 g of Na₂CO₃ and 13 g of NaOH dissolved in 200 ml of water were added dropwise to a four-neck flask charged with 100 ml of water in a N₂ gas atmosphere. The addition of both liquors was adjusted so that the pH of the reaction suspension was maintained above 11.0. Water was removed from the resulting suspension in a N₂ gas atmosphere and the solid was dried. The solid was washed with water and dried again in a N₂ gas atmosphere at 60°C. for 15 hours. Results of the analysis of the product are as follows:

Composition formula
$Zn_6Ce_2(OH)_{16}CO_3 \cdot 4H_2O$   $K = 5.3$
                                      $x/y = 3$
                                      $z/(x+y) = 1/8$ X-ray diffraction

| $d(A)$ | 7.82 | 3.91 | 2.61 | 2.35 | 1.53 | 1.50 |
|---|---|---|---|---|---|---|
| $I/I_o$ | 100 | 40 | 25 | 11 | 6 | 6 |

Chemical analysis

| ZnO | 45.5 % (6.03) |
|---|---|
| $Ce_2O_3$ | 30.5 % (1.0) |
| $CO_2$ | 5.6 % (1.02) |
| $H_2O$ | 18.8 % (12.52) |

EXAMPLE 27

A liquor of 3.2 g of VCl₃ and 16.4 g of ZnCl₂ dissolved in 200 ml of water and a liquor of 2.1 g of Na₂CO₃ and 13.0 of NaOH dissolved in 100 ml of water were added dropwise in a N₂ gas current to a 500-ml capacity four-neck flask charged with 100 ml of degasified ion-exchange water. The addition of both liquors were so adjusted that the pH was maintained at 10.0 – 11.0. After completion of the reaction, the resulting suspension was dehydrated in a N₂ gas atmosphere. The remaining solid was dried in a N₂ gas current, washed with 100 ml of degasified ion-exchange water, and dried at 60°C. for 15 hours in a N₂ gas current. Results of the analysis of the product are as follows:

Composition formula
$Zn_6V_2(OH)_{16}CO_2 \cdot 4H_2O$   $K = 5.3$
                                    $x/y = 3$
                                    $z/(x+y) = 1/8$ X-ray diffraction

| $d(A)$ | 7.82 | 3.91 | 2.63 | 2.36 | 1.53 | 1.51 |
|---|---|---|---|---|---|---|
| $I/I_o$ | 100 | 35 | 25 | 23 | 15 | 15 |

Chemical analysis

| ZnO | 54.3 % (6.01) |
|---|---|
| $V_2O_3$ | 16.7 % (1.0) |
| $CO_2$ | 6.7 % (1.05) |
| $H_2O$ | 22.5 % (12.10) |

EXAMPLE 28

40 ml of an aqueous solution containing 34 mg of americium nitrate and 33 mg of ZnCl₂ and a solution of 10 mg of Na₂CO₃ in 10 ml of water was added dropwise to a 100-ml capacity beaker charged with 20 ml of water at room temperature under agitation. The pH of the reaction liquor was adjusted to 10.5 – 11.5 by addition of 0.1 N NaOH aqueous solution. After completion of the reaction, the resulting suspension was treated in the same manner as in Example 1. Results of X-ray diffraction analysis are as follows:

Composition formula
$Zn_6Am_2(OH)_{16}CO_3 \cdot 4H_2O$   $K = 5.3$
                                     $x/y = 3$
                                     $z/(x+y) = 1/8$ -Continued X-ray diffraction

| $d(A)$ | 8.58 | 4.27 | 2.83 | 2.42 | 1.53 | 1.50 |
|---|---|---|---|---|---|---|
| $I/I_o$ | 100 | 47 | 17 | 12 | 8 | 8 |

EXAMPLE 29

In 200 ml of water 12.3 g of Cd(NO₃)₂·4H₂O, 5.5 g of ZnCl₂, 11.6 g of Ni(NO₃)₂·6H₂O, 7.5 g of Al(NO₃)₃·9H₂O and 5.4 g of FeCl₃·6H₂O were dissolved, and the pH of the resulting liquor was adjusted to 1 by addition of concentrated nitric acid. Separately, a solution of 2.1 g of Na₂CO₃ and 13 g of NaOH in 200 ml of water was prepared. Both liquors were added dropwise into a 500-ml capacity beaker charged with 100 ml of water so that the pH of the reaction liquor was maintained at 12 – 13. After completion of the reaction, the resulting suspension was treated in the same manner as in Example 1. Results of the analysis of the product are as follows:

Composition formula
$(Cd_2Zn_2Ni_2)(AlFe)(OH)_{16}CO_3 \cdot 4H_2O$
  $K = 0$ (Cd-CO₃ series)
  $K = 5.3$ (Zn-CO₃ series)
  $K = 6.1$ (Ni-CO₃ series)
  $x/y = 3$
  $z/(x+y) = 1/8$ X-ray diffraction

| $d(A)$ | 7.75 | 3.88 | 2.54 | 2.36 | 1.51 |
|---|---|---|---|---|---|
| $I/I_o$ | 100 | 53 | 28 | 10 | 9 |

Chemical analysis

| CdO | 26.8 % (2.01) |
|---|---|
| ZnO | 17.0 % (2.03) |
| NiO | 15.6 % (2.03) |
| $Al_2O_3$ | 5.3 % (0.44) |
| $Fe_2O_3$ | 8.4 % (0.50) |
| $CO_2$ | 6.3 % (1.04) |
| $H_2O$ | 20.8 % (12.10) |

EXAMPLE 30

Into 200 ml of water 13.2 g of CaCl₂·6H₂O, 15.9 g of SrCl₂·6H₂O, 7.5 g of Al(NO₃)₃·9H₂O and 5.4 g of FeCl₃·6H₂O. Separately, 4.7 g of Na₂CrO₄·4H₂O were dissolved in 100 ml of water. Together with an aqueous solution containing 2.0 moles of per liter of NaOH, both liquors were added dropwise to a four-neck flask charged with 100 ml of water at room temperature under agitation in a N₂ gas current. The addition of the NaOH aqueous solution was controlled so that the pH of the reaction liquor was maintained above 13. The resulting suspension was filtered in a N₂ gas atmosphere, and the remaining precipitate was washed with 200 ml of decarbonated water in a N₂ gas atmosphere and dried at 60°C. for 10 hours in a N₂ gas current. Results of the analysis of the product are as follows:

Composition formula
$(Ca_3Sr_3)(AlFe)(OH)_{16}CrO_4 \cdot 4H_2O$
  $K = 0$ (Ca-CrO₄ series)
  $K = 0$ (Sr-CrO₄ series)
  $x/y = 3$
  $z/(x+y) = 1/8$ X-ray diffraction

| $d(A)$ | 7.68 | 3.88 | 2.46 | 2.33 |
|---|---|---|---|---|
| $I/I_o$ | 100 | 52 | 25 | 10 |

Chemical analysis

| CaO | 18.2 % (3.01) |
|---|---|
| SrO | 32.6 % (3.02) |
| $Al_2O_3$ | 5.5 % (0.50) |
| $Fe_2O_3$ | 8.6 % (0.48) |
| $CrO_4$ | 12.5 % (0.99) |
| $H_2O$ | 23.0 % (12.20) |

EXAMPLE 31

A mixed liquor of 51.2 ml of a sodium sulfate solution containing 0.785 mole per liter of $Na_2SO_4$ and 160 ml of a caustic soda solution containing 2 moles per liter of NaOH and another mixed liquor of 100 ml of a beryllium sulfate solution containing 1.2 moles per liter of $BeSO_4$ and 100 ml of an aluminum sulfate solution containing 0.2 mole per liter of $Al_2O_3$ were added at 50°C. dropwise to a 500-ml capacity beaker charged with 60 ml of water under agitation. The addition of these liquors was so adjusted that the pH of the reaction suspension was maintained at 10.0 – 10.5. After completion of the reaction, the resulting suspension was subjected to hydrothermal treatment at 150°C. in an autoclave, and allowed to cool. Post-treatments were conducted in the same manner as in Example 1. Results of the analysis of the product are as follows:

Composition formula
$Be_6Al_2(OH)_{16}SO_4 \cdot 4H_2O$ $K = 22.1$
$x/y = 3$
$z/(x+y) = 1/8$ X-ray diffraction

| $d(A)$ | 6.32 | 3.18 | 2.35 | 1.87 |
|---|---|---|---|---|
| $I/I_o$ | 100 | 51 | 18 | 9 |

Chemical analysis
BeO     26.4 % (5.93)
$Al_2O_3$  18.2 % (1.0)
$SO_3$    17.5 % (1.22)
$H_2O$    38.2 % (11.92)

EXAMPLE 32

A mixed liquor of 100 ml of a calcium chloride solution containing 1.2 moles per liter of CaO and 100 ml of a ferric chloride solution containing 0.2 mole per liter of $Fe_2O_3$ and another mixed liquor of 100 ml of a caustic soda solution containing 20 g of NaOH and 100 ml of a sodium carbonate solution containing 0.5 g of $Na_2CO_3$ were added dropwise to a 500-ml capacity beaker charged with 100 ml of water at room temperature under agitation. The addition of each liquor was so adjusted that the pH of the reaction liquor was maintained above 13.5. After completion of reaction, water was removed under reduced pressure from the resulting suspension, and the remaining solid was washed 250 ml of water and dried at 70°C. for 10 hours. Results of the analysis of the product are as follows:

Composition formula
$Ca_6Fe_2(OH)_{16}CO_3 \cdot 4H_2O$ $K = -3.0$
$x/y = 3$
$z/(x+y) = 1/8$ X-ray diffraction

| $d(A)$ | 7.89 | 3.81 | 2.56 | 2.34 | 1.52 |
|---|---|---|---|---|---|
| $I/I_o$ | 100 | 42 | 12 | 9 | 4 |

Chemical analysis
CaO     44.6 % (6.02)
$Fe_2O_3$  21.1 % (1.0)
$CO_2$    6.3 (1.08)
$H_2O$    28.0 % (11.80)

EXAMPLE 33

16.7 g of $FeSO_4 \cdot 7H_2O$ and 17.5 g of $Ni(NO_3)_2 \cdot 6H_2O$ were dissolved into 100 ml of ion-exchange water from which oxygen had been removed for prevention of oxidation. Separately, 2.1 g of $Na_2CO_3$ and 12.8 g of NaOH were dissolved into 200 ml of ion-exchange water from which oxygen had been removed. Together with 100 ml of an aluminum sulfate solution containing 0.2 mole per liter of $Al_2O_3$, both liquors were added dropwise at room temperature under agitation to a four-neck flask charged with 100 ml of water made reducible by passage of hydrogen gas. The addition of each liquor was so adjusted that a pH electrode inserted in an airtight manner in the flask would indicate the value of 10 ± 0.2. After completion of the reaction, the resulting suspension was subjected to the water-removing treatment in a $N_2$ gas atmosphere, and the remaining solids was washed with 100 ml of ion-exchange water from which oxygen has been removed, and dried in a $N_2$ gas current. Results of the analysis of the product are as follows:

Composition formula
$Fe_3Ni_3Al_2(OH)_{16}CO_3 \cdot 4H_2O$ $K = 4.6$ (Fe-$CO_3$ series)
$K = 6.1$ (Ni-$CO_3$ series)
$x/y = 3$
$z/(x+y) = 1/8$ X-ray diffraction

| $d(A)$ | 7.89 | 3.93 | 2.64 | 2.31 |
|---|---|---|---|---|
| $I/I_o$ | 100 | 53 | 19 | 9 |

Chemical analysis
FeO     27.0 % (3.02)
NiO     28.5 % (3.07)
$Al_2O_3$  12.7 % (1.0)
$CO_2$    5.8 % (1.05)
$H_2O$    27.0 % (12.0)

EXAMPLE 34

A liquor of 7.25 g of $Cu(NO_3)_2 \cdot 3H_2O$, 8.95 g of $Zn(NO_3)_2 \cdot 6H_2O$ and 8.75 g of $Ni(NO_3)_2 \cdot 6H_2O$ dissolved in 100 ml of water was mixed with 100 ml of an aluminum nitrate solution containing 0.2 mole per liter of $Al_2O_3$. Together with the so formed mixed liquor, a mixed liquor of 25.6 ml of a sodium carbonate containing 0.785 mole per liter of $Na_2CO_3$ and 160 ml of a caustic soda solution containing 2 moles per liter of NaOH was continuously added dropwise to a 500-ml capacity beaker charged with 100 ml of water at 30° ± 1°C. under agitation, while the pH of the reaction liquor was adjusted to 10 ± 0.3. After completion of the reaction, the resulting suspension was subjected to the water-removing treatment under reduced pressure, and the remaining solid was washed with 200 ml of water and dried at 80°C. for 10 hours. Results of the analysis of the product are as follows:

Composition formula
$Cu_2Zn_2Ni_2Al_2(OH)_{16}CO_3 \cdot 4H_2O$ $K = 6.1$ (Ni-$CO_3$ series)
$K = 5.3$ (Zn-$CO_3$ series)
$K = 9.0$ (Cu-$CO_3$ series)
$x/y = 3$
$z/(x+y) = 1/8$ X-ray diffraction

| $d(A)$ | 7.78 | 3.86 | 2.58 | 2.40 | 1.53 |
|---|---|---|---|---|---|
| $I/I_o$ | 100 | 32 | 11 | 9 | 4 |

Chemical composition
CuO     18.5 % (1.95)
NiO     18.0 % (2.02)
ZnO     19.1 % (1.97)
$Al_2O_3$  12.2 % (1.0)
$CO_3$    5.3 % (1.01)
$H_2O$    26.0 % (12.05)

EXAMPLE 35

100 ml of a rhodium chloride solution of a concentration of 0.2 mole/liter calculated as $Rh_2O_3$ was mixed with 100 ml of a zinc chloride solution of a concentration of 1.2 moles/liter calculated as ZnO. Together with the so formed mixed liquor, a mixed liquor of 25.6 ml of a sodium carbonate solution of a concentration of 0.785 mole/liter and 80 ml of a potassium hydroxide solution of a concentration of 4 moles/liter were added dropwise to a 500-ml capacity beaker charged with 80 ml of water under agitation. The reaction temperature was maintained at 8°– 10°C. and the pH of the reaction liquor was maintained at 10 – 11. Water was rapidly removed from the resulting suspension, and the remaining solid was washed with 200 ml of water and dried at 60°C. for 15 hours. Results of the analysis of the product are as follows:

Composition formula
$Zn_6Rh_2(OH)_{16}CO_3 \cdot 4H_2O$  
$K = 5.3$  
$x/y = 3$  
$z/(x + y) = 1/8$

| X-ray diffraction | | | | | |
|---|---|---|---|---|---|
| $d(A)$ | 7.75 | 3.81 | 2.58 | 2.35 | 1.52 |
| $I/I_o$ | 100 | 52 | 25 | 15 | 7 |

Chemical analysis
| | |
|---|---|
| ZnO | 48.8 % (6.02) |
| $Rh_2O_3$ | 25.2 % (1.0) |
| $CO_2$ | 6.0 % (1.04) |
| $H_2O$ | 20.2 % (12.11) |

EXAMPLE 36

A liquor of 8.32 g of $FeSO_4 \cdot 7H_2O$, 8.75 g of $Co(NO_3)_2 \cdot 6H_2O$ and 8.75 g of $Ni(NO_3)_2 \cdot 6H_2O$ dissolved in 100 ml of ion-exchange water from which oxygen had been removed, was mixed with a 100 ml of an aluminum sulfate solution prepared by dissolving 0.2 mole per liter of aluminum sulfate into ion-exchange water from which oxygen had been removed. Together with the so formed mixed liquor, a mixed liquor of 25.6 ml of a sodium carbonate solution of a concentration of 0.785 mole/liter and 160 ml of a caustic soda solution of a concentration of 2.0 moles/liter were continuously added dropwise at room temperature under agitation to a four-neck flask charged with 50 ml of water to which hydrogen gas was passed. The pH of the reaction liquor was maintained at 10 ± 0.2. After completion of the reaction, the resulting suspension was dried in a $N_2$ gas atmosphere, and the solid was washed with 100 ml of water and dried at 0°C. for 12 hours. Results of the analysis of the product are as follows:

Composition formula
$Fe_2Co_2Ni_2Al_2(OH)_{16}CO_3 \cdot 4H_2O$  
$K = 4.6$ (Fe-$CO_3$ series)  
$K = 2.9$ (Co-$CO_3$ series)  
$K = 6.1$ (Ni-$CO_3$ series)  
$x/y = 3$  
$z/(x + y) = 1/8$

| X-ray diffraction | | | | | |
|---|---|---|---|---|---|
| $d(A)$ | 7.89 | 3.88 | 2.59 | 2.32 | 1.51 |
| $I/I_o$ | 100 | 48 | 20 | 12 | 10 |

Chemical analysis
| | |
|---|---|
| FeO | 17.8 % (1.96) |
| CoO | 18.7 % (1.97) |
| NiO | 19.0 % (2.00) |
| $Al_2O_3$ | 13.0 % (1.0) |
| $CO_2$ | 5.9 % (1.10) |
| $H_2O$ | 26.5 % (11.7) |

EXAMPLE 37

100 ml of a hydrochloric acid-acidified bismuth solution (concentration = 0.2 mole/liter calculatd as $Bi_2O_3$), the pH of which had been adjusted to 1 by addition hydrochloric acid, was mixed with 100 ml of a nickel nitrate solution (concentration = 1.2 moles/liter calculated as NiO). Together with the so formed mixed liquor, a mixed liquor of 25.6 ml of a sodium carbonate solution of a concentration of 0.785 mole/liter and 160 ml of a caustic soda solution of a concentration of 2.0 moles/liter were added dropwise to a 500-ml capacity beaker charged with 50 ml of water. The reaction was conducted at 5°C., while the pH of the reaction liquor was maintained at 11 – 12. After completion of the reaction, water was removed under reduced pressure, and the remaining solid was washed with 200 ml of ice water and dried at 50°C. for 20 hours. Results of the analysis of the product are as follows:

Composition formula
$Ni_6Bi_2(OH)_{16}CO_3 \cdot 4H_2O$  
$K = 6.1$  
$x/y = 3$  
$z/(x + y) = 1/8$

| X-ray diffraction | | | | |
|---|---|---|---|---|
| $d(A)$ | 7.49 | 3.70 | 2.50 | 2.43 | 1.57 |
| $I/I_o$ | 100 | 51 | 18 | 13 | 9 |

Chemical analysis
| | |
|---|---|
| NiO | 38.0 % (6.00) |
| $Bi_2O_3$ | 39.6 % (1.0) |
| $CO_2$ | 3.8 % (1.01) |
| $H_2O$ | 18.1 % (11.85) |

EXAMPLE 38

A solution of 32.0 g of $SrCl_2 \cdot 6H_2O$ and 13.2 g of $YCl_3 \cdot 6H_2O$ dissolved in 200 ml of water was added at room temperature under agitation to a 500-ml capacity beaker charged with 60 ml of water, together with 10 ml of a sodium carbonate solution of a concentration of 0.785 mole/liter and a caustic soda solution of a concentration of 4 moles/liter. The pH of the reaction liquor was adjusted to 13.0 – 13.5. After completion of the reaction, the resulting suspension was subjected to the hydrothermal treatment at 150°C. under 5 atmospheres, and then water was removed therefrom under reduced pressure. The remaining solid was washed with 250 ml of water and dried for 15 hours at 70°C. Results of the analysis of the product are as follows:

Composition formula
$Sr_6Y_2(OH)_{16}CO_3 \cdot 4H_2O$  
$K = -5.5$  
$x/y = 3$  
$z/(x + y) = 1/8$

| X-ray diffraction | | | | |
|---|---|---|---|---|
| $d(A)$ | 7.89 | 3.96 | 2.65 | 1.99 |
| $I/I_o$ | 100 | 38 | 11 | 8 |

Chemical analysis
| | |
|---|---|
| SrO | 56.4 % (6.13) |
| $Y_2O_3$ | 20.0 % (1.0) |
| $CO_3$ | 4.3 % (1.10) |
| $H_2O$ | 12.1 % (11.90) |

EXAMPLE 39

The following four solutions, namely (1) an aqueous solution of $Zn(NO_3)_2 \cdot 6H_2O$ of a concentration of 0.6 mole/liter calculated as ZnO, (2) an aqueous solution of $Cr(NO_3)_3 \cdot 9H_2O$ of a concentration of 0.2 mole/liter calculated as $Cr_2O_3$, the pH of which had been adjusted to 1 by addition of hydrochloric acid so as to prevent hydrolysis, (3) an aqueous solution of $(NH_4)_2CO_3$ of a concentration of 0.1 mole/liter and (4) an aqueous solution of NaOH of a concentration of 2.0 moles/liter, were fed to a reaction tank at rates of 20 ml/min, 20 ml/min and 18 ml/min, respectively, by means of a controllable pumps. The reaction tank was a 2,000-ml capacity cylindrical reactor equipped with a constant rate stirrer, which was charged with 500 ml of water in advance. So as to adjust the pH of the reaction liquor to a range of 8 – 9 where the development of polymerization of trivalent chromium hydroxide is low, the pH was maintained at 8.5 ± 0.1 by adjusting the feed of the caustic soda solution. The reaction was conducted under agitation by the constant rate stirrer. The reaction suspension which overflowed in 90 minutes from the initiation of the reaction was thrown away, and the suspension which overflowed after than time was collected and subjected to the hydrothermal treatment at 150°C. for 5 hours in an autoclave. Post-treatments were carried out in the same manner as in Example 38. Results of the analysis of the product are as follows:

Composition formula
$Zn_6Cr_2(OH)_{16}CO_3 \cdot 4H_2O$   $K = 5.3$
$x/y = 3$
$z/(x + y) = 1/8$ X-ray diffraction

| $d(A)$ | 7.82 | 3.88 | 2.59 | 1.53 | 1.51 |
|---|---|---|---|---|---|
| $I/I_o$ | 100 | 48 | 25 | 10 | 8 |

Chemical analysis

| ZnO | 54.2 % (6.03) |
|---|---|
| $Cr_2O_3$ | 16.9 % (1.0) |
| $CO_3$ | 4.9 (1.02) |
| $H_2O$ | 24.1 (12.12) |

EXAMPLE 40

In 100 ml of a solution of nickel chloride of a concentration of 1.2 moles/per liter calculated as NiO, 3.6 g of $FeCl_3 \cdot 6H_2O$, 5.3 g of $Cr(NO_3)_3 \cdot 9H_2O$ and 5.0 g of $Al(NO_3)_3 \cdot 9H_2O$, were dissolved and the pH of the solution was adjusted to 1 by concentrated hydrochloric acid. 100 ml of the so prepared solution acidified by hydrochloric acid was added dropwise at room temperature under agitation to a 500-ml capacity beaker charged with 80 ml of water, together with 25.6 ml of a sodium carbonate solution of a concentration of 0.785 mole/liter and a caustic soda solution of a concentration of 2.0 moles/liter. The pH of the reaction liquor was maintained above 13 by adjusting the addition of the caustic soda solution. After completion of the reaction, water was removed from the resulting suspension under reduced pressure, and the remaining solid was washed with water and dried. Results of the analysis of the product are as follows:

Composition formula
$Ni_6Fe_{2/3}Cr_{2/3}Al_{2/3}(OH)_{16}CO_3 \cdot 4H_2O$   $K = 6.1$
$x/y =$
$z/(x + y) = 1/8$ X-ray diffraction

| $d(A)$ | 7.96 | 3.98 | 2.65 | 2.35 | 1.54 | 1.52 |
|---|---|---|---|---|---|---|
| $I/I_o$ | 100 | 45 | 23 | 15 | 12 | 12 |

Chemical analysis

| NiO | 53.0 % (6.03) |
|---|---|
| $Fe_2O_3$ | 6.3 % (0.34) |
| $Cr_2O_3$ | 6.0 % (0.35) |
| $Al_2O_3$ | 4.0 % (0.33) |
| $CO_2$ | 7.0 % (0.99) |
| $H_2O$ | 23.9 % (12.10) |

EXAMPLE 41

A liquor of 8.0 g of $Zn(NO_3)_2 \cdot 6H_2O$ and 18.5 g of $Cd(NO_3)_2 \cdot 4H_2O$ dissolved in 100 ml of water was mixed with 100 ml of an aluminum nitrate solution of a concentration of 0.2 mole/liter calculated as $Al_2O_3$. Together with 200 ml of a sodium carbonate solution of a concentration of 0.185 mole/liter and a caustic soda solution of a concentration of 2.0 moles/liter, the so formed mixed liquor was continuously added dropwise at room temperature under agitation to a 500-ml capacity beaker charged with 100 ml of water. The pH of the reaction liquor was maintained at 11 – 12 by adjusting the feed of the caustic soda solution. The resulting suspension was filtered under reduced pressure, and the recovered solid was washed with water and dried. Results of the analysis of the product are as follows:

Composition formula
$Zn_3Cd_3Al_2(OH)_{16}CO_3 \cdot 4H_2O$   $K = 5.3$ ($Zn$-$CO_3$ series)
$K = 0$ ($Cd$-$CO_3$ series)
$x/y = 3$
$z/(x + y) = 1/8$ X-ray diffraction

| $d(A)$ | 7.75 | 3.80 | 2.67 | 2.28 | 1.54 | 1.50 |
|---|---|---|---|---|---|---|
| $I/I_o$ | 100 | 23 | 18 | 11 | 5 | 5 |

Chemical analysis

| ZnO | 24.8 % (3.02) |
|---|---|
| CdO | 38.7 % (2.98) |
| $Al_2O_3$ | 10.3 % (1.0) |
| $CO_3$ | 4.3 (0.97) |
| $H_2O$ | 21.8 % (12.01) |

EXAMPLE 42

$FeCl_3 \cdot 6H_2O$ and $Ni(NO_3)_2 \cdot 6H_2O$ were dissolved in water so that the concentration of each salt was 0.4 mole/liter, and the pH of the resulting liquor was adjusted to 1 by addition of dilute hydrochloric acid. The so formed liquor, a sodium carbonate solution of a concentration of 0.2 mole/liter and a NaOH solution of a concentration of 4.0 moles/liter were added dropwise under agitation to a reaction tank charged with 500 ml of water at feed rates of 20 ml/min, 15 ml/min and about 15 ml/min, respectively. The reaction tank was kept in a thermostat tank so that the temperature of the reaction liquor was maintained at 30 ± 1°C. In 20 minutes after initiation of the reaction, the pH became stable and maintained at 9.8 ± 0.1. About 45 minutes after initiation of the reaction, overflowing of the reaction suspension took place, and the liquor which overflowed was continuously collected and heated at 80°C. for 5 hours. The reaction was continued for 2 hours, and the heat-treated reaction suspension was subjected to water-removing treatment under reduced pressure. The remaining solid was washed with 1000 ml of water and dried at 80°C. for 10 hours. Results of the analysis of the product are as follows:

Composition formula
$NiFe_2(OH)_{7.2}(CO_3)_{0.4} \cdot 0.8H_2O$   $K = 6.1$
$x/y = 1/2$
$z/(x + y) = 1/7.5$ X-ray diffraction

| $d(A)$ | 7.30 | 3.64 | 2.56 | 2.28 | 1.52 |
|---|---|---|---|---|---|
| $I/I_o$ | 100 | 58 | 36 | 25 | 10 |

Chemical analysis

| NiO | 22.6 % (1.0) |
|---|---|
| $Fe_2O_3$ | 48.2 % (1.0) |
| $CO_2$ | 5.3 % (0.40) |
| $H_2O$ | 23.9 % (4.39) |

EXAMPLE 43

$FeCl_3 \cdot 6H_2O$ and $Ni(NO_3)_2 \cdot 6H_2O$ were dissolved in water so that the concentration of the ferric salt was 0.2 mole/liter and the concentration of the nickel salt was 0.60 mole/liter, and the pH of the resulting liquor was adjusted to 1 by addition of dilute hydrochloric acid. The so formed liquor and a sodium carbonate solution of a concentration of 0.20 mole/liter were fed to 2-liter capacity reaction tank equipped with an overflow device, at feed rates of 30 ml/min and 20 ml/min, respectively. Ammonia gas was being blown from the bottom of the reaction tank and the reaction tank had been charged with 500 ml of water in advance. The agitation was effected at 80 r.p.m. by a stirrer. The reaction tank was kept in a thermostat tank so that the temperature of the reaction liquor was maintained at 30 ± 1°C. Two pH electrodes were inserted into the reaction tank to connect pH meters positioned in the upper and middle portions of the reaction tank, and the pH of the reaction suspension was maintained at 9.8 – 10.3 by adjusting the blowing of the ammonia gas. In about 20 minutes from the initiation of the reaction, the pH became stable and was in the range of 10.0 ± 0.1 at which H the reaction was allowed to advance constantly. The reaction liquor which overflowed in about 40 minutes from the initiation of the reaction was thrown away, and the reaction suspension which overflowed after that time was continuously collected and treated in the same manner as in Example 42, except that after the water washing, water was added in such an amount that the liquor had the original volume and then it was heat-treated. Results of the analysis of the product are as follows:

Composition formula
$Ni_{3.2}Fe_2(OH)_{11.1}(CO_3)_{0.62} \cdot 2.2H_2O$
$K = 6.1$
$x/y = 1.6$
$z/(x+y) = 1/8.25$ X-ray diffraction

| $d(Å)$ | 7.62 | 3.81 | 2.56 | 2.26 | 1.95 | 1.52 | 1.49 |
|---|---|---|---|---|---|---|---|
| $I/I_o$ | 100 | 55 | 44 | 35 | 25 | 15 | 15 |

Chemical analysis

| NiO | 42.2 % (3.2) |
|---|---|
| $Fe_2O_3$ | 28.2 % (1.0) |
| $CO_2$ | 5.0 % (0.64) |
| $H_2O$ | 24.6 % (7.73) |

EXAMPLE 44

$FeCl_3 \cdot 6H_2O$ and $Ni(NO_3)_2 \cdot 6H_2O$ were dissolved in water so that the concentration of the ferric salt was 0.1 mole/liter and the concentration of the nickel salt was 0.50 mole/liter, and the pH of the resulting liquor was adjusted to 1 by dilute hydrochloric acid. The so formed liquor and a sodium carbonate solution of a concentration of 0.15 mole/liter were fed to the same reaction tank as used in Example 43 at feed rates of 25 ml/min and 16 ml/min, respectively. The reaction was conducted in the same manner as in Example 43 while adjusting the pH of the reaction liquor to 10.0 – 10.5. The resulting suspension was treated in the same manner as in Example 43. Results of the analysis of the product are as follows:

Composition formula
$Ni_{5.0}Fe_2(OH)_{14.3}(CO_3)_{0.9} \cdot 3.4H_2O$
$K = 6.1$
$x/y = 2.5$
$z/(x+y) = 1/7.7$ X-ray diffraction

| $d(Å)$ | 7.75 | 3.86 | 2.58 | 2.28 | 1.96 | 1.52 | 1.48 |
|---|---|---|---|---|---|---|---|
| $I/I_o$ | 100 | 45 | 30 | 25 | 20 | 8 | 8 |

Chemical analysis

| NiO | 48.9 % (5.0) |
|---|---|
| $Fe_2O_3$ | 20.9 % (1.0) |
| $CO_2$ | 5.2 % (0.90) |
| $H_2O$ | 25.0 % (10.60) |

EXAMPLE 45

$FeCl_3 \cdot 6H_2O$ and $Ni(NO_3)_2 \cdot 6H_2O$ were dissolved in water so that the concentration of the ferric salt was 0.10 mole/liter and the concentration of the nickel salt was 0.70 mole/liter, and the pH of the liquor was adjusted to 1 by addition of dilute hydrochloric acid. The so formed liquor and a sodium carbonate solution of a concentration of 0.20 mole/liter were fed to the same reaction tank as used in Example 43 at feed rates of 45 ml/min and 24 ml/min, respectively. The reaction was conducted in the same manner as in Example 43 while adjusting the pH of the reaction liquor to 10.2 – 10.7. The resulting suspension was treated in the same manner as in Example 43 except that the hydrothermal treatment was conducted at 90°C. Results of the analysis of the product are as follows:

Composition formula
$Ni_{6.9}Fe_2(OH)_{17.5}(CO_3)_{1.1} \cdot 3.8H_2O$
$K = 6.1$
$x/y = 3.45$
$z/(x+y) = 1/7.87$ X-ray diffraction

| $d(Å)$ | 7.98 | 3.88 | 2.60 | 2.33 | 2.00 | 1.54 | 1.52 |
|---|---|---|---|---|---|---|---|
| $I/I_o$ | 100 | 52 | 28 | 24 | 18 | 12 | 12 |

Chemical analysis

| NiO | 54.3 % (6.91) |
|---|---|
| $Fe_2O_3$ | 16.8 % (1.0) |
| $CO_2$ | 5.1 % (1.10) |
| $H_2O$ | 23.8 % (12.56) |

EXAMPLE 46

$FeCl_3 \cdot 6H_2O$ and $Ni(NO_3)_2 \cdot 6H_2O$ were dissolved in water so that the concentration of the ferric salt was 0.10 mole/liter and the concentration of the nickel salt was 0.85 mole/liter, and the pH of the liquor was adjusted to 1 by addition of dilute hydrochloric acid. The so formed liquor and a sodium carbonate solution of a concentration of 0.20 mole were fed to the same reaction tank as used in Example 43, at feed rates of 50 ml/min and 35 ml/min, respectively. The reaction was conducted in the same manner as in Example 43, while adjusting the pH of the reaction liquor to 10.2 – 10.7. The resulting suspension was treated in the same manner as in Example 45. Results of the analysis of the product are as follows:

Composition formula
$Ni_{8.5}Fe_2(OH)_{20.3}(CO_3)_{1.4} \cdot 3.7H_2O$
$K = 6.1$
$x/y = 4.25$
$z/(x+y) = 1/7.78$ X-ray diffraction

| $d(Å)$ | 8.08 | 4.02 | 2.59 | 2.24 | 1.54 | 1.52 |
|---|---|---|---|---|---|---|
| $I/I_o$ | 100 | 38 | 26 | 21 | 12 | 15 |

Chemical analysis

| NiO | 57.4 % (8.52) |
|---|---|
| $Fe_2O_3$ | 14.4 % (1.0) |
| $CO_2$ | 5.6 % (1.41) |
| $H_2O$ | 22.6 % (13.91) |

EXAMPLE 47

$FeCl_3 \cdot 6H_2O$ and $Ni(NO_3)_2 \cdot 6H_2O$ were dissolved in water so that the concentration of the ferric salt was 0.05 mole/liter and the concentration of the nickel salt was 0.50 mole/liter, and the pH of the liquor was adjusted to 1 by addition of hydrochloric acid. The so formed liquor and a sodium carbonate solution of a concentration of 0.10 mole/liter were fed to the same reaction tank as used in Example 43 at feed rates of 30 ml/min and 24 ml/min, respectively. The reaction was conducted in the same manner as in Example 43 while adjusting pH of the reaction liquor to 10.3 – 10.8. The resulting suspension was treated in the same manner as in Example 45. Results of the analysis of the product are as follows:

Composition formula
$Ni_{10}Fe_2(OH)_{22.8}(CO_3)_{1.6} \cdot 3.7H_2O$ $K = 6.1$
$x/y = 5$
$z/(x+y) = 1/7.5$ X-ray diffraction

| $d(A)$ | 8.18 | 4.07 | 2.62 | 1.55 | 1.54 |
|---|---|---|---|---|---|
| $I/I_o$ | 100 | 35 | 29 | 18 | 18 |

Chemical analysis

| NiO | 59.8 % (10.02) |
|---|---|
| $Fe_2O_3$ | 12.8 % (1.0) |
| $CO_2$ | 5.6 % (1.59) |
| $H_2O$ | 22.0 % (15.18) |

EXAMPLE 48

$FeCl_3 \cdot 6H_2O$ and $Ni(NO_3)_2 \cdot 6H_2O$ were dissolved in water so that the concentration of the ferric salt was 0.05 mole/liter and the concentration of the nickel salt was 0.70 mole/liter, and the pH of the resulting liquor was adjusted to 1 by addition of hydrochloric acid. The so formed liquor and a sodium carbonate aqueous solution of a concentration of 0.10 mole/liter were fed to the same reaction tank as used in Example 43 at feed rates of 15 ml/min and 16 ml/min, respectively. The reaction was conducted in the same manner as in Example 43 while adjusting the pH of the reaction liquor to 10.3 – 10.8. The resulting suspension was treated in the same manner as in Example 45. Results of the analysis of the product are as follows:

Composition formula
$Ni_{14}Fe_2(OH)_{29.6}(CO_3)_{2.2} \cdot 4.2H_2O$ $K = 6.1$
$x/y = 7$
$z/(x+y) = 1/7.17$ X-ray diffraction

| $d(A)$ | 8.24 | 4.10 | 2.72 | 1.53 |
|---|---|---|---|---|
| $I/I_o$ | 100 | 30 | 25 | 15 |

Chemical analysis

| NiO | 63.7 % (14.10) |
|---|---|
| $Fe_2O_3$ | 9.7 % (1.0) |
| $CO_2$ | 5.9 % (2.24) |
| $H_2O$ | 21.9 % (19.08) |

EXAMPLE 49

$FeCl_3 \cdot 6H_2O$ and $Ni(NO_3)_2 \cdot 6H_2O$ were dissolved in water so that the concentration of the ferric salt 0.05 mole/liter and the concentration of the nickel salt was 0.80 mole/liter, and the pH of the liquor was adjusted to 1 by addition of dilute hydrochloric acid. The so formed liquor and a sodium carbonate solution of a concentration of 0.10 mole/liter were fed to the same reaction tank as used in Example 43 at feed rates of 30 ml/min and 34 ml/min, respectively. The reaction was conducted in the same manner as in Example 43 while maintaining the pH of the reaction liquor at 10.3 – 10.8. The resulting suspension was treated in the same manner as in Example 45. Results of the analysis of the product are as follows:

Composition formula
$N_{16.2}Fe_2(OH)_{33.4}(CO_3)_{2.5} \cdot 4.3H_2O$ $K = 6.1$
$x/y = 8.1$
$z/(x+y) = 1/28$ -Continued X-ray diffraction

| $d(A)$ | 8.28 | 4.21 | 1.54 |
|---|---|---|---|
| $I/I_o$ | 100 | 10 | 8 |

Chemical analysis

| NiO | 65.1 % (16.28) |
|---|---|
| $Fe_2O_3$ | 8.6 % (1.0) |
| $CO_2$ | 5.9 % (2.51) |
| $H_2O$ | 20.5 % (21.1) |

EXAMPLE 50

$Zn(NO_3) \cdot 6H_2O$ and $Al(NO_3)_3 \cdot 9H_2O$ were dissolved in water so that the concentration of the zinc salt was 0.10 mole/liter and the concentration of the aluminum salt was 0.40 mole/liter. The so formed liquor, a $Na_2SO_4$ aqueous solution of a concentration of 0.20 mole/liter and a NaOH aqueous solution were fed to a 2-liter capacity cylindrical reaction tank equipped with an overflow device, at feed rates of 4 ml/min, 22.5 ml/min and 25.5 ml/min, respectively. The reaction tank had been charged with 500 ml of water in advance. A constant rate stirrer was provided in the reaction tank and pH electrodes were inserted therein to connect pH meters and recorders. The temperature of the reaction tank was maintained at 40° ± 1°C. and the temperature of each liquor was adjusted to 40° ± 1°C. prior to feeding. In the initial stage of the reaction the pH of the reaction liquor was adjusted to 9.2 – 9.7 by controlling the feeding rate of the NaOH solution, and when the reaction began to advance stably, the pH was maintained at 9.5 ± 0.1. The reaction was continued for 5 hours. The liquor which overflowed in two hours from the initiation of the reaction was thrown away, and the suspension which overflowed after that time was collected. Water was removed from the collected suspension under reduced pressure, and the residue was washed with water and dried at 80°C. Results of the analysis of the product are as follows:

Composition formula
$ZnAl_4(OH)_{12.7}(SO_4)_{0.63} \cdot 1.6H_2O$ $K = 11.2$
$x/y = ¼$
$z/(x+y) = 1/7.93$ X-ray diffraction

| $d(A)$ | 7.55 | 3.77 | 2.58 | 1.52 |
|---|---|---|---|---|
| $I/I_o$ | 100 | 28 | 20 | 9 |

Chemical analysis

| ZnO | 17.4 % (1.00) |
|---|---|
| $Al_2O_3$ | 43.7 % (2.0) |
| $SO_3$ | 8.4 % (0.63) |
| $H_2O$ | 30.8 % (8.0) |

EXAMPLE 51

$Zn(NO_3)_2 \cdot 6H_2O$ and $Al(NO_3)_3 \cdot 9H_2O$ were dissolved in water so that the concentration of the zinc salt was 0.30 mole/liter and the concentration of the aluminum salt would be 0.60 mole/liter. The so formed liquor, an aqueous solution of $Na_2SO_4$ of a concentration of 0.20 mole/liter and a 2N aqueous solution of NaOH were fed to the same reaction tank as used in Example 50 at feed rates of 20 ml/min, 19 ml/min and 22 ml/min, respectively. The reaction was conducted in the same manner as in Example 50 while maintaining the pH of the reaction liquor to 9.5 – 10.0. The resulting suspension was treated in the same manner as in Example 50. Results of the analysis of the product are as follows:

Composition formula
 Zn$A_2$(OH)$_{7.24}$(SO$_3$)$_{0.38}$ . 1.2H$_2$O
K = 11.2
x/y = ½
z/(x + y) = 1/7.9

X-ray diffraction

| d(A) | 7.62 | 3.94 | 2.58 | 2.28 | 1.93 | 1.53 | 1.50 |
|---|---|---|---|---|---|---|---|
| I/I$_o$ | 100 | 31 | 34 | 22 | 18 | 10 | 12 |

Chemical analysis
 ZnO      27.7 % (1.00)
 Al$_2$O$_3$   34.8 % (1.0)
 SO$_2$    8.1 % (0.38)
 H$_2$O    29.5 % (4.8)

EXAMPLE 52

Zn(NO$_3$)$_2$ . 6H$_2$O and Al(NO$_3$)$_3$ . 9H$_2$O were dissolved in water so that the concentration of the zinc salt was 0.30 mole/liter and the concentration of the aluminum salt was 0.20 mole/liter. The so formed liquor, an aqueous solution of Na$_2$SO$_3$ of a concentration of 0.10 mole/liter and a 2N aqueous solution of NaOH were fed to the same reaction tank as used in Example 50 at feed rates of 40 ml/min, 25 ml/min and 21.5 ml/min, respectively. The reaction was conducted in the same manner as in Example 50 while maintaining the pH of the reaction liquor at 9.5 – 10.0. The resulting suspension was treated in the same manner as in Example 50. Results of the analysis of the product are as follows:

Composition formula
 Zn$_3$Al$_2$(OH)$_{10.74}$(SO$_3$)$_{0.63}$ . 2.0H$_2$O
K = 11.2
x/y = 1.5
z/(x + y) = 1/7.93

X-ray diffraction

| d(A) | 7.69 | 3.80 | 2.59 | 2.30 | 1.94 | 1.53 | 1.50 |
|---|---|---|---|---|---|---|---|
| I/I$_o$ | 100 | 30 | 31 | 22 | 20 | 15 | 16 |

Chemical analysis
 ZnO      46.0 % (3.00)
 Al$_2$O$_3$   19.3 % (1.0)
 SO$_2$    7.6 % (0.63)
 H$_2$O    26.3 % (7.65)

EXAMPLE 53

Zn(NO$_3$)$_2$ . 6H$_2$O and Al(NO$_3$)$_3$ . 9H$_2$O were dissolved in water so that the concentration of the zinc salt was 0.50 mole/liter and the aluminum salt conccentration was 0.20 mole/liter. The so formed liquor, an aqueous solution of Na$_2$SO$_3$ of a concentration of 0.20 mole/liter and a 4N aqueous solution of NaOH were fed to the same reaction tank as used in Example 50 at feed rates of 60 ml/min, 26.4 ml/min and 22 ml/min, respectively. The reaction was conducted in the same manner as in Example 50 while maintaining the pH of the reaction liquor at 9.7 – 10.3. The resulting suspension was treated in the same manner as in Example 50. Results of the analysis of the product are as follows:

Composition formula
 Zn$_4$Al$_2$(OH)$_{14.2}$(SO$_3$)$_{0.88}$ . 3.4H$_2$O
K = 11.2
x/y = 2.5
z/(x + y) = 1/7.95

X-ray diffraction

| d(A) | 7.75 | 3.85 | 2.61 | 2.31 | 1.96 | 1.54 | 1.51 |
|---|---|---|---|---|---|---|---|
| I/I$_o$ | 100 | 40 | 42 | 31 | 18 | 21 | 21 |

Chemical analysis
 ZnO      52.5 % (5.00)
 Al$_2$O$_3$   13.0 % (1.0)
 SO$_2$    7.3 % (0.88)
 H$_2$O    25.1 % (10.50)

EXAMPLE 54

An aqueous solution of Zn(NO$_3$)$_2$ . 6H$_2$O of a concentration of 1.2 moles/liter, an aqueous solution of Al(NO$_3$)$_3$ . 9H$_2$O of a concentration of 0.4 mole/liter, an aqueous solution of Na$_2$SO$_3$ of a concentration of 0.2 mole/liter, and an aqueous solution of KOH of a concentration of 4.0 moles/liter were fed to the same reaction tank as used in Example 50 at feed rates of 10 ml/min, 10 ml/min, 15 ml/min and about 8 ml/min, respectively. The reaction was conducted in the same manner as in Example 50 while maintaining the pH of the reaction liquor at 10.0 – 10.5. The resulting suspension was treated in the same manner as in Example 50. Results of the analysis of the product are as follows:

Composition formula
 Zn$_6$Al$_2$(OH)$_{16}$SO$_3$ . 4H$_2$O
K = 11.2
x/y = 3
z/(x + y) = 1/8

X-ray diffraction

| d(A) | 7.75 | 3.80 | 2.60 | 2.31 | 1.95 | 1.54 | 1.51 |
|---|---|---|---|---|---|---|---|
| I/I$_o$ | 100 | 28 | 10 | 9 | 9 | 4 | 4 |

Chemical analysis
 ZnO      55.2 % (6.00)
 Al$_2$O$_3$   11.5 % (1.0)
 SO$_2$    7.4 % (1.00)
 H$_2$O    24.5 % (12.00)

EXAMPLE 55

Zn(NO$_3$)$_2$ . 6H$_2$O and Al(NO$_3$)$_3$ . 9H$_2$O were dissolved in water so that the zinc salt concentration was 0.70 mole/liter and the aluminum salt concentration would be 0.20 mole/liter. The so formed liquor, an aqueous solution of Na$_2$SO$_3$ of a concentration of 0.20 mole/liter and an aqueous solution of NaOH were fed to the same reaction tank as used in Example 50 at feed rates of 20 ml/min, 11.5 ml/min and 18 ml/min, respectively. The reaction was conducted in the same manner as in Example 50 while maintaining the pH of the reaction liquor at 9.8 – 10.3. The resulting suspension was treated in the same manner as in Example 50. Results of the analysis of the product are as follows:

Composition formula
 Zn$_7$Al$_2$(OH)$_{17.6}$(SO$_3$)$_{1.2}$ . 4.9H$_2$O
K = 11.2
x/y = 3.5
z/(x + y) = 1/7.5

X-ray diffraction

| d(A) | 7.82 | 3.91 | 2.61 | 2.31 | 1.96 | 1.54 | 1.52 |
|---|---|---|---|---|---|---|---|
| I/I$_o$ | 100 | 28 | 25 | 15 | 10 | 12 | 12 |

Chemical analysis
 ZnO      56.7 % (7.10)
 Al$_2$O$_3$   10.0 % (1.0)
 SO$_2$    7.5 % (1.20)
 H$_2$O    24.2 % (13.70)

EXAMPLE 56

Zn(NO$_3$)$_2$ . 6H$_2$O and Al(NO$_3$)$_3$ . 9H$_2$O were dissolved in water so that the zinc salt concentration was 0.90 mole/liter and the aluminum salt concentration would be 0.20 mole/liter. The so formed liquor, an aqueous solution of Na$_2$SO$_3$ concentration of 0.20 mole/liter and an aqueous solution of NaOH were fed to the same reaction tank as used in Example 50 at feed rates of 20 ml/min, 14 ml/min and 21 ml/min, respectively. The reaction was conducted in the same manner as in Example 50 while maintaining the pH of the reaction liquor at 9.8 – 10.5. The resulting suspension was treated in the same manner as in Example 50. Results of the analysis of the product are as follows:

Composition formula
$Zn_9Al_2(OH)_{21.2}(SO_3)_{1.4} \cdot 4.9H_2O$     $K = 11.2$
                                                  $x/y = 4.5$
                                                  $z/(x+y) = 1/7.85$ X-ray diffraction

| d(Å)   | 7.85 | 3.92 | 2.61 | 2.32 | 1.94 | 1.55 | 1.52 |
|--------|------|------|------|------|------|------|------|
| $I/I_o$ | 100  | 28   | 25   | 18   | 10   | 12   | 12   |

Chemical analysis

| ZnO       | 60.0 % (9.00)  |
|-----------|----------------|
| $Al_2O_3$ | 8.4 % (1.0)    |
| $SO_2$    | 7.4 % (1.40)   |
| $H_2O$    | 22.8 % (15.50) |

EXAMPLE 57

In a solution containing 0.25 mole per liter of $AlCl_3 \cdot 6H_2O$ $CuSO_4 \cdot 5H_2O$ was dissolved so that the copper salt concentration was 0.75 mole per liter calculated as CuO. The so formed liquor, an aqueous solution of $K_2CrO_4$ of a concentration of 0.75 mole per liter and an aqueous solution of NaOH of a concentration of 4.8 moles per liter were fed to a 2,100-ml capacity synthetic resin reaction tube of a 2 mm diameter from its upper end at feed rates of 28.8 ml/min, 36.0 ml/min and 12 ml/min, respectively. The reaction tube had been charged with 500 ml of water in advance. The reaction tube was kept in a thermostat tank so that the temperature was maintained at 60° ± 2°C. The reaction tube was equipped with an overflow device, and the reaction liquor was agitated at 830 r.p.m. by a constant rate stirrer. A pH electrode connecting a pH indicator was inserted in the reaction tube. The reaction was conducted for 6 hours while the pH of the reaction liquor was maintained at 10.5 – 11.0. The liquor overflowed in 1 hour from the initiation of the reaction was thrown away, and the suspension which overflowed after that time was collected and water was removed therefrom under reduced pressure. The residue was washed with water and dried at 80°C. for 10 hours. Results of the analysis of the product are as follows:

Composition formula
$Cu_6Al_2(OH)_{16}CrO_4 \cdot 4H_2O$     $K = 12.6$
                                        $x/y = 3$
                                        $z/(x+y) = 1/8$ X-ray diffraction

| d(Å)   | 7.67 | 3.83 | 2.61 | 2.35 | 1.54 | 1.51 |
|--------|------|------|------|------|------|------|
| $I/I_o$ | 100  | 42.7 | 29.8 | 22.3 | 10.0 | 9.5  |

Chemical analysis

| CuO       | 52.3 % (5.99)  |
|-----------|----------------|
| $Al_2O_3$ | 11.2 % (1.0)   |
| $CrO_4$   | 12.8 % (1.00)  |
| $H_2O$    | 23.8 % (11.97) |

EXAMPLE 58

In a 500-ml capacity beaker, 15.0 g of $Al(NO_3)_3 \cdot 9H_2O$ and 34.4 g of $Mn(NO_3)_2 \cdot 6H_2O$ were dissolved in water to form 200 ml of a solution. A liquor of 5.4 g of $Na_2SO_4 \cdot 7H_2O$ dissolved in 100 ml of water and a solution of NaOH of a concentration of 2.0 moles per liter were added dropwise to the solution in the beaker, and the reaction was accomplished at a pH of 7.5. The resulting suspension was subjected to the water-removing treatment under reduced pressure, and the residue was washed with 200 ml of water and dried at 70°C. for 12 hours. All of the above operations were conducted in a $N_2$ gas current. Results of the analysis of the product are as follows:

Composition formula
$Mn_6Al_2(OH)_{16}SO_4 \cdot 4H_2O$     $K = 13.9$
                                        $x/y = 3$
                                        $z/(x+y) = 1/8$ X-ray diffraction

| d(Å)   | 9.16 | 4.50 | 2.65 | 1.56 |
|--------|------|------|------|------|
| $I/I_o$ | 100  | 30   | 23   | 13   |

Chemical analysis

| MnO       | 50.5 % (6.00)  |
|-----------|----------------|
| $Al_2O_3$ | 12.2 % (1.0)   |
| $SO_3$    | 10.5 % (1.09)  |
| $H_2O$    | 25.8 % (12.00) |

EXAMPLE 59

In the same manner as in Example 58, in a beaker 15.0 g of $Al(NO_3)_3 \cdot 9H_2O$ and 34.4 g of $Sr(NO_3)_2 \cdot 4H_2O$ were dissolved in water to form 200 ml of a solution, to which a solution of 7.4 g of $Na_2S_2O_3 \cdot 5H_2O$ in 100 ml of water and a solution of 2.0 moles per liter of NaOH in decarbonated water were added dropwise. The pH of the reaction suspension was gradually raised and it reached 13 in the final stage of the reaction. The resulting suspension was treated in the same manner as in Example 58. Results of the analysis of the product are as follows:

Composition formula
$Sr_6Al_2(OH)_{16}S_2O_3 \cdot 4H_2O$     $K = 4.5$
                                          $x/y = 3$
                                          $z/(x+y) = 1/8$ X-ray diffraction

| d(Å)   | 7.65 | 3.80 | 2.67 | 1.53 |
|--------|------|------|------|------|
| $I/I_o$ | 100  | 43   | 35   | 29   |

Chemical analysis

| SrO       | 60.2 % (6.00)  |
|-----------|----------------|
| $Al_2O_3$ | 9.8 % (1.0)    |
| $S_2O_2$  | 11.0 % (1.10)  |
| $H_2O$    | 20.8 % (12.00) |

EXAMPLE 60

40 g of $Pb(NO_3)_2$ and 10.0 g of $FeCl_3 \cdot 6H_2O$ were dissolved in 200 ml of decarbonated water, and the pH of the solution was adjusted to 1 by addition of nitric acid. The so formed liquor and a liquor of 18.5 g of $K_2MoO_4$ and 13.0 g of NaOH dissolved in 200 ml of dechlorinated and decarbonated water were added dropwise to a beaker charged with 60 ml of water. The pH of the reaction suspension was maintained at 10.5 – 11.5 and the temperature was adjusted to 25° – 30°C. The resulting suspension was heated at 70°C. for 5 hours, and post-treatments were conducted in the same manner as in Example 58. Results of the analysis of the product are as follows:

Composition formula
$Pb_6Fe_2(OH)_{16}MoO_4 \cdot 4H_2O$     $K = 3.1$
                                         $x/y = 3$
                                         $z/(x+y) = 1/8$ X-ray diffraction

| d(Å)   | 9.40 | 4.77 | 2.84 | 1.56 |
|--------|------|------|------|------|
| $I/I_o$ | 100  | 35   | 20   | 15   |

Chemical analysis

| PbO       | 72.0 % (6.02)  |
|-----------|----------------|
| $Fe_2O_3$ | 8.6 % (1.0)    |
| $MoO_4^=$ | 8.6 % (1.01)   |
| $H_2O$    | 10.9 % (12.06) |

EXAMPLE 61

36.0 g of $An(NO_3)_2 \cdot 6H_2O$ and 8.8 g of $InCl_3$ were dissolved in 200 ml of water, and the pH of the liquor was adjusted to 1 by addition of concentrated nitric acid. The so formed liquor and a liquor of 8.8 g of $K_2SeO_4$ dissolved in 100 ml of water were added dropwise to a beaker charged with 80 ml of water, while the pH of the reaction suspension was maintained at 11.5 - 12.5 by a NaOH solution of a concentration of 2.0 moles per liter and the reaction temperature was adjusted to 20° – 30°C. After completion of the reaction, the resulting suspension was heated at 90°C. for 3 hours and treated in the same manner as in Example 58. Results of the analysis of the product are as follows:

Composition formula
$Zn_6In_2(OH)_{16}SeO_4 \cdot 4H_2O$ $K = 16.3$
$x/y = 3$
$z/(x+y) = 1/8$ X-ray diffraction

| $d(A)$ | 8.34 | 4.17 | 2.67 | 1.54 |
|---|---|---|---|---|
| $I/I_o$ | 100 | 40 | 25 | 26 |

Chemical analysis

| ZnO | 44.2 % (6.02) |
|---|---|
| $In_2O_3$ | 25.0 % (1.0) |
| $SeO_4$ | 12.9 % (1.01) |
| $H_2O$ | 18.0 % (12.10) |

EXAMPLE 62

A liquor of 39.8 g of $Pb(NO_3)_2$ and 15.0 g of $Al(NO_3)_3 \cdot 9H_2O$ dissolved in 200 ml of water and a liquor of 13.2 g of $Na_2WO_4 \cdot 2H_2O$ and 12.0 g of NaOH dissolved in 200 ml of water were added dropwise under agitation to a beaker charged with 100 ml of water in a manner such that the pH of the reaction liquor was maintained at 10.0 - 11.0. The reaction temperature was adjusted to 20° – 30°C. The resulting suspension was posttreated in the same manner as in Example 61. Results of the analysis of the product are as follows:

Composition formula
$Pb_6Al_2(OH)_{16}WO_4 \cdot 4H_2O$ $K = 7.2$
$x/y = 3$
$z/(x+y) = 1/8$ X-ray diffraction

| $d(A)$ | 8.22 | 4.11 | 2.65 | 2.34 | 1.99 | 1.52 | 1.50 |
|---|---|---|---|---|---|---|---|
| $I/I_o$ | 100 | 38 | 16 | 16 | 16 | 12 | 15 |

Chemical analysis

| PbO | 69.6 % (6.05) |
|---|---|
| $Al_2O_3$ | 5.3 % (1.0) |
| $WO_4$ | 12.0 % (1.10) |
| $H_2O$ | 11.2 % (12.10) |

EXAMPLE 63

10.8 of $FeCl_3 \cdot 6H_2O$ and 33.4 g of $FeSO_4 \cdot 7H_2O$ were dissolved in 300 ml of ion exchange water, and the pH of the liquor was adjusted to 1 by addition of concentrated hydrochloric acid. The so formed liquor, a liquor of 2.1 g of $Na_2CO_3$ dissolved in 100 ml of ion-exchange water and a NaOH aqueous solution of a concentration of 2.0 moles per liter were added dropwise to a flask charged with 150 ml of water in a manner such that the pH was maintained at 10.5 - 11.5. The reaction was conducted in a reducible atmosphere of $H_2$ + $N_2$. The resulting suspension was dried in the same atmosphere, and the residue was washed with water and dried.

Results of the analysis of the product are as follows:

Composition formula
$Fe_6Fe_2(OH)_{16}CO_3 \cdot 4H_2O$ $K = 4.6$
$x/y = 3$
$z/(x+y) = 1/8$ X-ray diffraction

| $d(A)$ | 8.04 | 4.02 | 2.56 | 1.56 | 1.53 |
|---|---|---|---|---|---|
| $I/I_o$ | 100 | 30 | 26 | 20 | 18 |

Chemical analysis

| FeO | 30.7 % (6.60) |
|---|---|
| $Fe_2O_3$ | 18.8 % (1.0) |
| $CO_2$ | 5.16% (1.08) |
| $H_2O$ | 25.30% (12.0) |

EXAMPLE 64

An ethyl alcohol solution containing 0.06 mole per liter of $Zn(NO_3)_2 \cdot 6H_2O$ and 0.02 mole per liter of $Al(NO_3)_3 \cdot 9H_2O$, an ethyl alcohol solution containing 0.05 mole per liter of $K_2SeO_3$ and an ethyl alcohol solution containing 0.4 mole per liter of KOH were fed to a reaction tank charged with 500 ml of ethyl alcohol at feed rates of 30 ml/min, 90 ml/min and about 12 ml/min, respectively. The feed of the KOH ethyl alcohol solution was controlled so that the pH of the reaction liquor was maintained at 10.0 - 10.5.

The KOH solution and $K_2SeO_3$ solution were fed from the bottom of the reaction tank, while the zinc nitrate and aluminum nitrate solution were fed from the top of the reaction tank. The temperature was maintained at 30° ± 1°C. and the reaction was conducted under agitation. The liquor which overflowed in 60 minutes from the initiation of the reaction was thrown away, and the suspension which overflowed after that time was collected. The reaction was continued for 4 hours. Water was removed from the collected suspension under reduced pressure, and the residue was washed with water, and dried at 70°C. Results of the analysis of the product are as follows:

Composition formula
$Zn_6Al_2(OH)_{16}SeO_3 \cdot 4H_2O$ $K = 8.9$
$x/y = 3$
$z/(x+y) = 1/8$ X-ray diffraction

| $d(A)$ | 8.07 | 3.97 | 2.59 | 2.31 | 1.96 | 1.54 | 1.51 |
|---|---|---|---|---|---|---|---|
| $I/I_o$ | 100 | 32 | 15 | 6 | 6 | 4 | 3 |

Chemical analysis

| ZnO | 54.0 % (6.00) |
|---|---|
| $Al_2O_3$ | 11.3 % (1.0) |
| $SeO_4$ | 12.0 % (1.01) |
| $H_2O$ | 24.0 % (12.00) |

EXAMPLE 65

A solution of 29.0 g of $Cu(NO_3)_2 \cdot 3H_2O$ and 15.0 g of $Al(NO_3)_3 \cdot 9H_2O$ in 200 ml of water and a solution of 12.0 g of $Na_2Cr_2O_7 \cdot 2H_2O$ in 100 ml of water were added dropwise to a beaker charged with 100 ml of water, while the pH of the reaction liquor was maintained below about 6.0 by the dropwise addition of a NaOH aqueous solution of a concentration of 2.0 moles per liter. The reaction temperature was maintained at 20° – 30°C. Throughout the run, water was used after it had been decarbonated, and the reaction and post-treatment were conducted in the air from which $CO_2$ gas had been removed by passing it through a concentrated NaOH aqueous solution. The resulting suspension was treated in the same manner as in Example 61. Results of the analysis of the product are as follows:

Composition formula
$Cu_6Al_2(OH)_{16}Cr_2O_7 \cdot 4H_2O$ $K = 11.5$
$x/y = 3$
$z/(x+y) = 1/8$ X-ray diffraction

| d(A) | 8.66 | 4.99 | 2.49 | 1.52 |
|---|---|---|---|---|
| $I/I_o$ | 100 | 30 | 30 | 15 |

Chemical analysis

| CuO | 48.3 % (6.20) |
|---|---|
| $Al_2O_3$ | 10.0 % (1.0) |
| $Cr_2O_7$ | 19.8 % (1.04) |
| $H_2O$ | 22.1 % (12.40) |

EXAMPLE 66

A solution of 16.4 g of $ZnCl_2$ and 15.0 g of $Al(NO_3)_3 \cdot 9H_2O$ in 200 ml of water and a solution of 6.9 g of $K_2SO_4$ dissolved in 100 ml of water were added dropwise to a beaker charged with 100 ml of water in the same manner as in Example 65. The reaction was conducted in the same manner as in Example 65 while maintaining the pH of the reaction liquor at 9.5 – 10.5. The resulting suspension was post-treated in the same manner as in Example 65 except that the drying was effected at 80°C. Results of the analysis of the product are as follows:

Composition formula
$Zn_6Al_2(OH)_{16}SO_4 \cdot 4H_2O$ $K = 16.4$
$x/y = 3$
$z/(x+y) = 1/8$ X-ray diffraction

| d(A) | 8.04 | 4.00 | 2.60 | 1.51 |
|---|---|---|---|---|
| $I/I_o$ | 100 | 35 | 17 | 17 |

Chemical analysis

| ZnO | 54.4 % (6.04) |
|---|---|
| $Al_2O_3$ | 11.3 % (1.0) |
| $SO_4$ | 10.3 % (0.97) |
| $H_2O$ | 24.0 % (12.06) |

EXAMPLE 67

A mixed liquor of 50 ml of a hydrochloric acid-acidified bismuth solution containing 0.4 mole per liter of $Bi_2O_3$, 50 ml of a nickel chloride solution containing 2.4 moles per liter of NiO and 100 ml of an aqueous solution of 4.0 g of mannitol, and another mixed liquor of 51 ml of $K_2B_4O_7 \cdot 5H_2O$ solution of a concentration of 0.4 mole per liter and 200 ml of a caustic soda solution containing 2.0 moles per liter of NaOH were added at 5°C. under agitation dropwise to a 500-ml capacity beaker charged with 100 ml of water. The reaction was conducted while maintaining the pH of the reaction liquor at 11.0 – 12.0. The resulting suspension was treated in the same manner as in Example 1. Results of the analysis of the product are as follows:

Composition formula
$Ni_6Bi_2(OH)_{16}B_4O_7 \cdot 4H_2O$ $K = 12.3$
$x/y = 3$
$z/(x+y) = 1/8$ X-ray diffraction

| d(A) | 9.60 | 4.82 | 2.83 | 1.64 |
|---|---|---|---|---|
| $I/I_o$ | 100 | 46 | 20 | 20 |

Chemical analysis

| NiO | 41.5 % (6.02) |
|---|---|
| $Bi_2O_3$ | 25.6 % (1.0) |
| $B_4O_7$ | 14.5 % (1.06) |
| $H_2O$ | 19.4 % (12.01) |

EXAMPLE 68

A solution of 35.0 g of $Ni(NO_3)_2 \cdot 6H_2O$ and 15.0 g of $Al(NO_3)_3 \cdot 9H_2O$ dissolved in 200 ml of water and a solution of 13.0 g of $K_2B_4O_7 \cdot 5H_2O$ dissolved in 100 ml of warm water were added dropwise to a beaker charged with 80 ml of water in the same manner as in Example 65 while maintaining the pH of the reaction liquor at 6.0 – 7.0. The resulting suspenion was post-treated in the same manner as in Example 66. Results of the analysis of the product are as follows:

Composition formula
$Ni_6Al_2(OH)_{16}B_4O_7 \cdot 7.7H_2O$ $K = 12.3$
$x/y = 3$
$z/(x+y) = 1/8$ X-ray diffraction

| d(A) | 7.82 | 3.86 | 2.69 | 1.53 |
|---|---|---|---|---|
| $I/I_o$ | 100 | 46 | 20 | 20 |

Chemical analysis

| NiO | 46.3 % (6.00) |
|---|---|
| $Al_2O_3$ | 10.3 % (1.0) |
| $B_4O_7$ | 14.3 % (1.00) |
| $H_2O$ | 29.0 % (15.7) |

EXAMPLE 69

A solution of 40 g of $Pb(NO_3)_2$ and 15.0 g of $Al(NO_3)_3 \cdot 9H_2O$ dissolved in 200 ml of water and a solution of 14.3 g of $Na_2HPO_4 \cdot 12H_2O$ dissolved in 100 ml of water were added dropwise to a beaker charged with 60 ml of water in the same manner as in Example 65, while the pH of the reaction liquor was maintained at 10.0 – 11.0. The resulting suspension was treated in the same manner as in Example 65. Results of the analysis of the product are as follows:

Composition formula
$Pb_6Al_2(OH)_{16}HPO_4 \cdot 4H_2O$ $K = 5.1$
$x/y = 3$
$z/(x+y) = 1/8$ X-ray diffraction

| d(A) | 8.50 | 4.44 | 2.84 | 1.58 |
|---|---|---|---|---|
| $I/I_o$ | 100 | 50 | 35 | 28 |

Chemical analysis

| PbO | 72.0 % (6.09) |
|---|---|
| $Al_2O_3$ | 5.8 % (1.0) |
| $HPO_4$ | 5.5 % (0.97) |
| $N_2O$ | 16.8 % (12.10) |

EXAMPLE 70

In a 500-ml capacity beaker, 15.0 g of $Al(NO_3)_3 \cdot 9H_2O$ and 36.01 g of $Zn(NO_3)_2 \cdot 6H_2O$ were dissolved in water to form 200 ml of the solution. To the solution a liquor of 7.4 g of $Na_2SeO_4 \cdot 10H_2O$ dissolved in 100 ml of water and a NaOH aqueous solution of a concentration of 2.0 moles per liter were added dropwise. When the pH of the reaction liquor reached 10.0, the reaction was stopped. The reaction was carried out at 20° – 30°C. Water was removed from the resulting suspension. The residue was washed with 250 ml of water and dried at 80°C. for 12 hours. Results of the analysis of the product are as follows:

Composition formula
$Zn_6Al_2(OH)_{16}SeO_4 \cdot 4H_2O$ $K = 16.3$
$x/y = 3$
$z/(x+y) = 1/8$ X-ray diffraction

| d(A) | 7.75 | 3.86 | 2.61 | 1.53 |
|---|---|---|---|---|
| $I/I_o$ | 100 | 20 | 50 | 15 |

Chemical analysis

| ZnO | 52.4 % (6.00) |
|---|---|
| $Al_2O_3$ | 10.9 % (1.0) |
| $SeO_4$ | 13.6 % (1.00) |
| $H_2O$ | 23.4 % (12.10) |

EXAMPLE 71

A solution of 7.9 g of $(NH_4)_3PO_4 \cdot 3H_2O$ dissolved in 100 ml of water and a NaOH aqueous solution of a concentration of 2.0 moles per liter were added dropwise to a solution of 15.0 g of $Al(NO_3)_3 \cdot 9H_2O$ and 36.0 g of $Zn(NO_3)_2 \cdot 6H_2O$ dissolved in 200 ml of water. When the pH of the reaction liquor reached 9.20, the reaction was stopped. The resulting reaction liquor was stirred at 60°C. for 5 hours, and it was then treated in the same manner as in Example 70. Results of the analysis of the product are as follows:

Composition formula
$Zn_6Al_2(OH)_{16}NH_4PO_4 \cdot 4H_2O$ $K = 7.2$
$x/y = 3$
$z/(x+y) = 1/8$ X-ray diffraction

| $d(A)$ | 7.80 | 3.89 | 2.62 |
|---|---|---|---|
| $I/I_0$ | 100 | 40 | 50 |

Chemical analysis

| ZnO | 54.0 % (6.00) |
|---|---|
| $Al_2O_3$ | 11.3 % (1.0) |
| $NH_4PO_4$ | 10.9 % (1.02) |
| $H_2O$ | 23.4 % (11.80) |

EXAMPLE 72

A solution of 4.6 g of $K_2SO_4$ dissolved in 100 ml of warm water and a NaOH aqueous solution of a concentration of 2.0 moles per liter were added dropwise to a solution of 15.0 g of $Al(NO_3)_3 \cdot 9H_2O$ and 36.9 g of $Zn(NO_3)_2 \cdot 6H_2O$ dissolved in 200 ml of water. When the pH of the reaction liquor reached 6.4, the reaction was stopped. Then the reaction liquor was stirred at 10°C. for 10 hours, and water was removed therefrom under reduced pressure. The residue was washed and dried at 50°C. Results of the analysis of the product are as follows:

Composition formula
$Zn_6Al_2(OH)_{16}SO_4 \cdot 4H_2O$ $K = 16.4$
$x/y = 3$
$z/(x+y) = 1/8$ X-ray diffraction

| $d(A)$ | 9.21 | 4.58 | 2.66 | 1.53 |
|---|---|---|---|---|
| $I/I_0$ | 100 | 30 | 30 | 15 |

Chemical analysis

| ZnO | 53.8 % (5.90) |
|---|---|
| $Al_2O_3$ | 11.6 % (1.0) |
| $SO_4$ | 9.1 % (1.00) |
| $H_2O$ | 23.8 % (11.7) |

EXAMPLE 73

A solution of 5.8 g of $H_2SiF_6$ dissolved in 100 ml of water and a NaOH aqueous solution of a concentration of 2.0 moles per liter were added dropwise to a solution of 15.0 g of $Al(NO_3)_3 \cdot 9H_2O$ and 36.0 g of $Zn(NO_3)_2 \cdot 6H_2O$ dissolved in 200 ml of water. When the pH of the reaction liquor reached 9.5, the reaction was stopped. The reaction was conducted at 20° – 25°C. The resulting suspension was post-treated in the same manner as in Example 70. Results of the analysis of the product are as follows:

Composition formula
$Zn_6Al_2(OH)_{16}SiF_6 \cdot 4H_2O$ $K = 15.6$
$x/y = 3$
$z/(x+y) = 1/8$ X-ray diffraction

| $d(A)$ | 7.89 | 3.86 | 2.58 | 2.32 | 1.52 |
|---|---|---|---|---|---|
| $I/I_0$ | 100 | 30 | 25 | 25 | 20 |

Chemical analysis

| ZnO | 52.4 % (6.00) |
|---|---|
| $Al_2O_3$ | 11.0 % (1.0) |
| $SiF_6$ | 21.5 % (1.01) |
| $H_2O$ | 23.2 % (12.10) |

EXAMPLE 74

An ethyl alcohol solution containing 0.3 mole per liter of $CaBr_2$ and 0.1 mole per liter of $Al(NO_3)_3 \cdot 9H_2O$, an ethyl alcohol solution containing 2.0 moles per liter of KOH and an aqueous solution containing 0.1 mole per liter of $Na_2S_2O_3$ were continuously fed to a 2,000-ml capacity reactor equipped with an overflow device at feed rates of 50 ml/min, 20 ml/min and 50 ml/min, respectively. The reactor had been charged with 500 ml of ethyl alcohol in advance. The agitation was conducted at 830 r.p.m. by a constant rate stirrer. The reaction temperature was maintained at 20° ± 2°C. and the pH of the reaction liquor was maintained at 11.5 - 12.0. The reaction suspension obtained 60 minutes after the initiation of the reaction was subjected to the water-removing treatment under reduced pressure, and the residue was washed with water and dried at 80°C. The dried product was identified as $Ca_6Al_2(OH)_{16}S_2O_3 \cdot 4H_2O$ by the X-ray diffraction method.

100 g of the so obtained product was packed in a burette-type ion-exchange column of a 5 cm diameter, at the bottom of which glass fibers were stuffed, and the ion-exchange was conducted by pouring an aqueous solution containing 0.02 mole per liter of $Na_2CO_3$ from the top of the column. Thus $S_2O_3^=$ was converted to $CO_3^=$ at a ratio of 90 % or more. The ion-exchanged product was dried at 80°C. Results of the analysis of the product are as follows:

Composition formula
$Ca_6Al_2(OH)_{16}CO_3 \cdot 4H_2O$ $K = -3.0$
$x/y = 3$
$z/(x+y) = 1/8$ X-ray diffraction

| $d(A)$ | 7.89 | 3.95 | 2.61 | 2.34 | 1.52 |
|---|---|---|---|---|---|
| $I/I_0$ | 100 | 35 | 44 | 28 | 10 |

Chemical analysis

| CaO | 48.0 % (6.00) |
|---|---|
| $Al_2O_3$ | 14.5 % (1.0) |
| $CO_2$ | 6.3 % (1.00) |
| $S_2O_3$ | 0.8 % (0.05) |
| $H_2O$ | 31.1 % (12.00) |

EXAMPLE 75

36.0 g of $Zn(NO_3)_2 \cdot 6H_2O$ and 8.8 g of $InCl_3$ were dissolved in 200 ml of water, and the pH of the liquor was adjusted to 1 by addition of concentrated nitric acid. The so formed liquor and a solution of 5.1 g of $Na_2SO_3$ dissolved in 100 ml of water were added dropwise to a beaker charged with 100 ml of water, together with an aqueous solution containing 2.0 moles per liter of NaOH, in a manner such that the pH of the reaction liquor was maintained at 10.5 – 11.5. The resulting suspension was treated in the same manner as in Example 70. Results of the analysis of the product are as follows:

Chemical composition
$Zn_6In_2(OH)_{16}SO_3 \cdot 4H_2O$   $K = 11.2$
$x/y = 3$
$z/(x+y) = 1/8$ X-ray diffraction

| d(Å) | 8.04 | 4.05 | 2.56 | 1.53 |
|---|---|---|---|---|
| I/I₀ | 100 | 42 | 38 | 12 |

Chemical analysis

| ZnO | 46.7 % (6.0) |
|---|---|
| $In_2O_3$ | 26.5 % (1.0) |
| $SO_3$ | 7.7 % (1.07) |
| $H_2O$ | 19.3 % (12.18) |

EXAMPLE 76

An aqueous solution containing 0.1 mole per liter of $FeCl_3 \cdot 6H_2O$ and 0.6 mole per liter of $MnCl_2 \cdot 4H_2O$ was prepared, and of the solution the pH was adjusted to 1 by addition of concentrated nitric acid. Prior to the preparation of the solution, water had been boiled, cooled and degasified in vacuo to remove dissolved oxygen. Separately, an aqueous solution containing 0.1 mole per liter of $Na_2SO_4$ and an aqueous solution containing 2.0 moles per liter of NaOH were prepared. In preparing these solutions, dissolved oxygen was removed as much as possible.

A 2,000-ml capacity reactor was charged with 500 ml of water from which dissolved oxygen had been removed so as to prevent the oxidation of $Mn^{2+}(OH)_2$. A pH electrode was inserted and a constant rate stirrer was disposed to agitate the reaction liquor. A $N_2$ gas was blown from the bottom of the reactor, and another $N_2$ gas was blown from the upper portion of the reactor toward the surface of the reaction liquor to remove the air having contact with the liquid surface. The above three solutions were fed to this reactor at feed rates of 20 ml/min, 20 ml/min and 16 ml/min, respectively. A $N_2$ gas was blown to the reaction suspension overflowing from the reactor so as to prevent its contact with the air. Water was removed from the resulting suspension in a $N_2$ gas atmosphere, and the residue was dried in a $N_2$ gas current, washed with water and dried at a temperature not exceeding 80°C. Results of the analysis of the product are as follows:

Composition formula
$Mn_6Fe_2(OH)_{16}SO_4 \cdot 4H_2O$   $K = 13.9$
$x/y = 3$
$z/(x+y) = 1/8$ X-ray diffraction

| d(Å) | 7.75 | 3.86 | 2.61 | 1.51 |
|---|---|---|---|---|
| I/I₀ | 100 | 33 | 25 | 20 |

Chemical analysis

| MnO | 47.4 % (6.04) |
|---|---|
| $Fe_2O_3$ | 17.7 % (1.0) |
| $SO_4$ | 10.9 % (1.02) |
| $H_2O$ | 24.0 % (12.00) |

EXAMPLE 77

A solution of 40 g of $Pb(NO_3)_2$ and 15.0 g of $Al(NO_3)_3 \cdot 9H_2O$ dissolved in 200 ml of water and a solution of 10.7 g of $K_2CrO_4$ dissolved in 500 ml of water were added dropwise to a beaker charged with 100 ml of water under agitation while maintaining the liquid temperature at 20° – 30°C. and adjusting the pH of the reaction liquor to 10 – 11 by the dropwise addition of a NaOH aqueous solution of a concentration of 2.0 moles per liter. The resulting suspension was treated in the same manner as in Example 75. Results of the analysis of the product are as follows:

Composition formula
$Pb_6Al_2(OH)_{16}CrO_4 \cdot 4H_2O$   $K = 2.8$
$x/y = 3$
$z/(x+y) = 1/8$ X-ray diffraction

| d(Å) | 8.50 | 4.27 | 2.68 | 1.54 |
|---|---|---|---|---|
| I/I₀ | 100 | 30 | 25 | 18 |

Chemical analysis

| PbO | 76.2 % (5.98) |
|---|---|
| $Al_2O_3$ | 5.8 % (1.0) |
| $CrO_4$ | 6.6 % (0.99) |
| $H_2O$ | 11.5 % (12.07) |

EXAMPLE 78

The reaction was conducted in the same manner as in Example 75 by using 16.4 g of $ZnCl_2$, 15.0 g of $Al(NO_3)_3 \cdot 9H_2O$ and 10.2 g of $Na_2SO_3 \cdot 7H_2O$ and maintaining the pH of the reaction liquor at 9.5 – 10.5. The resulting suspension was gradually agitated at 50°C. for 5 hours, and then it was post-treated in the same manner as in Example 75. Results of the analysis of the product are as follows:

Composition formula
$Zn_6Al_2(OH)_{16}SO_3 \cdot 4H_2O$   $K = 11.2$
$x/y = 3$
$z/(x+y) = 1/8$ X-ray diffraction

| d(Å) | 7.75 | 3.80 | 2.61 | 2.31 | 1.95 | 1.54 | 1.51 |
|---|---|---|---|---|---|---|---|
| I/I₀ | 100 | 30 | 35 | 20 | 15 | 10 | 10 |

Chemical analysis

| ZnO | 56.2 % (6.07) |
|---|---|
| Al O | 11.7 % (1.0) |
| SO | 9.2 % (1.03) |
| $H_2O$ | 22.9 % (12.02) |

EXAMPLE 79

5.0 g of dried $Zn_6In_2(OH)_{16}SO_4 \cdot 4H_2O$ were packed in a burette, the bottom of which was stuffed with glass wool. A solution of 8.84 g of $K_2SeO_3$ dissolved in 200 ml of water was poured into the burette to effect ion-exchange. The product was taken out, washed with 100 ml of cool water and dried at 70°C. Results of the analysis of the product are as follows:

Composition formula
$Zn_6In_2(OH)_{16}SeO_3 \cdot 4H_2O$   $x/y = 3$
$z/(x+y) = 1/8$ X-ray diffraction

| d(Å) | 8.26 | 4.15 | 2.65 | 1.53 |
|---|---|---|---|---|
| I/I₀ | 100 | 30 | 23 | 15 |

Chemical analysis

| ZnO | 44.6 % (6.07) |
|---|---|
| $In_2O_3$ | 25.3 % (1.0) |
| $SeO_3$ | 11.6 % (1.00) |
| $SO_4$ | 0.04 % ( — ) |
| $H_2O$ | 18.5 % (12.17) |

EXAMPLE 80

10.0 g of dried $Zn_6Al_2(OH)_{16}CO_3 \cdot 4H_2O$ were ion-exchanged in the same manner as in Example 79 by using a solution of 5.0 g of $Na_2SeO_3 \cdot 5H_2O$ dissolved in 200 ml of water. Results of the analysis of the product are as follows:

Composition formula
Zn₆Al₂(OH)₁₆SeO₃ . 4H₂O          $x/y = 3$
                                  $z/(x+y) = 1/8$ X-ray diffraction

| d(Å) | 7.88 | 3.92 | 2.63 | 2.30 | 1.54 | 1.51 |
|---|---|---|---|---|---|---|
| I/I₀ | 100 | 30 | 13 | 8 | 4 | 4 |

Chemical analysis
| ZnO | 53.2 % (6.00) |
| Al₂O₃ | 11.1 % (1.0) |
| SeO₃ | 8.5 % (0.70) |
| CO₂ | 1.4 % (0.31) |
| H₂O | 23.6 % (12.00) |

EXAMPLE 81

10 g of a dried product of Zn₆Al₂(OH)₁₆ . 4H₂O were ion-exchanged in the same manner as in Example 79 by using a solution of 4.5 g of K₂CrO₄ dissolved in 200 ml of water. Results of the analysis of the product are as follows:

Composition formula
Zn₆Al₂(OH)₁₆CrO₄ . 4H₂O          $x/y = 3$
                                  $z/(x+y) = 1/8$ X-ray diffraction

| d(Å) | 7.82 | 3.91 | 2.60 | 1.53 |
|---|---|---|---|---|
| I/I₀ | 100 | 20 | 20 | 15 |

Chemical analysis
| ZnO | 54.0 % (6.00) |
| Al₂O₃ | 11.3 % (1.0) |
| CrO₄ | 11.0 % (1.00) |
| CO₂ | 0.09% ( — ) |
| H₂O | 23.4 % (12.00) |

EXAMPLE 82

10.0 g of a dried product of Zn₆Al₂(OH)₁₆CO₃ . 4H₂O were packed in a burette, the bottom of which was stuffed with glass wool. A solution of 7.2 g of Na₂Cr₂O₇ . 2H₂O dissolved in 200 ml of water was poured from the top of the burette. After the whole solution had been poured, the sample was taken out from the burette, washed with 150 ml of water and dried at 80°C. Results of the analysis of the product are as follows:

Composition formula
Zn₆Al₂(OH)₁₆Cr₂O₇ . 4H₂O         $x/y = 3$
                                  $z/(x+y) = 1/8$ X-ray diffraction

| d(Å) | 7.89 | 3.96 | 2.58 | 2.31 | 1.96 | 1.53 | 1.50 |
|---|---|---|---|---|---|---|---|
| I/I₀ | 100 | 45 | 42 | 38 | 26 | 18 | 18 |

Chemical analysis
| ZnO | 53.2 % (6.00) |
| Al₂O₃ | 11.0 % (1.0) |
| Cr₂O₇ | 9.2 % (0.42) |
| CO₂ | 2.9 % (0.60) |
| H₂O | 23.4 % (11.90) |

EXAMPLE 83

35.0 g of Ni(NO₃)₂ and 8.2 g of aluminum isopropoxide Al[OCH(CH₃)₂]₃ were charged into a 500-ml capacity beaker, and 2.2 g of Na₂CO₃ and 300 ml of water were added thereto. A NaOH aqueous solution of a concentration of 2.0 moles per liter was added to the resulting liquor while the temperature was maintained at 60° ± 2°C., whereby the pH of the reaction liquor was adjusted to 11. The aging was conducted for 3 hours and the reaction suspension was filtered. The solid was dried at 80°C. for 10 hours. Results of the analysis of the product are as follows:

Composition formula
Ni₆Al₂(OH)₁₆CO₃ . 4H₂O      K = 6.1
                            $x/y = 3$
                            $z/(x+y) = 1/8$ X-ray diffraction

| d(Å) | 7.89 | 3.91 | 2.58 | 2.32 | 1.97 | 1.53 | 1.50 |
|---|---|---|---|---|---|---|---|
| I/I₀ | 100 | 42 | 32 | 22 | 24 | 13 | 14 |

Chemical analysis
| NiO | 55.2 % (5.95) |
| Al₂O₃ | 12.7 % (1.0) |
| CO₂ | 5.2 % (1.02) |
| H₂O | 26.6 % (11.9) |

EXAMPLE 84

An aqueous solution containing 0.20 mole per liter of Al(NO₃)₃ . 9H₂O and 0.60 mole per liter of cupric chloride, an aqueous solution containing 0.05 mole per liter of Na₂CO₃ and 0.05 mole per liter of Na₂CrO₄, and an aqueous solution containing 2.0 moles per liter of NaOH were fed to a 1.8-liter capacity reactor equipped with an overflow device, at feed rates of 30 ml/min, 30 ml/min and about 24 ml/min, respectively. The reactor had been charged with 500 ml of water in advance. The pH of the reaction liquor was maintained at 10.5 ± 1 and the temperature was maintained at 50° ± 1°C. The reaction was conducted for 1 hour. The overflowing reaction suspension was filtered and the recovered solid was washed with water and dried at 80°C. for 10 hours. Results of the analysis of the product are as follows:

Composition formula
Cu₆Al₂(OH)₁₆(CO₃)₀.₅(CrO₄)₀.₅ . 4H₂O    K = 9.0 (Cu-CO₃ series)
                                          K = 13.6 (Cu-CrO₄ series)
                                          $x/y = 3$
                                          $z/(x+y) = 1/8$ X-ray diffraction

| d(Å) | 7.69 | 3.84 | 2.61 | 2.34 | 1.54 | 1.51 |
|---|---|---|---|---|---|---|
| I/I₀ | 100 | 40 | 30 | 25 | 12 | 10 |

Chemical analysis
| CuO | 55.0 % (5.91) |
| Al₂O₃ | 11.8 % (1.0) |
| CO₂ | 2.5 % (0.48) |
| CrO₄ | 6.7 % (0.51) |
| H₂O | 24.5 % (11.78) |

EXAMPLE 85

An aqueous solution containing 0.20 mole per liter of Al₂(SO₄)₃ . 18H₂O and 1.20 moles per liter of ZnCl₂, an aqueous solution containing 0.20 mole per liter of K₂CrO₄ and an aqueous solution containing 2.0 moles per liter of NaOH were fed to the same reactor as used in Example 84 at feed rates of 20 ml/min, 20 ml/min and about 16 ml/min, respectively. The reaction was conducted at 40° ± 1°C. while maintaining the pH of the reaction liquor at 11.0 ± 0.1. The liquor which overflowed in 30 minutes from the initiation of the reaction and the liquor overflown after that time were collected separately. It was found that crystals were developed in the latter liquor much more than in the former liquor. The reaction was continued for 1 hour. The former liquor was thrown away and the latter liquor was filtered under reduced pressure, and to the residue a Na₂CO₃ aqueous solution of a concentration of 0.1 mole per liter was poured, under reduced pressure of about 500 mmHg to effect ion-exchange. The ion-exchange was continued until a yellow effluent was not observed. The product which was nearly white, was then dried at 80°C. optionally after washing with a small amount of water. Results of the analysis of the product are as follows:

Composition formula
$Zn_6Al_2(OH)_{16}CO_3 \cdot 4H_2O$   $K = 5.3$
                                       $x/y = 3$
$z/(x + y) = 1/8$ X-ray diffraction

| $d(A)$ | 7.80 | 3.86 | 2.62 | 2.31 | 1.95 | 1.54 | 1.51 |
|---|---|---|---|---|---|---|---|
| $I/I_o$ | 100 | 40 | 31 | 23 | 24 | 8 | 8 |

Chemical analysis

| ZnO | 52.5 % (6.03) |
|---|---|
| $Al_2O_3$ | 12.0 % (1.0) |
| $CO_2$ | 5.2 % (1.04) |
| $H_2O$ | 30.1 % (11.8) |
| $CrO_4$ | 0.08% ( — ) |

EXAMPLE 86

18.5 of $Cd(NO_3)_2 \cdot 4H_2O$, 17.4 g of $Ni(NO_3)_2 \cdot 6H_2O$, 5.4 g of $FeCl_3 \cdot 6H_2O$ and 4.4 g of $InCl_3$ were dissolved in 200 ml of water, and the pH of the solution was adjusted to 1 by addition of concentrated nitric acid. Separately, 2.1 g of $Na_2CO_3$ and 13 g of NaOH were dissolved in 200 ml of water. Both liquors were added dropwise to a 500-ml capacity beaker charged with 100 ml of water, in a manner such that the pH of the reaction liquor was maintained at 12 – 13. The resulting suspension was treated in the same manner as in Example 1. Results of the analysis of the product are as follows:

Composition formula
$(Cd_3Ni_3)(FeIn)(OH)_{16}CO_3 \cdot 4H_2O$   $K = 0$   (Cd-$CO_3$ series)
                                              $K = 6.1$ (Ni-$CO_3$ series)
                                              $x/y = 3$
                                              $z/(x + y) = 1/8$ X-ray diffraction

| $d(A)$ | 7.78 | 3.86 | 2.52 | 2.38 | 1.51 |
|---|---|---|---|---|---|
| $I/I_o$ | 100 | 47 | 22 | 10 | 7 |

Chemical analysis

| CdO | 35.5 % (3.02) |
|---|---|
| NiO | 20.7 % (3.03) |
| $Fe_2O_3$ | 7.3 % (0.47) |
| $In_2O_3$ | 10.6 % (0.50) |
| $CO_2$ | 4.1 % (1.07) |
| $H_2O$ | 20.0 % (12.11) |

EXAMPLE 87

10 g of a dried product of $Cu_6Cr_2(OH)_{16}CO_3 \cdot 4H_2O$ were ion-exchanged in the same manner as in Example 79 by using an aqueous solution of 4.0 g of $K_2Cr_2O_4$ dissolved in 200 ml of water. Results of the analysis of the product are as follows:

Composition formula
$Cu_6Cr_2(OH)_{16}CrO_4 \cdot 4H_2O$   $x/y = 3$
                                       $z/(x + y) = 1/8$ X-ray diffraction

| $d(A)$ | 8.58 | 4.79 | 2.48 | 1.52 |
|---|---|---|---|---|
| $I/I_o$ | 100 | 30 | 28 | 14 |

Chemical analysis

| CuO | 50.5 % (5.97) |
|---|---|
| $Cr_2O_3$ | 16.1 % (1.0) |
| $CrO_4$ | 12.2 % (0.98) |
| $CO_2$ | 0.09% ( — ) |
| $H_2O$ | 21.2 % (12.06) |

EXAMPLE 88

An aqueous solution of 4.8 g of NaOH in 50 ml of water was added to a solution of 11.3 g of $CoSO_4 \cdot 7H_2O$ in 100 ml of water, to thereby form $Co(OH)_2$. The mixed liquor was agitated for 3 days by passing air therethrough, to thereby oxidize $Co(OH)_2$ to $Co(OH)_3$. A solution of 16.4 g of $ZnCl_2$ in 200 ml of water and a solution of 2.1 g of $Na_2CO_3$ and 9.6 g of NaOH in 100 ml of water were added dropwise to the above suspension in a beaker at room temperature under agitation. The reaction suspension was transferred to an autoclave and then treated in the same manner as in Example 18. Results of the analysis of the product are as follows:

Composition formula
$Zn_6Co_2(OH)_{16}CO_3 \cdot 4H_2O$   $K = 5.3$
                                      $x/y = 3$
                                      $z/(x + y) = 1/8$ X-ray diffraction

| $d(A)$ | 7.89 | 3.99 | 2.63 | 2.31 | 1.53 | 1.50 |
|---|---|---|---|---|---|---|
| $I/I_o$ | 100 | 42 | 14 | 10 | 5 | 5 |

Chemical analysis

| ZnO | 53.6 % (6.01) |
|---|---|
| $Co_2O_3$ | 18.2 % (1.0) |
| $CO_2$ | 4.8 (0.98) |
| $H_2O$ | 23.5 % (12.07) |

EXAMPLE 89

An aqueous solution of 4.8 g of NaOH in 50 ml of water was added to a solution of 11.3 g of $CoSO_4 \cdot 7H_2O$ in 100 ml of water, to thereby form $Co(OH)_2$, which was then converted to $Co(OH)_3$ by passing air through the liquor for 5 days. To the resulting suspension charged in a 500-ml beaker a liquor of 29.2 g of $Cu(NO_3)_2 \cdot 3H_2O$ dissolved in 200 ml of water and a liquor of 2.1 g of $Na_2CO_3$ and 9.6 g of NaOH dissolved in 100 ml of water were added dropwise under agitation at room temperature. The resulting suspension was transferred to an autoclave and then treated in the same manner as in Example 18. Results of the analysis of the product are as follows:

Composition formula
$Cu_6Co_2(OH)_{16}CO_3 \cdot 4H_2O$   $K = 9.0$
                                      $x/y = 3$
                                      $z/(x + y) = 1/8$ X-ray diffraction

| $d(A)$ | 7.89 | 3.99 | 2.64 | 2.31 | 1.52 | 1.50 |
|---|---|---|---|---|---|---|
| $I/I_o$ | 100 | 40 | 13 | 10 | 5 | 5 |

Chemical analysis

| CuO | 53.0 (6.03) |
|---|---|
| $Co_2O_3$ | 18.3 % (1.0) |
| $CO_2$ | 4.9 % (1.02) |
| $H_2O$ | 23.9 % (12.04) |

EXAMPLE 90

A liquor of 9.1 g of $SbCl_3$ and 16.4 g of $ZnCl_2$ dissolved in 200 ml of water and a liquor of 2.1 g of $Na_2CO_3$ and 12.6 g of NaOH dissolved in 200 ml of water were added dropwise under agitation at room temperature to a 500-ml capacity beaker charged with 100 ml of water. The feed rate of each liquor was so adjusted that the pH of the reaction liquor was maintained at 10.0 – 11.0. The resulting suspension was treated in the same manner as in Example 1. Results of the analysis of the product are as follows:

Composition formula
$Zn_6Sb_2(OH)_{16}CO_3 \cdot 4H_2O$   $K = 5.3$
                                      $x/y = 3$
                                      $z/(x + y) = 1/8$ X-ray diffraction

| $d(A)$ | 7.49 | 3.86 | 2.70 | 2.43 | 1.57 |
|---|---|---|---|---|---|
| $I/I_o$ | 100 | 41 | 16 | 12 | 8 |

-Continued

| Chemical analysis | |
|---|---|
| ZnO | 47.0 % (6.00) |
| $Sb_2O_3$ | 28.0 % (1.0) |
| $CO_2$ | 4.3 % (1.04) |
| $H_2O$ | 20.6 % (11.92) |

EXAMPLE 91

A mixed liquor of 52 ml of sodium sulfate solution ($Na_2SO_4$ concentration = 0.785 mole per liter) and 160 ml of a caustic soda solution (NaOH concentration = 2 moles per liter), and another mixed liquor of 100 ml of beryllium sulfate solution ($BeSO_4$ concentration = 1.2 moles per liter) and 100 ml of a hydrochloric acid-acidified antimony chloride solution ($Sb_2O_3$ concentration = 0.2 mole per liter) were added dropwise under agitation at 50°C. to a 500-ml capacity beaker charged with 60 ml of water. The addition of each liquor was controlled so that the pH of the reaction liquor was maintained at 10.0 – 10.5. After completion of the reaction, the resulting suspension was transferred to an autoclave and subjected to the hydrothermal treatment at 150°C for 5 hours. After it was cooled, it was treated in the same manner as in Example 1. Results of the analysis of the product are as follows:

Composition formula
$Be_6Sb_2(OH)_{16}SO_4 \cdot 4H_2O$    $K = 22.1$
$x/y = 3$
$z/(x+y) = 1/8$ X-ray diffraction

| d(A) | 6.36 | 3.20 | 2.36 | 1.87 |
|---|---|---|---|---|
| $I/I_o$ | 100 | 50 | 18 | 9 |

| Chemical analysis | |
|---|---|
| BeO | 20.4 % (6.02) |
| $Sb_2O_3$ | 39.5 % (1.0) |
| $SO_3$ | 10.8 % (1.01) |
| $H_2O$ | 29.2 % (11.92) |

EXAMPLE 92

A liquor of 21.0 g of $Ti_2(SO_4)_3 \cdot 8H_2O$ and 16.4 g of $ZnCl_2$ dissolved in 200 ml of dilute hydrochloric acid and an aqueous solution containing 2.0 moles per liter of NaOH were added dropwise into a four-neck flask charged with a liquor of 2.1 g of $Na_2CO_3$ dissolved in 100 ml of water. The reaction was conducted at room temperature under agitation by passing a $N_2$ gas through the flask to prevent oxygen in the air from being present in the flask and controlling the addition of the NaOH aqueous solution so that the pH of the reaction liquor was maintained above 11.5. After completion of the reaction the resulting suspension was rapidly filtered under reduced pressure in a $N_2$ gas atmosphere, and the residue was dried at about 60°C. for 8 hours in a $N_2$ gas current, washed with water under reduced pressure and dried again under the same conditions as above. Results of the analysis of the product are as follows:

Composition formula
$Zn_6Ti_2(OH)_{16}CO_3 \cdot 4H_2O$    $K = 5.3$
$x/y = 3$
$z/(x+y) = 1/8$ X-ray diffraction

| d(A) | 8.17 | 4.05 | 2.64 | 1.98 | 1.56 |
|---|---|---|---|---|---|
| $I/I_o$ | 100 | 52 | 18 | 10 | 6 |

| Chemical analysis | |
|---|---|
| ZnO | 54.8 % (6.12) |
| $Ti_2O_3$ | 16.1 % (1.0) |
| $CO_2$ | 4.9 % (0.96) |
| $H_2O$ | 27.1 % (12.03) |

EXAMPLE 93

A liquor of 15.0 g of $LaCl_3 \cdot 7H_2O$ and 16.4 g of $ZnCl_2$ dissolved in 200 ml of water and a liquor of 2.1 g of $Na_2CO_3$ dissolved in 100 ml of water were added dropwise to a 500-ml capacity beaker charged with 100 ml of water, together with an aqueous solution containing 2.0 moles per liter of NaOH. The addition of the NaOH aqueous solution was controlled so that the pH of the reaction liquor was maintained at 7.5 – 8.5 After completion of the reaction the resulting suspension was transferred to an autoclave and subjected to the hydrothermal treatment at 150°C. for 12 hours, following which it was treated in the same manner as in Example 1. Results of the analysis of the product are as follows:

Composition formula
$Zn_6La_2(OH)_{16}CO_3 \cdot 4H_2O$    $K = 5.3$
$x/y = 3$
$z/(x+y) = 1/8$ X-ray diffraction

| d(A) | 7.89 | 3.82 | 2.64 | 2.37 | 2.06 | 1.54 |
|---|---|---|---|---|---|---|
| $I/I_o$ | 100 | 55 | 20 | 11 | 8 | 5 |

| Chemical analysis | |
|---|---|
| ZnO | 45.5 % (6.09) |
| $La_2O_3$ | 30.2 % (1.0) |
| $CO_2$ | 4.1 % (1.02) |
| $H_2O$ | 20.3 % (12.06) |

EXAMPLE 94

A liquor of 17.5 g of $Nd(NO_3)_3 \cdot 6H_2O$ and 16.4 g of $ZnCl_2$ dissolved in 200 ml of water and a liquor of 2.1 g of $Na_2CO_3$ and 12.8 g of NaOH dissolved in 200 ml of water were added dropwise at room temperature under agitation to a 500-ml capacity beaker charged with 60 ml of water, in a manner such that the pH of the reaction liquor was maintained at 10.0 – 11.0. The reaction was carried out in a $N_2$ gas atmosphere. The resulting suspension was post-treated in the same manner as in Example 1. Results of the analysis of the product are as follows:

Compositions formula
$Zn_6Nd_2(OH)_{16}CO_3 \cdot 4H_2O$    $K = 5.3$
$x/y = 3$
$z/(x+y) = 1/8$ X-ray diffraction

| d(A) | 7.89 | 3.87 | 2.72 | 2.37 | 2.09 |
|---|---|---|---|---|---|
| $I/I_o$ | 100 | 28 | 14 | 9 | 5 |

| Chemical composition | |
|---|---|
| ZnO | 45.0 % (5.91) |
| $Nd_2O_3$ | 31.1 % (1.0) |
| $CO_2$ | 4.1 % (1.08) |
| $H_2O$ | 19.9 % (12.11) |

EXAMPLE 95

A liquor of 15.0 g of $CeCl_3 \cdot 7H_2O$, 3.0 g of $NH_4Cl$ and 16.4 g of $ZnCl_2$ dissolved in 200 ml of water and a liquor of 2.1 g of $Na_2CO_3$ and 13.0 g of NaOH dissolved in 200 ml of water were added dropwise in a $N_2$ gas atmosphere to a four-neck flask charged with 100 ml of water. The addition of both liquors was controlled so that the pH of the reaction liquor was maintained above 11.0. After completion of the reaction, water was removed from the resulting suspension in a $N_2$ gas atmosphere, and the residue was dried in the same atmosphere, washed with 200 ml of water and dried at 60°C. for 15 hours in a $N_2$ gas current. Results of the analysis of the product are as follows:

Composition formula
$Zn_6Ce_2(OH)_{16}CO_3 \cdot 4H_2O$      $K = 5.3$
                                          $x/y = 3$
                                          $z/(x+y) = 1/8$ X-ray diffraction

| d(A) | 7.89 | 3.86 | 2.65 | 2.37 | 1.53 | 1.50 |
|---|---|---|---|---|---|---|
| $I/I_o$ | 100 | 38 | 21 | 10 | 5 | 5 |

Chemical analysis

| ZnO | 45.3 % (6.0) |
|---|---|
| $Ce_2O_3$ | 30.5 % (1.0) |
| $CO_2$ | 4.1 % (1.02) |
| $H_2O$ | 20.0 % (11.88) |

EXAMPLE 96

A liquor of 3.2 g of $VCl_3$ and 16.4 g of $ZnCl_2$ dissolved in 200 ml of water and a liquor of 2.1 g of $Na_2CO_3$ and 13.0 g of NaOH dissolved in 100 ml of water were added dropwise to a 500-ml capacity four-neck flask charged with 100 ml of degasified ion-exchange water, while passing $N_2$ gas through the flask. The addition of the liquors was so controlled that the pH of the reaction liquor was maintained at 10.0 – 11.0. After completion of the reaction, the resulting suspension was dehydrated in a $N_2$ gas atmosphere, and the residue was dried at 60°C. in a $N_2$ gas current, washed with 100 ml of degasified ion-exchange water, and dried at 60°C. for 15 hours in a $N_2$ gas current. Results of the analysis of the product are as follows:

Composition formula
$Zn_6V_2(OH)_{16}CO_3 \cdot 4H_2O$      $K = 5.3$
                                         $x/y = 3$
                                         $z/(x+y) = 1/8$ X-ray diffraction

| d(A) | 7.89 | 4.00 | 2.70 | 2.39 | 1.54 | 1.50 |
|---|---|---|---|---|---|---|
| $I/I_o$ | 100 | 52 | 21 | 18 | 6 | 6 |

Chemical analysis

| ZnO | 54.5 % (6.04) |
|---|---|
| $V_2O_3$ | 16.7 % (1.0) |
| $CO_2$ | 4.9 % (1.01) |
| $H_2O$ | 24.1 % (12.04) |

EXAMPLE 97

The following four liquors, namely (1) an aqueous solution containing 0.2 mole per liter of $FeSO_4 \cdot 7H_2O$, 0.2 mole per liter of $Co(NO_3)_2 \cdot 6H_2O$ and 0.2 mole per liter of $Ni(NO_3)_2 \cdot 6H_2O$, (2) an aqueous solution containing 0.2 mole per liter of $Cr(NO_3)_3 \cdot 9H_2O$, the pH of which was adjusted to 1 by concentrated hydrochloric acid so as to prevent hydrolysis, (3) an aqueous solution containing 0.1 mole per liter of $(NH_4)_2CO_3$ and (4) an aqueous solution containing 2.0 moles per liter of NaOH, were fed at feed rates of 20 ml/min, 20 ml/min, 20 ml/min and 18 ml/min, respectively, by means of controllable pumps to a 2000-ml capacity cylindrical reaction tank maintained at 10° ± 1°C. The reaction tank had been charged with 500 ml of water in advance, and the reaction liquor was agitated at a constant rate by means of a constant rate stirrer. So as to adjust the pH of the reaction liquor to a range of 8 – 9 where the development of polymerization of trivalent chromium hydroxide is low, the pH of the reaction liquor was maintained at 8.5 ± 0.1 by controlling the caustic soda aqueous solution feed rate. The liquor which overflowed in 90 minutes from the initiation of the reaction was thrown away, and the reaction suspension which overflowed after that time was collected and subjected to the hydrothermal treatment at 150°C. for 5 hours in an autoclave. Posttreatments were conducted in the same manner as in Example 38. Results of the analysis of the product are as follows:

Composition formula
$Fe_2Co_2Ni_2Cr_2(OH)_{16}CO_3 \cdot 4H_2O$    $K = 4.6$ ($Fe$-$CO_3$ series)
                                                $K = 2.9$ ($Co$-$CO_3$ series)
                                                $K = 6.1$ ($Ni$-$CO_3$ series)
                                                $x/y = 3$
                                                $z/(x+y) = 1/8$ X-ray diffraction

| d(A) | 7.93 | 3.92 | 2.62 | 1.52 | 1.54 |
|---|---|---|---|---|---|
| $I/I_o$ | 100 | 43 | 25 | 10 | 4 |

Chemical analysis

| FeO | 16.8 % (2.01) |
|---|---|
| CoO | 17.5 % (2.00) |
| NiO | 17.5 % (2.00) |
| $Cr_2O_3$ | 17.8 % (1.0) |
| $CO_2$ | 5.1 % (0.98) |
| $H_2O$ | 25.4 % (12.10) |

EXAMPLE 98

12.3 g of $Cd(NO_3)_2 \cdot 4H_2O$, 9.8 g of $Cu(NO_3)_2 \cdot 3H_2O$, 11.6 g of $Ni(NO_3)_2 \cdot 6H_2O$, 4.6 g of $SbCl_3$ and 4.4 g of $InCl_3$ were dissolved in 200 ml of water, and the pH of the liquor was adjusted by addition of concentrated nitric acid. The so formed liquor and a solution of 2.1 g of $Na_2CO_3$ and 13 g of NaOH dissolved in 200 ml of water were added dropwise to a 500-ml capacity beaker charged with 100 ml of water, in a manner such that the pH of the reaction liquor was maintained at 12 – 13. After completion of the reaction, the resulting suspension was treated in the same manner as in Example 1. Results of the analysis of the product are as follows:

Composition formula
$(Cd_2Cu_2Ni_2)(SbIn)(OH)_{16}CO_3 \cdot 4H_2O$    $K = 0$ ($Cd$-$CO_3$ series)
                                                   $K = 9.0$ ($Cu$-$CO_3$ series)
                                                   $K = 6.1$ ($Ni$-$CO_3$ series)
                                                   $x/y = 3$
                                                   $z/(x+y) = 1/8$ X-ray diffraction

| d(A) | 7.78 | 3.86 | 2.53 | 2.37 | 1.51 |
|---|---|---|---|---|---|
| $I/I_o$ | 100 | 49 | 22 | 10 | 7 |

Chemical analysis

| CdO | 23.1 % (2.01) |
|---|---|
| CuO | 14.4 % (2.0) |
| NiO | 13.5 % (2.01) |
| $Sb_2O_3$ | 13.0 % (0.49) |
| $In_2O_3$ | 12.5 % (0.52) |
| $CO_2$ | 3.8 % (1.05) |
| $H_2O$ | 19.8 % (12.13) |

EXAMPLE 99

100 ml of a rhodium chloride solution of a concentration of 0.2 mole per liter calculated as $Rh_2O_3$ were mixed with 100 ml of a cupric chloride solution of a concentration of 1.2 moles per liter calculated as CuO. The so formed mixed liquor and another mixed liquor of 25.6 ml of a sodium carbonate solution of a concentration of 0.785 mole per liter and 80 ml of a potassium hydroxide solution of a concentration of 4 moles per liter were added dropwise to a 500-ml capacity beaker charged with 80 ml of water. The temperature was adjusted to 8° – 10°C. and the pH of the reaction liquor was maintained at 10 – 11. Water was rapidly removed from the resulting suspension, and the residue was washed with 200 ml of water and dried at 60°C. for 15 hours. Results of the analysis of the product are as follows:

Composition formula
$Cu_6Rh_2(OH)_{16}CO_3 \cdot 4H_2O$   $K = 9.0$
$x/y = 3$
$z/(x + y) = 1/8$ X-ray diffraction
| $d(A)$ | 7.83 | 3.79 | 2.61 | 2.40 | 1.52 |
|---|---|---|---|---|---|
| $I/I_o$ | 100 | 52 | 21 | 15 | 7 |

Chemical analysis
| CuO | 48.2 % (6.01) |
| $Rh_2O_3$ | 25.6 % (1.0) |
| $CO_2$ | 4.5 % (1.11) |
| $H_2O$ | 21.8 % (12.07) |

EXAMPLE 100

10 g of a dried product of $Ni_6Fe_2(OH)_{16}CO_3 \cdot 4H_2O$ ion-exchanged in the same manner as in Example 79 by using a solution of 4.0 g of $K_2CrO_4$ in 200 ml of water. Results of the analysis of the product are as follows:

Composition formula
$Ni_6Fe_2(OH)_{16}CrO_4 \cdot 4H_2O$   $x/y = 3$
$z/(x + y) = 1/8$ X-ray diffraction
| $d(A)$ | 7.62 | 3.72 | 2.46 | 2.38 |
|---|---|---|---|---|
| $I/I_o$ | 100 | 53 | 22 | 10 |

Chemical analysis
| NiO | 48.6 % (6.06) |
| $Fe_2O_3$ | 17.3 % (1.0) |
| $CrO_4$ | 12.6 % (0.99) |
| $CO_2$ | 0.10% ( — ) |
| $H_2O$ | 21.6 % (12.03) |

EXAMPLE 101

5 g of a dried product of $Ni_6Bi_2(OH)_{16}CO_3 \cdot 4H_2O$ ion-exchanged in the same manner as in Example 79 by using a solution of 2.0 g of $K_2CrO_4$ in 100 ml of water. Results of the analysis of the product are as follows:

Composition formula
$Ni_6Bi_2(OH)_{16}CrO_4 \cdot 4H_2O$   $x/y = 3$
$z/(x + y) = 1/8$ X-ray diffraction
| $d(A)$ | 8.56 | 4.78 | 2.48 | 1.52 |
|---|---|---|---|---|
| $I/I_o$ | 100 | 30 | 29 | 14 |

Chemical analysis
| NiO | 36.6 % (6.03) |
| $Bi_2O_3$ | 37.9 % (1.0) |
| $CrO_4$ | 9.4 % (0.96) |
| $CO_2$ | 0.12% ( — ) |
| $H_2O$ | 16.2 % (12.1) |

EXAMPLE 102

5 g of a dried product of $Co_6Al_2(OH)_{16}CO_3 \cdot 4H_2O$ ion-exchanged in the same manner as in Example 79 by using a solution of 2 g of $K_2CrO_4$ in 100 ml of water. Results of the analysis of the product are as follows:

Composition formula
$Co_6Al_2(OH)_{16}CrO_4 \cdot 4H_2O$   $x/y = 3$
$z/(x + y) = 1/8$ X-ray diffraction
| $d(A)$ | 7.98 | 3.96 | 2.72 | 2.31 | 1.56 |
|---|---|---|---|---|---|
| $I/I_o$ | 100 | 30 | 15 | 10 | 5 |

Chemical analysis
| CoO | 51.8 (6.07) |
| $Al_2O_3$ | 11.7 % (1.0) |
| $CrO_4$ | 12.3 % (0.99) |
| $CO_2$ | 0.04% ( — ) |
| $H_2O$ | 24.2 % (12.0) |

EXAMPLE 103

5.0 g of a dried product of $Be_6Al_2(OH)_{16}SO_4 \cdot 4H_2O$ were packed in a burette, at the bottom of which glass wool was stuffed. The ion-exchange was performed by using a solution of 3 g of $K_2SeO_3 \cdot 5H_2O$ in 100 ml of water. Results of the analysis are as follows:

Composition formula
$Be_6Al_2(OH)_{16}SeO_3 \cdot 4H_2O$   $x/y = 3$
$z/(x + y) = 1/8$ X-ray diffraction
| $d(A)$ | 7.82 | 3.90 | 2.62 | 2.30 | 1.53 | 1.51 |
|---|---|---|---|---|---|---|
| $I/I_o$ | 100 | 30 | 14 | 10 | 5 | 5 |

Chemical analysis
| BeO | 31.3 % (5.96) |
| $Al_2O_3$ | 21.3 % (1.0) |
| $SeO_2$ | 23.1 % (0.97) |
| $SO_4$ | 0.07% ( — ) |
| $H_2O$ | 24.4 % (12.04) |

EXAMPLE 104

5 g of $Be_6Al_2(OH)_{16}SO_4 \cdot 4H_2O$ anion-exchanged by a column method with use of 500 ml of a $Na_2CO_3$ aqueous solution of a concentration of 4 moles per liter. The ion-exchanged product was washed with 200 ml of water, and after removal of water, it was dried at 70°C. for 10 hours. Results of the analysis of the product are as follows:

Composition formula
$Be_6Al_2(OH)_{16}CO_3 \cdot 4H_2O$   $x/y = 3$
$z/(x + y) = 1/8$ X-ray diffraction
| $d(A)$ | 6.56 | 3.29 | 2.41 | 1.91 |
|---|---|---|---|---|
| $I/I_o$ | 100 | 50 | 20 | 10 |

Chemical analysis
| BeO | 29.3 % (6.02) |
| $Al_2O_3$ | 19.9 % (1.0) |
| $CO_2$ | 8.6 % (1.0) |
| $H_2O$ | 42.3 % (12.02) |

EXAMPLE 105

A mixed liquor of 51.2 ml of a sodium sulfate solution ($Na_2SO_4$ concentration = 0.8 mole/liter) and 160 ml of a caustic soda solution (NaOH concentration = 2 moles/liter), and another mixed liquor of 100 ml of a beryllium sulfate solution ($BeSO_4 \cdot 4H_2O$ concentration = 1.2 moles/liter) and 100 ml of a ferric sulfate solution ($Fe_2O_3$ concentration = 0.2 mole/liter), the pH of which was adjusted to 0.8 by addition of sulfuric acid, were added dropwise at 60°C. under agitation to a 500-ml capacity beaker charged with 60 ml of water. The addition of each liquor was so controlled that the pH of the reaction liquor was maintained at 9.5 – 10.0. The resulting suspension was heated at 100°C. for 10 hours, cooled and washed with water, followed by dehydration.

The resulting product was anion-exchanged by using a solution of 5 g of $Na_2CrO_4$ in 200 ml of water, and the ion-exchanged product was washed with water, dehydrated and dried at 70°C. for 15 hours. Results of the analysis of the product are as follows:

Composition formula
$Be_6Fe_2(OH)_{16}CrO_4 \cdot 4H_2O$   $x/y = 3$
$z/(x + y) = 1/8$ -Continued

| X-ray diffraction | | | | |
|---|---|---|---|---|
| $d(Å)$ | 6.62 | 3.30 | 2.39 | 1.92 |
| $I/I_o$ | 100 | 49 | 19 | 9 |
| Chemical analysis | | | | |
| BeO | 24.0 % (6.02) | | | |
| $Fe_2O_3$ | 26.6 % (1.0) | | | |
| $CrO_3$ | 16.0 % (1.01) | | | |
| $H_2O$ | 33.4 % (11.62) | | | |

EXAMPLE 106

A liquor containing 0.1 mole per liter of $MnCl_3$ and 0.6 mole per liter of nickelous nitrate, an aqueous solution containing 0.1 mole per liter of $Na_2CO_3$ and an aqueous solution containing 2.0 moles per liter of NaOH were fed to a 2,000-ml capacity of a reactor equipped with a pH electrode and a constant rate stirrer, at feed rates of 20 ml/min, 20 ml/min and 16 ml/min, respectively. The reactor had been charged with 500 ml of water in advance. The reaction was conducted under agitation by the constant rate stirrer while controlling the feed rate of the NaOH aqueous solution so that the pH of the reaction liquor was maintained at 9 – 10. The reaction suspension which overflowed from the reactor was collected, and water was removed therefrom. The residue was washed with water and dried at 80°C. for 10 hours. Results of the analysis of the product are as follows:

| Composition formula | | | | |
|---|---|---|---|---|
| $Ni_6Mn_2(OH)_{16}CO_3 \cdot 4H_2O$ | | K = 6.1 | | |
| | | x/y = 3 | | |
| | | z/(x + y) = ⅛ | | |
| X-ray diffraction | | | | |
| $d(Å)$ | 7.89 | 3.92 | 2.61 | 1.52 |
| $I/I_o$ | 100 | 34 | 27 | 9 |
| Chemical analysis | | | | |
| NiO | 51.8 % (5.97) | | | |
| $Mn_2O_3$ | 18.2 % (1.0) | | | |
| $CO_2$ | 5.2 % (1.02) | | | |
| $H_2O$ | 24.8 % (11.97) | | | |

EXAMPLE 107

A liquor containing 0.1 mole per liter of $MnCl_3$ and 0.6 mole per liter of zinc chloride, an aqueous solution containing 0.1 mole per liter of $Na_2CO_3$ and an aqueous solution containing 2.0 moles per liter of NaOH were fed to a 2,000-ml capacity reactor equipped with a pH electrode and a constant rate stirrer, at feed rates of 20 ml/min, 20 ml/min and 16 ml/min, respectively. The reactor had been charged with 500 ml of water in advance. The reaction was conducted under agitation by the constant rate stirrer while controlling the feed rate of the NaOH aqueous solution so that the pH of the reaction liquor was maintained at 9 – 10.5. The reaction suspension which overflowed from the reactor was collected and water was removed therefrom. The residue was washed with water and dried at 80°C. for 10 hours. Results of the analysis of the product are as follows:

| Composition formula | | | | | |
|---|---|---|---|---|---|
| $Zn_6Mn_2(OH)_{16}CO_3 \cdot 4H_2O$ | | K = 5.8 | | | |
| | | x/y = 3 | | | |
| | | z/(x + y) = ⅛ | | | |
| X-ray diffraction | | | | | |
| $d(Å)$ | 7.81 | 3.89 | 2.60 | 1.53 | 1.51 |
| $I/I_o$ | 100 | 48 | 25 | 10 | 6 |
| Chemical analysis | | | | | |
| ZnO | 53.9 % (6.02) | | | | |
| $Mn_2O_3$ | 17.5 % (1.0) | | | | |
| $CO_2$ | 4.9 % (1.01) | | | | |
| $H_2O$ | 23.8 % (11.99) | | | | |

What we claim is:

1. A composite metal hydroxide expressed by the following composition formula:

$$M_{0.5\sim16}^{2+}M_2^{3+}(OH)_{7-2z\sim38-2z}(A^{2-})_z \cdot 0.625\sim18H_2O$$

wherein $M^{2+}$ is a divalent metal selected from the group consisting of copper, beryllium, calcium strontium, barium, zinc, cadmium, tin, lead, manganese and metals of group VIII of the Periodic Table; $M^{3+}$ is a trivalent metal selected from the group consisting of metals of group III of the Periodic Table, titanium, metals of group V of the Periodic Table, chromium, manganese, metals of group VIII of the Periodic Table, rare earth metals and americium; $A^{2-}$ represents a divalent inorganic ion selected from the group consisting of $CO_3^=$, $CrO_4^=$, $Cr_2O_7^=$, $B_4O_7^=$, $MoO_4^=$, $SeO_3^=$, $SeO_4^=$, $SiO_3^=$, $HPO_4^=$, $NH_4PO_4^=$, $SiF_6^=$, $Pt(CN)_4^=$, $SO_3^=$ and $S_2O_3^=$; and $$1/6 > (z/(2.5\sim18) > 1/20,$$

said composite metal hydroxide having a layer crystal structure expressed substantially by the following X-ray diffraction pattern:

| $d(Å)$ | relative intensity ($I/I_o$) |
|---|---|
| 7.8 ± 3.2 | 100 |
| 3.9 ± 1.6 | 5 – 80 |
| 2.6 ± 1.2 | 5 – 60 |
| 1.54 ± 0.05 | 2 – 10 |
| 1.51 ± 0.05 | 2 – 10 | and exhibiting an endothermic peak owing to isolation of crystal water at a temperature exceeding 200°C. in the differential thermal analysis.

2. The composite metal hydroxide of claim 1, which has a composition expressed by the following formula:

$$M_{2-8}^{2+}Al_2(OH)_{7.5-20}A_{0.5-1.4}^{2-} \cdot 1.5-5H_2O$$

wherein $M^{2+}$ is selected from iron, cobalt and nickel, and $A^{2-}$ is selected from $CO_3^=$, $CrO_4^=$, $Cr_2O_7^=$, $SeO_4^=$, $SO_3^=$, $MoO_4^=$, $B_4O_7^=$ and $SiO_3^=$.

3. The composite metal hydroxide of claim 1, which has a composition expressed by the following formula:

$$M_{2-16}^{2+}Al_2(OH)_{7.5-34}A_{0.5-2.5}^{2-} \cdot 1.5-6H_2O$$

wherein $M^{2+}$ is selected from zinc and cadmium, and $A^{2-}$ is selected from $CO_3^=$, $CrO_4^=$, $Cr_2O_7^=$, $MoO_4^=$, $SO_3^=$, $SiO_3^=$, $B_4O_7^=$ and $SeO_4^=$.

4. The composite metal hydroxide of claim 1, which has a composition expressed by the following formula:

$$Cu_{2-8}Al_2(OH)_{7.5-20}A_{0.5-1.4}^{2-} \cdot 1.5-5H_2O$$

wherein $A^{2-}$ is selected from $CO_3^=$, $CrO_4^=$, $Cr_2O_7^=$, $SO_3^=$, $SO_4^=$, $MoO_4^=$, $B_4O_7^=$.

5. The composite metal hydroxide of claim 1, which has composition expressed by the following formula:

$$Be_{2-16}Al_2(OH)_{7.5-34}A_{0.5-2.5}^{2-} \cdot 1.5-6H_2O$$

wherein $A^{2-}$ is selected from $CO_3^=$, $CrO_4^=$, $Cr_2O_7^=$, $MoO_4^=$, $SO_3^=$, $SiO_3^=$, $B_4O_7^=$ and $SeO_4^=$.

6. The composite metal hydroxide of claim 1, which has a composition expressed by the following formula:

$$M_{2-16}^{2-}Al_2(OH)_{7.5-34}A_{0.5-2.5}^{2-} \cdot 1.5-6H_2O$$

wherein $M^{2+}$ is selected from calcium, strontium and barium, and $A^{2-}$ is selected from $CO_3^=$, $CrO_4^=$, $Cr_2O_7^=$, $MoO_4^=$, $SO_3^=$, $SiO_3^=$, $B_4O_7^=$ and $SeO_4^=$.

7. The composite metal hydroxide of claim 1, which has a composition expressed by the following formula:

$$M_{2-16}^{2+}M_2^{3+}(OH)_{7.5-34}A_{0.5-2.5}^{2-} \cdot 1.5-6H_2O$$

wherein $M^{2+}$ is selected from iron, cobalt and nickel, $M^{3+}$ is selected from iron, cobalt and nickel, and $A^{2-}$ is selected from $CO_3^=$, $CrO_4^=$, $Cr_2O_7^=$, $MoO_4^=$, $SO_3^=$, $SiO_3^=$, $SeO_4^=$ and $B_4O_7^=$.

8. The composite metal hydroxide of claim 1, which has a composition expressed by the following formula:

$$M_{2-16}^{2+}M_2^{3+}(OH)_{7.5-34}A_{0.5-2.5}^{2-} \cdot 1.5-6H_2O$$

wherein $M^{2+}$ is selected from zinc and cadmium, $M^{3+}$ is selected from iron, cobalt and nickel, and $A^{2+}$ is selected from $CO_3^=$, $CrO_4^=$, $Cr_2O_7^=$, $MoO_4^=$, $SO_3^=$, $SiO_3^=$, $SeO_4^=$ and $B_4O_7^=$.

9. The composite metal hydroxide of claim 1, which has a composition expressed by the following formula:

$$Cu_{2-8}M_2^{3+}(OH)_{7.5-20}A_{0.5-1.4}^{2-} \cdot 1.5-5H_2O$$

wherein $M^{3+}$ is selected from iron, cobalt and nickel, and $A^{2-}$ is selected from $CO_3^=$, $CrO_4^=$, $Cr_2O_7^=$, $MoO_4^=$, $SO_3^=$, $SiO_3^=$, $SeO_4^=$ and $B_4O_7^=$.

10. The composite metal hydroxide of claim 1, which has a composition expressed by the following formula:

$$Be_{2-16}M_2^{3+}(OH)_{7.5-34}A_{0.5-2.5}^{2-} \cdot 1.5-6H_2O$$

wherein $M^{3+}$ is selected from iron, cobalt and nickel, and $A^{2-}$ is selected from $CO_3^=$, $CrO_4^=$, $Cr_2O_7^=$, $MoO_4^=$, $SO_3^=$, $SiO_3^=$, $SeO_4^=$ and $B_4O_7^=$.

11. The composite metal hydroxide of claim 1, which has composition expressed by the following formula:

$$M_{2-16}^{2+}M_2^{3+}(OH)_{7.5-34}A_{0.5-2.5}^{2-} \cdot 1.5-6H_2O$$

wherein $M^{2+}$ is selected from calcium, strontium and barium, $M^{3+}$ is selected from iron, cobalt and nickel, and $A^{2-}$ is selected from $CO_3^=$, $CrO_4^=$, $Cr_2O_7^=$, $MoO_4^=$, $SO_3^=$, $SiO_3^=$, $SeO_4^=$ and $B_4O_7^=$.

12. The composite metal hydroxide of claim 1, which has a composition expressed by the following formula:

$$M_{2-8}^{2+}Cr_2(OH)_{7.5-20}A_{0.5-1.4}^{2-} \cdot 1.5-5H_2O$$

wherein $M^{2+}$ is selected from iron, cobalt, nickel and copper, and $A^{2-}$ is selected from $CO_3^=$, $CrO_4^=$, $Cr_2O_7^=$, $MoO_4^=$, $SO_3^=$, $SiO_3^=$, $SeO_4^=$ and $B_4O_7^=$.

13. The composite metal hydroxide of claim 1, which has a composition expressed by the following formula:

$$M_{2-16}^{2+}Cr_2(OH)_{7.5-34}A_{0.5-2.5}^{2-} \cdot 1.5-6H_2O$$

wherein $M^{2+}$ is selected from zinc, cadmium, beryllium, calcium, strontium and barium, and $A^{2+}$ is selected from $CO_3^=$, $CrO_4^=$, $Cr_2O_7^=$, $MoO_4^=$, $SO_3^=$, $SiO_3^=$, $SeO_4^=$, and $B_4O_7^=$.

14. The composite metal hydroxide of claim 1, which has a composition expressed by the following formula:

$$M_{2-8}^{2+}M_2^{3+}(OH)_{7.5-20}A_{0.5-1.4}^{2-} \cdot 1.5-5H_2O$$

wherein $M^{2+}$ is selected from iron, cobalt, nickel and copper, $M^{3+}$ is selected from gallium, scandium, indium and yttrium, $A^{2-}$ is selected from $CO_3^=$, $CrO_4^=$, $Cr_2O_7^=$, $MoO_4^=$, $SO_3^=$, $SiO_3^=$, $B_4O_7^=$ and $SeO_4^=$.

15. The composite metal hydroxide of claim 1, which has a composition expressed by the following formula:

$$M_{2-16}^{2+}M_2^{3+}(OH)_{7.5-34}A_{0.5-2.5}^{2-} \cdot 1.5-6H_2O$$

wherein $M^{2+}$ is selected from zinc, cadmium, beryllium, strontium, barium and calcium, $M^{3+}$ is selected from gallium, scandium, indium and yttrium, and $A^{2-}$ is selected from $CO_3^=$, $CrO_4^=$, $Cr_2O_7^=$, $MoO_4^=$, $SO_3^=$, $SiO_3^=$, $SeO_4^=$ and $B_4O_7^=$.

16. The composite metal hydroxide of claim 1, which has a composition expressed by the following formula:

$$M_{2-8}^{2+}Mn_2(OH)_{7.5-20}A_{0.5-1.4}^{2-} \cdot 1.5-5H_2O$$

wherein $M^{2+}$ is selected from iron, cobalt, nickel and copper, and $A^{2-}$ is selected from $CO_3^=$, $CrO_4^=$, $Cr_2O_7^=$, $MoO_4^=$, $SO_3^=$, $SiO_3^=$, $SeO_4^=$ and $B_4O_7^=$.

17. The composite metal hydroxide of claim 1, which has a composition expressed by the following formula:

$$M_{2-16}^{2+}Mn_2(OH)_{7.5-34}A_{0.5-2.5}^{2-} \cdot 1.5-6H_2O$$

wherein $M^{2+}$ is selected from zinc, cadmium, beryllium, calcium, strontium and barium, and $A^{2-}$ is selected from $CO_3^=$, $CrO_4^=$, $Cr_2O_7^=$, $MoO_4^=$, $SO_3^=$, $SiO_3^=$, $SeO_4^=$ and $B_4O_7^=$.

* * * * *